US010003840B2

(12) United States Patent
Richman et al.

(10) Patent No.: US 10,003,840 B2
(45) Date of Patent: Jun. 19, 2018

(54) SYSTEM AND METHOD FOR PROVIDING WATCH-NOW FUNCTIONALITY IN A MEDIA CONTENT ENVIRONMENT

(71) Applicant: SPOTIFY AB, Stockholm (SE)

(72) Inventors: Jason Richman, New York City, NY (US); Will Meyer, New York City, NY (US); Ed Chen, New York City, NY (US); Alex Sarkesian, New York City, NY (US); Colin McLeod, New York City, NY (US); Samwoo E, New York City, NY (US)

(73) Assignee: SPOTIFY AB, Stockholm (SE)

( * ) Notice: Subject to any disclaimer, the term of this patent is extended or adjusted under 35 U.S.C. 154(b) by 0 days. days.

(21) Appl. No.: 14/586,724

(22) Filed: Dec. 30, 2014

(65) Prior Publication Data

US 2015/0289023 A1   Oct. 8, 2015

Related U.S. Application Data

(60) Provisional application No. 61/976,359, filed on Apr. 7, 2014, provisional application No. 61/988,790, filed on May 5, 2014.

(51) Int. Cl.
*H04N 21/2668* (2011.01)
*H04N 21/239* (2011.01)
(Continued)

(52) U.S. Cl.
CPC ......... *H04N 21/2668* (2013.01); *H04N 21/23* (2013.01); *H04N 21/234* (2013.01);
(Continued)

(58) Field of Classification Search
None
See application file for complete search history.

(56) References Cited

U.S. PATENT DOCUMENTS

| 6,711,622 B1 | 3/2004 | Fuller et al. |
| 7,617,295 B1 | 11/2009 | Farber et al. |

(Continued)

FOREIGN PATENT DOCUMENTS

WO   WO/1999/045701   9/1999

OTHER PUBLICATIONS

Office Action dated Aug. 21, 2015 issued by United States Patent and Trademark Office on U.S. Appl. No. 14/586,728.
(Continued)

*Primary Examiner* — Justin Shepard
(74) *Attorney, Agent, or Firm* — Tucker Ellis LLP

(57) ABSTRACT

Described herein are techniques for streaming digital media content, such as music, video, or television content. In accordance with an embodiment, the system includes support for watch-now functionality. A media play logic at a media device controls playback of media content and advertisements as received from a media server, and can be configured for regular media play, or extended media play. Periodically, for example when input is received from a user to skip to a next media option for playback, the user can be prompted to watch an advertisement, in return for extended media play. Upon receiving an election by the user to watch the advertisement in return for extended media play, the media application plays the advertisement, and configures the media play logic for an extended period of advertisement-free media play.

23 Claims, 40 Drawing Sheets

(51) Int. Cl.
| | |
|---|---|
| *H04N 21/81* | (2011.01) |
| *H04N 21/431* | (2011.01) |
| *H04N 21/472* | (2011.01) |
| *H04N 21/442* | (2011.01) |
| *H04N 21/234* | (2011.01) |
| *H04N 21/235* | (2011.01) |
| *H04N 21/2343* | (2011.01) |
| *H04N 21/4402* | (2011.01) |
| *H04N 21/258* | (2011.01) |
| *H04N 21/262* | (2011.01) |
| *H04N 21/44* | (2011.01) |
| *H04N 21/23* | (2011.01) |
| *H04N 21/25* | (2011.01) |
| *H04N 21/4784* | (2011.01) |

(52) U.S. Cl.
CPC ....... *H04N 21/235* (2013.01); *H04N 21/2358* (2013.01); *H04N 21/2393* (2013.01); *H04N 21/23424* (2013.01); *H04N 21/23439* (2013.01); *H04N 21/25* (2013.01); *H04N 21/251* (2013.01); *H04N 21/258* (2013.01); *H04N 21/25841* (2013.01); *H04N 21/25891* (2013.01); *H04N 21/26258* (2013.01); *H04N 21/4316* (2013.01); *H04N 21/44* (2013.01); *H04N 21/44029* (2013.01); *H04N 21/44213* (2013.01); *H04N 21/44222* (2013.01); *H04N 21/4784* (2013.01); *H04N 21/47202* (2013.01); *H04N 21/47217* (2013.01); *H04N 21/812* (2013.01)

(56) References Cited

U.S. PATENT DOCUMENTS

| | | |
|---|---|---|
| 8,752,085 B1 | 6/2014 | Brueck et al. |
| 8,813,120 B1 | 8/2014 | Kosslyn |
| 8,938,497 B1 | 1/2015 | Wang |
| 9,377,860 B1 | 6/2016 | Weber et al. |
| 2002/0019732 A1 | 2/2002 | Kikinis et al. |
| 2002/0019769 A1* | 2/2002 | Barritz .................. G06Q 30/02 705/14.35 |
| 2005/0076359 A1* | 4/2005 | Pierson ................ G11B 27/005 725/32 |
| 2006/0085816 A1* | 4/2006 | Funk ..................... G06Q 30/02 725/34 |
| 2006/0143236 A1 | 6/2006 | Wu |
| 2006/0170945 A1 | 8/2006 | Bill |
| 2006/0179453 A1 | 8/2006 | Kadie et al. |
| 2007/0011007 A1 | 1/2007 | Greene et al. |
| 2007/0136459 A1 | 6/2007 | Roche et al. |
| 2007/0204310 A1 | 8/2007 | Hua et al. |
| 2007/0220552 A1 | 9/2007 | Juster et al. |
| 2007/0250319 A1 | 10/2007 | Tateishi et al. |
| 2008/0183645 A1 | 7/2008 | Burger et al. |
| 2008/0184142 A1 | 7/2008 | Ijichi et al. |
| 2008/0195664 A1 | 8/2008 | Maharajh et al. |
| 2008/0249986 A1 | 10/2008 | Clarke-Martin et al. |
| 2008/0307454 A1 | 12/2008 | Ahanger et al. |
| 2009/0043896 A1 | 2/2009 | Law |
| 2009/0094102 A1 | 4/2009 | Hengel |
| 2009/0094160 A1 | 4/2009 | Webster et al. |
| 2009/0222850 A1 | 9/2009 | Darnell |
| 2009/0265212 A1 | 10/2009 | Hyman et al. |
| 2009/0328113 A1 | 12/2009 | Van de Klashorst |
| 2010/0095333 A1 | 4/2010 | Kelly et al. |
| 2010/0269145 A1 | 10/2010 | Ingrassia et al. |
| 2010/0303258 A1 | 12/2010 | Pan |
| 2011/0022464 A1 | 1/2011 | Dunn et al. |
| 2011/0072955 A1 | 3/2011 | Turner |
| 2011/0231868 A1* | 9/2011 | Martens ................ G06Q 30/02 725/13 |
| 2011/0246661 A1 | 10/2011 | Manzari et al. |
| 2011/0288913 A1 | 11/2011 | Waylonis et al. |
| 2012/0084809 A1 | 4/2012 | Schultz |
| 2012/0110616 A1 | 5/2012 | Kilar et al. |
| 2012/0110620 A1* | 5/2012 | Kilar ..................... G06Q 30/02 725/34 |
| 2012/0309515 A1* | 12/2012 | Chung .................. H04N 21/274 463/31 |
| 2013/0051755 A1 | 2/2013 | Brown et al. |
| 2013/0165164 A1 | 6/2013 | Rowe |
| 2013/0211879 A1 | 8/2013 | Holland |
| 2013/0211924 A1 | 8/2013 | Yuill et al. |
| 2013/0212611 A1 | 8/2013 | Van Aacken et al. |
| 2013/0247096 A1* | 9/2013 | Miller .................... G06Q 30/02 725/34 |
| 2013/0346599 A1 | 12/2013 | Wilson et al. |
| 2014/0031960 A1 | 1/2014 | Hill |
| 2014/0040935 A1 | 2/2014 | Gharachorloo et al. |
| 2014/0115115 A1 | 4/2014 | Kuang |
| 2014/0123006 A1 | 5/2014 | Chen et al. |
| 2014/0129347 A1 | 5/2014 | Pradeep |
| 2014/0282273 A1 | 9/2014 | Anderson |
| 2014/0336798 A1 | 11/2014 | Emerson |
| 2014/0351045 A1 | 11/2014 | Abihssira et al. |
| 2015/0026715 A1 | 1/2015 | Bernstein et al. |
| 2015/0074715 A1 | 3/2015 | Berger et al. |
| 2015/0262229 A1 | 9/2015 | Brenner et al. |
| 2015/0289025 A1 | 10/2015 | McLeod et al. |
| 2016/0050130 A1 | 2/2016 | Ljung et al. |
| 2016/0063533 A1 | 3/2016 | Shmueli et al. |
| 2017/0039029 A1 | 2/2017 | Mackiewicz et al. |

OTHER PUBLICATIONS

Office Action dated Sep. 8, 2015 issued by the United States Patent and Trademark Office on U.S. Appl. No. 14/586,732, 14 pages.
Office Action dated Mar. 14, 2016 issued by the United States Patent and Trademark Office on U.S. Appl. No. 14/586,728, 13 pages.
Office Action dated Jun. 15, 2016 issued by the United States Patent and Trademark Office on U.S. Appl. No. 14/586,732, 15 pages.
Office Action dated Nov. 22, 2016 issued by the United States Patent and Trademark Office on U.S. Appl. No. 14/586,728, 12 pages.
Office Action dated Dec. 30, 2016, issued by the United States Patent and Trademark Office on U.S. Appl. No. 14/586,732, 19 pages.
Office Action dated Feb. 9, 2017, issued by the United States Patent and Trademark Office on U.S. Appl. No. 14/586,753, 25 pages.
S. Cho et al., "Two-stage Recognition of Raw Acceleration Signals for 3-D Gesture-Understanding Cell Phones," Tenth International Workshop on Frontiers in Handwriting Recognition, Oct. 5, 2006, La Baule, France, Suvisoft, 7 pages.
Office Action dated Oct. 26, 2016 issued by the United States Patent and Trademark Office on U.S. Appl. No. 14/586,732, 3 pages.
Office Action dated Dec. 27, 2017 issued by the United States Patent and Trademark Office on U.S. Appl. No. 14/586,728, 14 pages.
Office Action dated Jan. 9, 2018, issued by the United States Patent and Trademark Office on U.S. Appl. No. 14/586,732, 19 pages.
Office Action dated Jan. 22, 2018 issued by the United States Patent and Trademark Office on U.S. Appl. No. 14/586,756, 21 pages.
Office Action dated May 11, 2017 issued by the United States Patent and Trademark Office on U.S. Appl. No. 14/586,728, 13 pages.
Office Action dated Jun. 21, 2017 issued by the United States Patent and Trademark Office on U.S. Appl. No. 14/586,756, 22 pages.
Office Action dated Jun. 21, 2017 issued by the United States Patent and Trademark Office on U.S. Appl. No. 14/586,761, 20 pages.
Office Action dated Jun. 21, 2017, issued by the United States Patent and Trademark Office on U.S. Appl. No. 14/586,732, 19 pages.
Office Action dated Jul. 10, 2017 issued by the United States Patent and Trademark Office on U.S. Appl. No. 14/586,742, 20 pages.
Office Action dated Jul. 10, 2017 issued by the United States Patent and Trademark Office on U.S. Appl. No. 14/586,747, 15 pages.
Office Action dated Aug. 1, 2017 issued by the United States Patent and Trademark Office on U.S. Appl. No. 14/586,739, 19 pages.
Office Action dated Aug. 1, 2017 issued by the United States Patent and Trademark Office on U.S. Appl. No. 14/586,749, 20 pages.

(56) References Cited

OTHER PUBLICATIONS

Office Action dated Oct. 4, 2017 issued by the United States Patent and Trademark Office on U.S. Appl. No. 14/586,753, 22 pages.
United States Patent and Trademark Office, Office Action dated Jan. 24, 2018 for U.S. Appl. No. 14/586,724, 19 Pages.
United States Patent and Trademark Office, Office Action dated Feb. 20, 2018 for U.S. Appl. No. 14/586,739, 18 Pages.

* cited by examiner

| User/Device Information 383 | |
|---|---|
| User profile 384 | Media Device Context 385 |
| Username: SF_Mike | Username of logged in user: SF_Mike |
| Subject matter of ads interacted with by frequency:<br>1. Clothes<br>2. Energy drinks<br>3. Travel tours<br>4. Automobiles<br>: | Location Context:<br>1. Geographic location: San Francisco<br>2. Local weather: Partly Foggy<br>3. Local planned events: North Beach Festival<br>4. Local mood: Celebratory<br>: |
| Genre of media content streamed by frequency:<br>1. Indie Rock<br>2. French Pop<br>3. Classical<br>: | History of use of the device:<br>1. Location(s) where device most frequently used<br>2. Genre most frequently listened to on device<br>3. Tempo most frequently listened to on device<br>4. Subject matter of ads interacted with on device<br>: |
| Biographical Detail:<br>Male; 30-35; California, United States | Device Detail:<br>Smart phone |
| Interests:<br>Adventure Travel<br>: | : |

*FIGURE 11*

# SYSTEM AND METHOD FOR PROVIDING WATCH-NOW FUNCTIONALITY IN A MEDIA CONTENT ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY

This application claims the benefit of priority to U.S. Provisional Patent Application No. 61/976,359, titled "SYSTEM AND METHOD FOR PROVIDING WATCH NOW FUNCTIONALITY IN A MEDIA ENVIRONMENT", filed Apr. 7, 2014; and U.S. Provisional Patent Application No. 61/988,790, titled "SYSTEMS AND METHODS FOR DELIVERING MEDIA CONTENT WITH MUSIC-STYLED ADVERTISEMENTS", filed May 5, 2014; each of which above applications are herein incorporated by reference.

FIELD OF INVENTION

Embodiments of the invention are generally related to techniques for streaming digital media content, such as music or video content, and are particularly related to systems and methods for providing watch-now functionality in a media content environment.

BACKGROUND

Today's consumers enjoy the ability to access a tremendous amount of media content, such as music and videos, at any location or time of day, using a wide variety of media devices. With the availability of reliable high-speed Internet connectivity, and advances in digital rights management, users can stream media content, on demand, from peer devices or remote media servers. For example, a connected media environment or platform allows a user to select which of several media devices should be used to play a particular media content, such as streaming a selected song to a particular audio speaker, or streaming a selected movie to a particular television.

With such availability, there is an interest in providing additional media content which can be tailored to particular users or environments. These are examples of the types of media environments in which embodiments of the invention can be used.

SUMMARY

In accordance with various embodiments, described herein are techniques for streaming digital media content, such as music, video, or television content, and providing additional media content, such as advertisement or other sponsor-directed content. In accordance with an embodiment, the system includes support for watch-now functionality. A media play logic at a media device controls playback of media content and advertisements as received from a media server, and can be configured for regular media play, or extended media play. Periodically, for example when input is received from a user to skip to a next media option for playback, the user can be prompted to watch an advertisement, in return for extended media play. Upon receiving an election by the user to watch the advertisement in return for extended media play, the media application plays the advertisement, and configures the media play logic for an extended period of advertisement-free media play.

BRIEF DESCRIPTION OF THE FIGURES

FIG. 11 illustrates an exemplary user/device information, in accordance with an embodiment.

DETAILED DESCRIPTION

Figure 1:
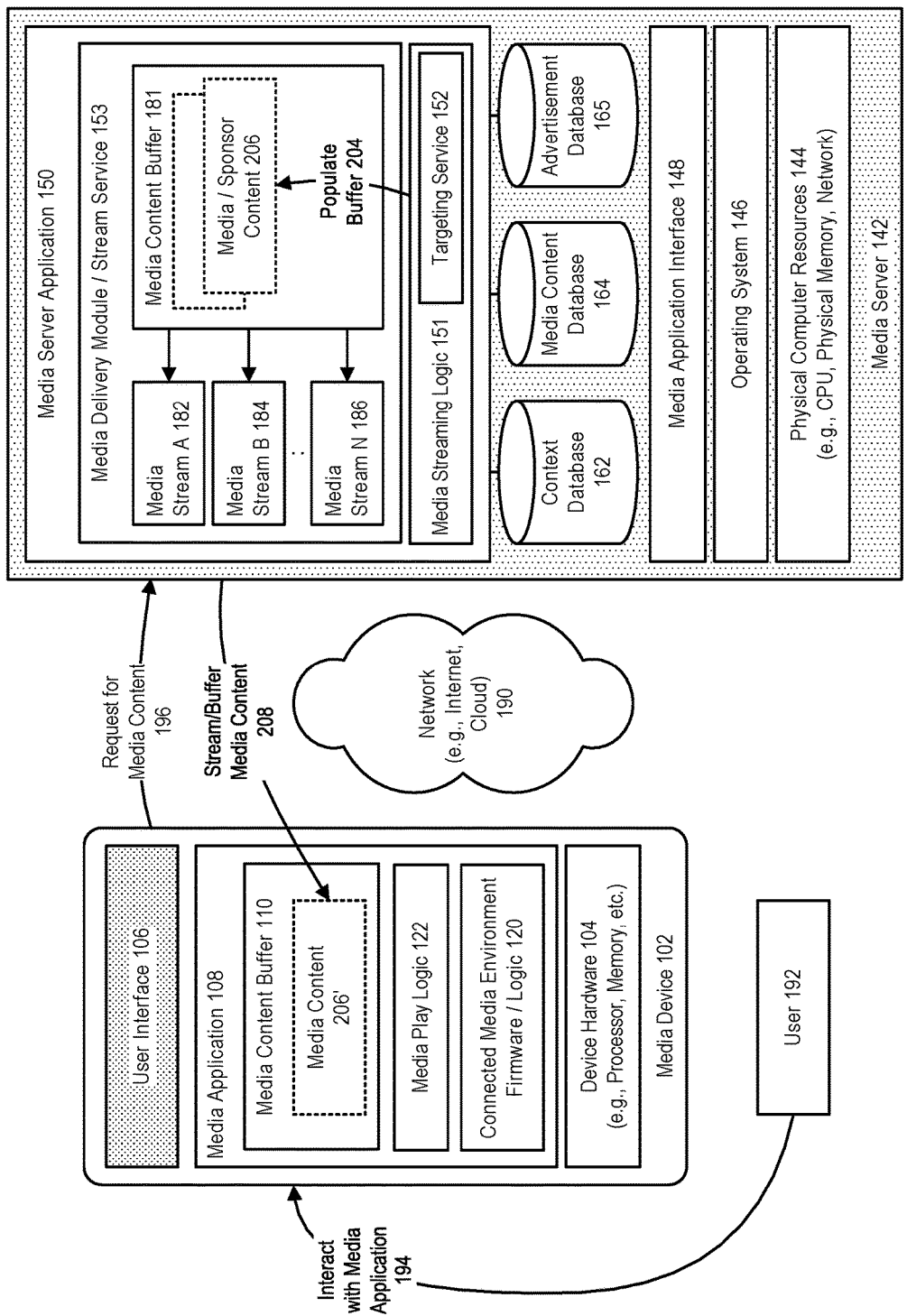
FIG. 1 illustrates an example of a digital media environment, in accordance with an embodiment.

As described above, today's consumers enjoy the ability to access a tremendous amount of media content, such as music and videos, at any location or time of day, using a wide variety of media devices. With the availability of reliable high-speed Internet connectivity, and advances in digital rights management, users can stream media content, on demand, from peer devices or remote media servers. For example, a connected media environment or platform allows a user to select which of several media devices should be used to play a particular media content, such as streaming a selected song to a particular audio speaker, or streaming a selected movie to a particular television.

With such availability, there is an interest in providing additional media content which can be tailored to particular users or environments. To address this, in accordance with various embodiments, described herein are techniques for streaming digital media content, such as music, video, or television content, and for providing additional media content, such as advertisement or other sponsor-directed content.

In accordance with an embodiment, the system includes support for providing music-styled advertisement or other sponsor-directed content. Metadata describes media content that can be streamed or otherwise provided to a user's media device. A media streaming logic and targeting service analyzes a playing media content, and selects advertisements for delivery in conjunction with that content. For example, the system can determine a genre, tempo, or mood of music being streamed during a session, and select advertisements targeted to a style of music. Information associated with the user, for example their location, can be used to predict their mood, and select appropriate advertisements. Advertisements can also be selected based on an analysis of, for example, a playlist description or a song lyrics.

In accordance with another embodiment, the system includes support for watch-now functionality. A media play logic at a media device controls playback of media content and advertisements as received from a media server, and can be configured for regular media play, or extended media play. Periodically, for example when input is received from a user to skip to a next media option for playback, the user can be prompted to watch an advertisement, in return for extended media play. Upon receiving an election by the user to watch the advertisement in return for extended media play, the media application plays the advertisement, and configures the media play logic for an extended period of advertisement-free media play.

In accordance with another embodiment, the system includes support for selection of targeted advertisement or other sponsor-directed content based on a playlist context. A media device enables access by a user to one or more playlists of media content at a media server. Advertisements can be selected for providing to the user, based on one or more characteristics of a playlist, such as the playlist's description, or the playlist being part of an advertisement campaign. For example, a playlist bearing a particular descriptive title can be used to trigger advertisements that may be relevant to that descriptive title. Adding a particular song to a playlist can be used to trigger advertisements that may be relevant to that song.

In accordance with another embodiment, the system includes support for delivery of media content with enhanced user-sponsor interaction. User interaction with a media device can be provided by, for example, voice or tactile command, in addition or as an alternative to the device's regular user interface. For example, a user can interact with an advertisement or other sponsor-directed content, by speaking to or shaking their device, to signal a preference for a particular type of content or advertisement. As another example, a spoken or shaking action can be used to trigger or to pause an advertisement break within a media stream, so that the user can control advertisement breaks to better suit their particular lifestyle.

In accordance with another embodiment, the system includes support for delivery of media content and advertisement or other sponsor-directed content across a connected media environment. Playback can selectively follow a user from one location to another location, or from one media device to another media device, either maintaining a same session or switching sessions depending on the user's location, media device used, and user activity. Playback of advertisement or other sponsor-directed content can be synchronized between different areas of the connected media environment, or between different media devices, for example between a secondary device such as an audio speaker in a particular room, which is being controlled by a primary device such as a smartphone in another room.

These and other embodiments are described in further detail herein. Additional modifications and variations will be apparent to the practitioner skilled in the art.

Introduction to Connected Media Environments

In accordance with an embodiment, a connected media environment allows users to select which of several media devices should be used to stream, play, or otherwise access a particular media content. For example, a user may wish to stream a selected song to a particular audio speaker device to be played thereon, or stream a selected movie to a particular television device.

In some connected media environments, the user can control playback of media content at a first media device, for example an audio speaker or television, using a second media device, for example a smartphone. Each media device can be associated with a user account or other form of identification which allows a backend media server to recognize various media devices as potential destinations for streaming media content. A user media-access request, to stream, play, or otherwise access a particular media content can be associated with an appropriate destination device at which that media content should be streamed, played or otherwise accessed.

For example, a smartphone associated with a particular user account can be used to send a "next song" command as a media-access request to a media server, to cause a particular song to be played at a destination audio speaker similarly associated with that user account. The media server can then stream the corresponding song to that audio speaker. Commands can be similarly used, for example, to pause, replay, skip, or otherwise control access to songs or to other media content by the destination device.

An example of a connected media environment is the "Spotify Connect" environment, which is generally used herein as an illustrative example in accordance with an embodiment. In accordance with other embodiments, the features and techniques described herein can also be used with other types of connected media environment.

FIG. 1 illustrates an example of a digital media environment, in accordance with an embodiment.

As shown in FIG. 1, in accordance with an embodiment, a media device 102, operating as a client, can receive and play media content provided by a media server 142 operating as a backend server system, or by another system or peer device.

In accordance with various embodiments, the media device can be, for example, a personal computer system, handheld entertainment device, tablet device, smartphone, television, audio speaker, in-car entertainment system, or other type of electronic or media device that is adapted or able to prepare, control the presentation of, and/or play media content, for example, music, video, or television content.

In accordance with an embodiment, each of the media device and the media server can include, respectively, one or more physical device or computer hardware resources 104, 144, such as one or more processors (CPU), physical memory, network components, or other types of hardware resources.

Although, for purposes of illustration, a single media device and media server are shown in FIG. 1, in accordance with an embodiment, a particular media server can support the simultaneous use of a plurality of client media devices.

Similarly, in accordance with an embodiment, a particular media device can be used to access media content, or switch between media streams, provided by a plurality of media servers.

In accordance with an embodiment, a media device can optionally include a user interface 106, which is adapted to display media options, for example as an array of media tiles, thumbnails, or other format, and to determine a user interaction or input. Selecting a particular media option from the user interface, for example a particular media tile or thumbnail, can be recognized as a command by the user and/or the media device, to the media server, to download, stream or otherwise provide access to a corresponding particular media content item.

In accordance with an embodiment, the media device can include a media application 108, together with an in-memory media content buffer 110, and media play logic 122, which controls the playback of media content received from the media server, for playing either at a requesting client device (i.e., a controlling device), or at a controlled client device (i.e., a controlled device), in the manner of a remote control.

In accordance with an embodiment, a connected media environment firmware or logic 120 enables the media device to participate within a connected media environment, for example a Spotify Connect environment generally described herein by way of illustration. In accordance with other embodiments, other types of connected media environment firmware or logic can support other types of connected media environment.

In accordance with various embodiments, the media application can be provided, for example, as a user-installable software application (app), web application, or as another form of software component.

In accordance with an embodiment, the media content buffer enables a portion of particular media content items, or samples thereof, to be pre-buffered at a media device. For example, while media options are being prepared for display on the user interface as media tiles or thumbnails, their related media content received from the media server can be pre-buffered at the same time, and cached within the media content buffer at the client media device, for prompt and efficient playback when required.

In accordance with an embodiment, the media server can be provided at a computer system, including an operating system 146 or other processing environment which supports execution of a media server application 150 that can be used, for example, to stream music, video, or other forms of media content to a media device. The media server can provide a subscription-based media streaming service, for which a user or client media device can have an associated account and credentials, which enables that user's media device to communicate with and to receive media content from the media server, in the form of media-access requests.

In accordance with an embodiment, a media-access request received from a client media device can include an identifying information, for example a network address, which identifies a destination device to which the media server should stream or otherwise provide access to media content, in response to processing that media-access request.

For example, a user may own several media devices, such as one or more smartphones or audio speakers, which are adapted or able to prepare, control the presentation of, and/or play a media content received from a media server.

In accordance with an embodiment, the identifying information provided with a particular media-access request can include a media device identifier, such as an Internet (IP) address, machine (MAC) address, device name, or other form of identification which identifies that a particular media-access request is communicated by and/or is intended for use with, a particular destination device.

This allows a user, for example, to use a smartphone as a controlling device, and to indicate an audio speaker as a controlled device, to which media content should be sent. In such example, the media server can then send the requested media and/or forward the media-access request to the audio speaker, to be further processed thereby, even though the request originated at the user's smartphone. A similar approach can be used with other types of media device.

In accordance with an embodiment, a media application interface 148 at the media server can receive requests from client media devices, or from other systems, to retrieve media content from the media server.

In accordance with an embodiment, a context database 162 at the media server can store data associated with the presentation of media content by a particular client media device, such as, for example, a current position within a media stream that is being presented by that device, or a playlist associated with the media stream, or one or more previously-indicated user playback preferences. The media server can transmit context information associated with a particular media stream, to a media device presenting that stream, so that the context information can be further used by the media device, and/or displayed to the user.

For example, in accordance with an embodiment, when the destination media device to which a particular media content is being streamed changes—say, from one of a controlling device to a controlled device, or from a first controlled device to a second controlled device—then the media server can transmit context information associated with an active media content stream, to the newly-appointed destination device, for subsequent use by that newly-appointed device in playing or otherwise accessing the particular media content.

In accordance with an embodiment, a media content database 164 can include media content such as, for example, one or more music, songs, videos, movies, or other types of media content, together with a metadata describing that media content. As described below, in accordance with an embodiment, the metadata can be used by the system to enable users, client media devices, and other entities, to search within one or more repositories of media content, to locate particular media content items. As further described below, in accordance with an embodiment, the metadata can also be used by the system to support features such as the providing of music-styled advertisement or other sponsor-directed content.

In accordance with an embodiment, an advertisement database 165 can include additional media content, for example advertisement or other sponsor-directed content, that can be similarly streamed or otherwise provided to a user's media device in conjunction with or as part of a media content stream.

Although FIG. 1 illustrates an embodiment in which the media content database and/or advertisement database can be provided within a same system as the media server and the media server application; in accordance with other embodiments, the media content database and advertisement database can be provided at a different system, such as at an associated database or third-party database, or at an external or third-party media content or advertisement server.

In accordance with an embodiment, a media streaming logic 151 at the media server can be used to retrieve or otherwise provide access to media content items, in response to requests from client media devices or other systems.

In accordance with an embodiment, a targeting service 152 can be used, as further described below, to determine an appropriate advertisement or other sponsor-directed content, which is/are to be combined or otherwise associated with a particular stream or session of media content playback. The media streaming logic can then populate a media content buffer 181, at a media delivery module or stream service 153, with streams 182, 184, 186 of corresponding media content data, including advertisement or other sponsor-directed content as appropriate, which can then be returned to the requesting media device, or to a controlled device.

In accordance with an embodiment, a plurality of client media devices and media servers can communicate with one another using a network, for example the Internet 190, a local area network, a peer-to-peer connection, a wireless or cellular network, or other form of network.

In accordance with an embodiment, a user 192 can interact 194 with the media application at a media device, for example using the user interface, and issue requests to access media content, such as the playing of a selected music or video item at their media device or at a controlled device, or the streaming of a media channel or video stream to their media device or to a controlled device.

For example, in accordance with an embodiment, the user's selection of a particular media option can be communicated 196 to the media server, via its media application interface. In response, the media server can populate 204 its media content buffer, with corresponding items of media/sponsor-directed content 206, for example as one or more streams of media content and/or advertisement or other sponsor-directed content. The media server can then communicate 208 the selected media content to the user's media device, or to the controlled device as appropriate, where optionally it can be buffered (206') in the media content buffer, for subsequent playing at the device.

Figure 2:
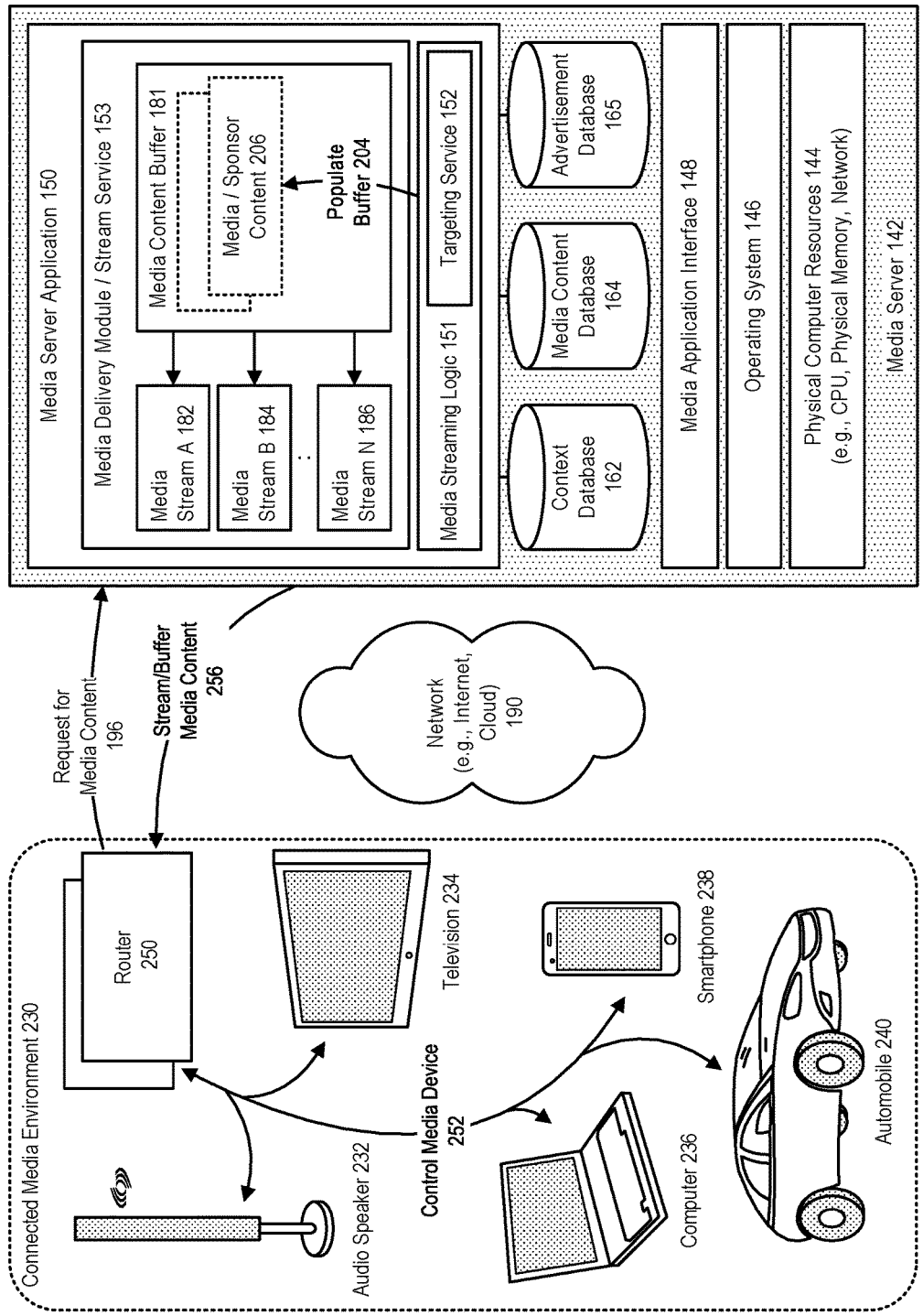
FIG. 2 illustrates an example of a connected media environment, in accordance with an embodiment.

FIG. 2 illustrates an example of a connected media environment, in accordance with an embodiment.

As shown in FIG. 2, in accordance with an embodiment, a connected media environment 230, for example a Spotify Connect environment, can include one or more routers 250 that enables communication between the connected media environment and the one or more media devices therein, and a media server.

Examples of the types of media device that can be provided within a connected media environment include an audio speaker 232, television 234, computer 236, smartphone 238, and in-car entertainment system 240, or other types of media device that can be used to stream, play, or otherwise access a particular media content.

In accordance with an embodiment, a media device having an application user interface can act as a controlling device, to control 252 the playback of media content at a controlled device. Each media device can communicate with a server-side access point, either for its own use in accessing media content, and/or for use by other client media devices within the connected media environment. In this manner, each access point acts as a connection from one or more media devices to the backend media server.

As described above, in accordance with an embodiment, a controlled device can also include a media application, which in the case of an audio speaker, television or similar device can be included either within the device itself, for example as a firmware logic, or within a separate set-top box or other type of after-market device.

As also described above, in accordance with an embodiment, a user can interact with the user interface at a client media device, and issue requests to access media content, for example the playing of a selected music or video item at the requesting device or at a controlled device, or the streaming of a media channel or video stream to the requesting device or to a controlled device.

For example, a user can request that media content be buffered, streamed or received for playing at a controlling client media device such as a smartphone, and simultaneously buffered, streamed or received for playing at one or more controlled devices, such as an audio speaker.

As another example, the user can issue a media-access request to change a media channel for playback within their connected environment, in response to which the media server can switch the media channel at, say, a controlled device, and thereafter continue to stream or buffer media content 256 for the switched channel, to that controlled device.

As described above, in some instances, a portion of the media content can be pre-buffered at the controlled device, which enables channel switching at the controlled device to operate in a more seamless manner.

Figure 3:
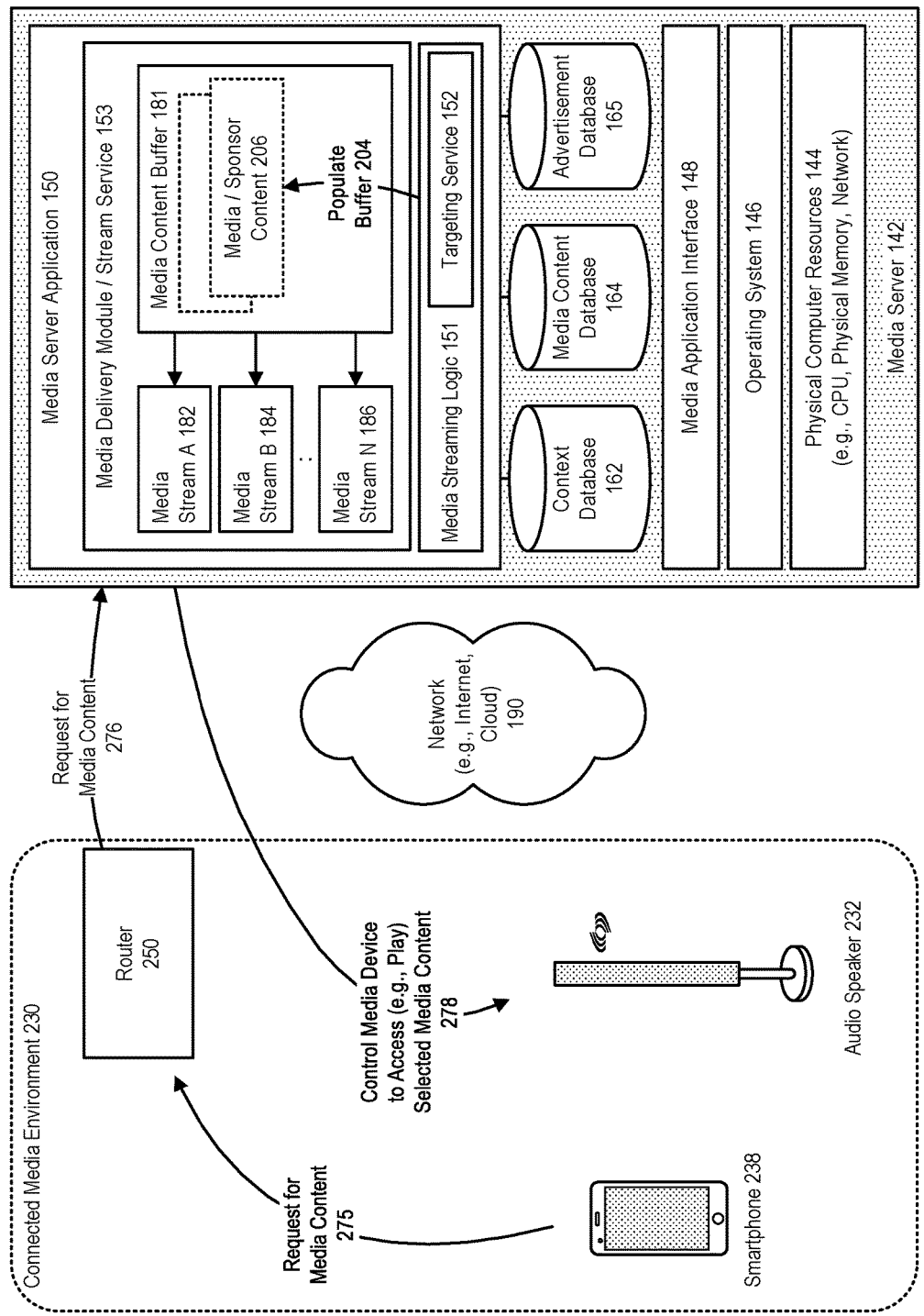
FIG. 3 further illustrates an example of a connected media environment, in accordance with an embodiment.

FIG. 3 further illustrates an example of a connected media environment, in accordance with an embodiment.

As shown in FIG. 3, in accordance with an embodiment, a user can utilize, for example, a smartphone in combination with an audio speaker, to issue a media-access request 275 from the smartphone to the media server, for example to change a media channel at the audio speaker.

In accordance with an embodiment, the media-access request can be received by an appropriate access point, and communicated to the media server as a request for media content 276. The media server can then respond by controlling the destination device, in this example the audio speaker, to download, stream or otherwise provide access to the selected media content 278.

As described above, in accordance with an embodiment, a media device, for example a smartphone as illustrated in FIG. 3, can communicate with a server-side access point, either for its own use in accessing media content, and/or for use by other client media devices within the connected media environment.

Figure 4:
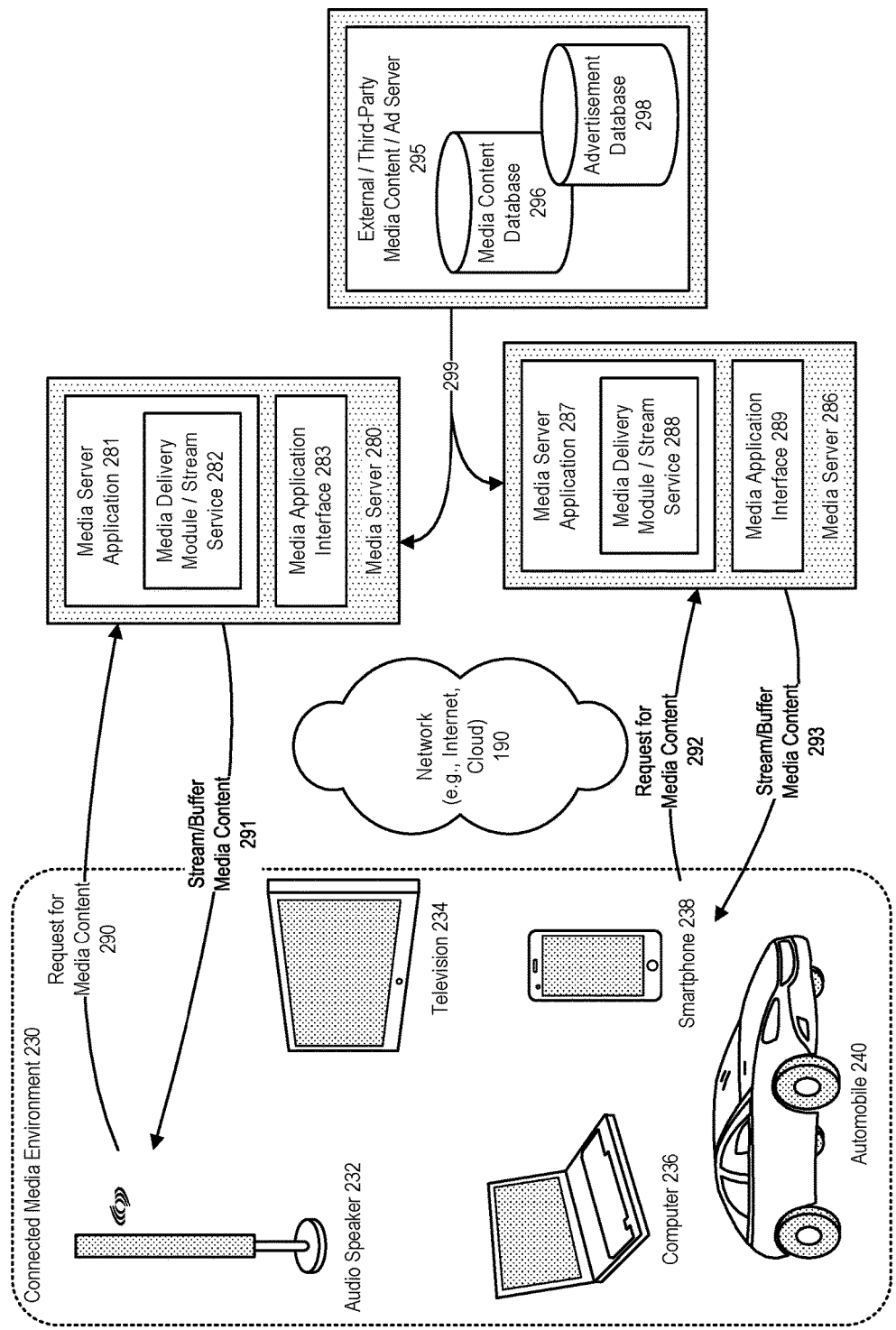
FIG. 4 further illustrates an example of a connected media environment, in accordance with an embodiment.

FIG. 4 further illustrates an example of a connected media environment, in accordance with an embodiment.

As shown in FIG. 4, in accordance with an embodiment, client media devices within the connected media environment can access media content provided by a plurality of media servers 280, 286, each including a media server application 281, 287, media delivery module or stream service 282, 288, and media application interface 283, 289, as generally described above.

As described above, in accordance with various embodiments, each client media device can issue a media-access request 290, 292, to request media content which can then be streamed or buffered 291, 293 at the requesting device, or at a controlled device.

As further described above, in accordance with various embodiments, media content, and advertisement or other sponsor-directed content, can be provided within the same system as the media server and media server application.

Alternatively, a media content database 296 and/or advertisement database 298 can be provided at an associated database or third-party database, or at an external/third-party media content or advertisement server 295 that is accessible 299 to the media servers.

Music-Styled Content

In accordance with an embodiment, the system includes support for providing music-styled advertisement or other sponsor-directed content. Metadata describes media content that can be streamed or otherwise provided to a user's media device. A media streaming logic and targeting service analyzes a playing media content, and selects advertisements for delivery in conjunction with that content. For example, the system can determine a genre, tempo, or mood of music being streamed during a session, and select advertisements targeted to a style of music. Information associated with the user, for example their location, can be used to predict their mood, and select appropriate advertisements. Advertisements can also be selected based on an analysis of, for example, a playlist description or a song lyrics.

In accordance with an embodiment, a media style repository can be used to store analytical and/or descriptive metadata describing items of media content, for use in determining both a style of media content being accessed by, or otherwise provided to, a user, and an appropriate advertisement or other sponsor-directed content.

In accordance with various embodiments, the media style repository can be provided either within a memory or database of the media server itself, or alternatively can be provided external to the media server at an associated database or third-party database.

In accordance with an embodiment, a media streaming logic, in combination with a targeting service, as described above, can use the metadata associated with a stream of media content, to determine an advertisement or other sponsor-directed content which a user may find particularly appealing.

For example, in accordance with an embodiment, the media streaming logic can be configured to select advertisements that appear most appropriate to a tempo, genre, mood, lyrics, or other characteristics of a media content currently being provided in a media stream during a session by a particular user.

By way of illustrative example, in accordance with an embodiment which includes streaming of music content, when a tempo metadata is known for a currently-playing music content, the tempo of the music selected by and currently being provided in a media stream to the user can be determined by the system in real time, or during a period of play. Alternatively, the music content can be pre-analyzed to determine its tempo, and the resultant analysis stored as a tempo metadata. Such metadata can be later used by the media streaming logic and targeting service to select an advertisement or other sponsor-directed content that is most relevant to that music tempo.

Similarly, as another illustrative example, when a genre metadata, or a mood metadata, is already known for a music content, the genre or mood of the music selected by and currently being provided in a media stream to the user can be determined by the system in real time, or pre-analyzed and its analysis stored as metadata that can be later used by the media streaming logic and targeting service to select an advertisement or other sponsor-directed content that is most relevant to the genre or mood respectively of the streamed music.

Such analysis enables, for example, sponsor-directed content such as advertisements, which seem most appropriate in style to the tempo, genre, or mood of the music selected by and currently being provided in a media stream to the user, to be selected by the system for injection or insertion into the media stream.

In accordance with an embodiment, a cumulative tempo, genre, or mood of the media content items being streamed during a particular user session can be used.

For example, in accordance with an embodiment, during a particular session that includes a selection of media content being streamed to the user, the system can perform an analysis of the tempos, and any weights assigned to the tempos, of the various music selections that the user is receiving during that session. A cumulative tempo of the music can be determined as being applicable to that particular session. Appropriate advertisement or other sponsor-directed content can then be determined by the system and streamed during the particular session to the user, in accordance with such cumulative analysis.

Similarly, in accordance with an embodiment, the cumulative genre or mood of the music streamed can be analyzed, and the result of such analysis can be used by the system to select an appropriate advertisement or other sponsor-directed content.

In accordance with an embodiment, additional information associated with a particular user or their media device, for example their physical geographic location, can be used to predict the user's likely mood, and select appropriate advertisements.

For example, in accordance with an embodiment, information such as the current weather at the geographic location associated with a media device's Internet address receiving streamed media content, or other location-related user information, can be analyzed and stored as additional metadata, for use in selecting advertisement or other sponsor-directed content. Such location, weather, or other information can be used to select, for example, advertisements and/or additional music which the system determines may be most relevant to that user.

In accordance with an embodiment, advertisement or other sponsor-directed content can also be selected based on an analysis of keywords within a playlist description, or within a song's lyrics.

For example, in accordance with an embodiment, the text of playlist names or descriptions can be searched, and keywords discovered by the system through an analysis of such searches can be used to target advertisement or other sponsor-directed content to be streamed to the user.

Similarly, an analysis of the media stream can determine keywords and or lyrical information, such as the number of times a keyword is registered within a particular period of time. When the system determines that the number of instances exceeds a certain number or threshold in a given session, one or more appropriate contextual and relevant advertisements can be streamed to the user.

Figure 5:
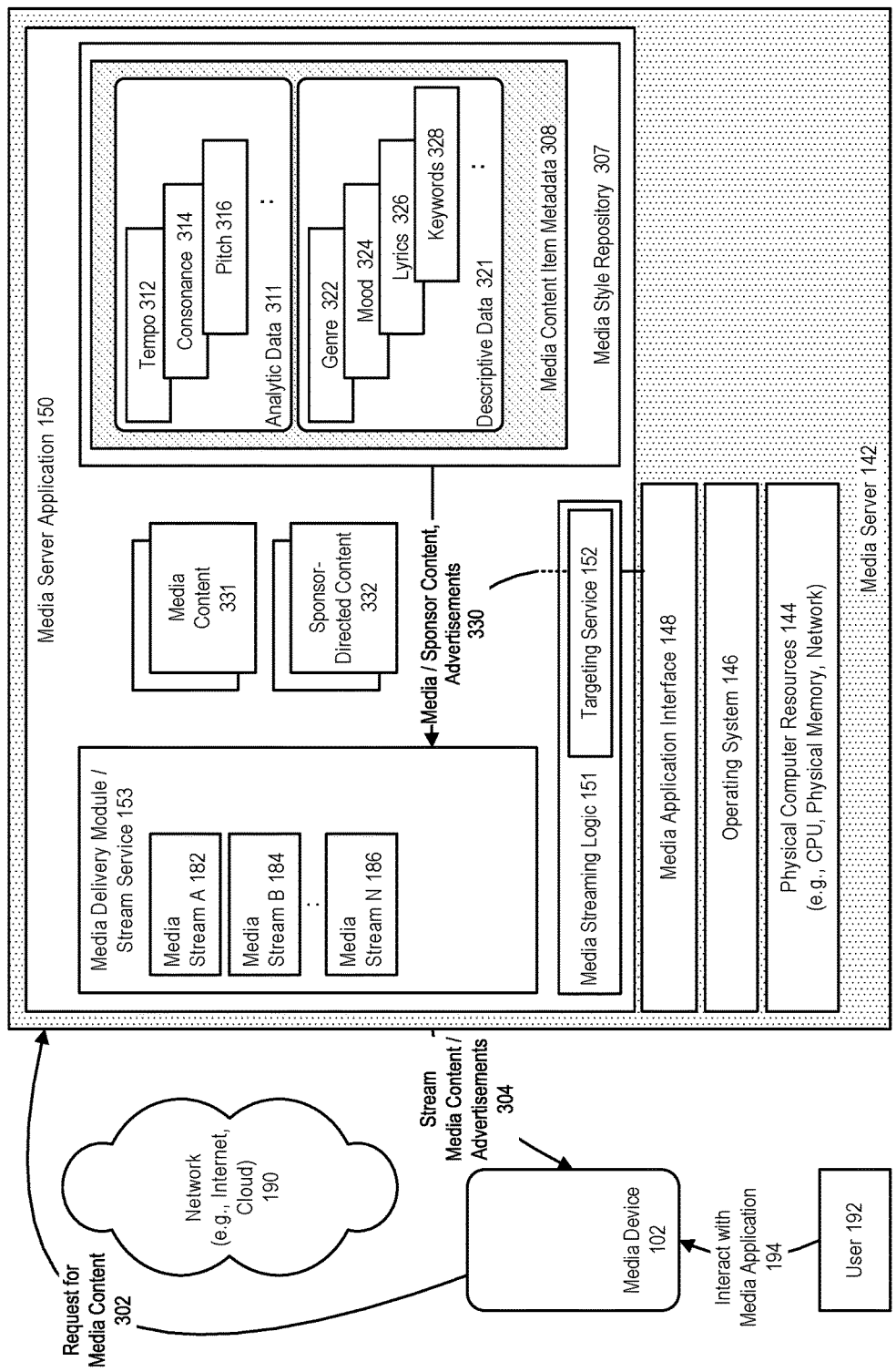
FIG. 5 illustrates a system that supports selection of music-styled sponsor-directed content or advertisements, for insertion into a media stream, in accordance with an embodiment.

FIG. 5 illustrates a system that supports selection of music-styled sponsor-directed content or advertisements, for insertion into a media stream, in accordance with an embodiment.

As shown in FIG. 5, in accordance with an embodiment, a media device can be used to request 302 media content from a media server, and to receive streamed media content, including sponsor-directed content or advertisements 304, as generally described above.

In accordance with an embodiment, the media server can include a media style repository 307 that stores media content item metadata 308 associated with different items of media content, for use in providing music-styled and/or contextual information about the media content.

For example, in accordance with an embodiment, a media content item metadata can include, for a particular item of media content, an analytic data 311, such as a tempo metadata 312, consonance metadata 314, or pitch metadata 316, which describes those characteristics of that particular item of media content. In accordance with an embodiment, a media content item metadata can also include, for a particular item of media content, a descriptive data 321, such as a genre metadata 322, mood metadata 324, lyrics metadata 326, keywords 328, or other characteristics of the particular item of media content.

As described in further detail below, the media streaming logic can determine 330 an appropriate media content, such as sponsor-directed content or advertisements, for streaming within a particular session, including one or more items of media content 331 and sponsor-directed content, for example advertisements 332.

Figure 6:
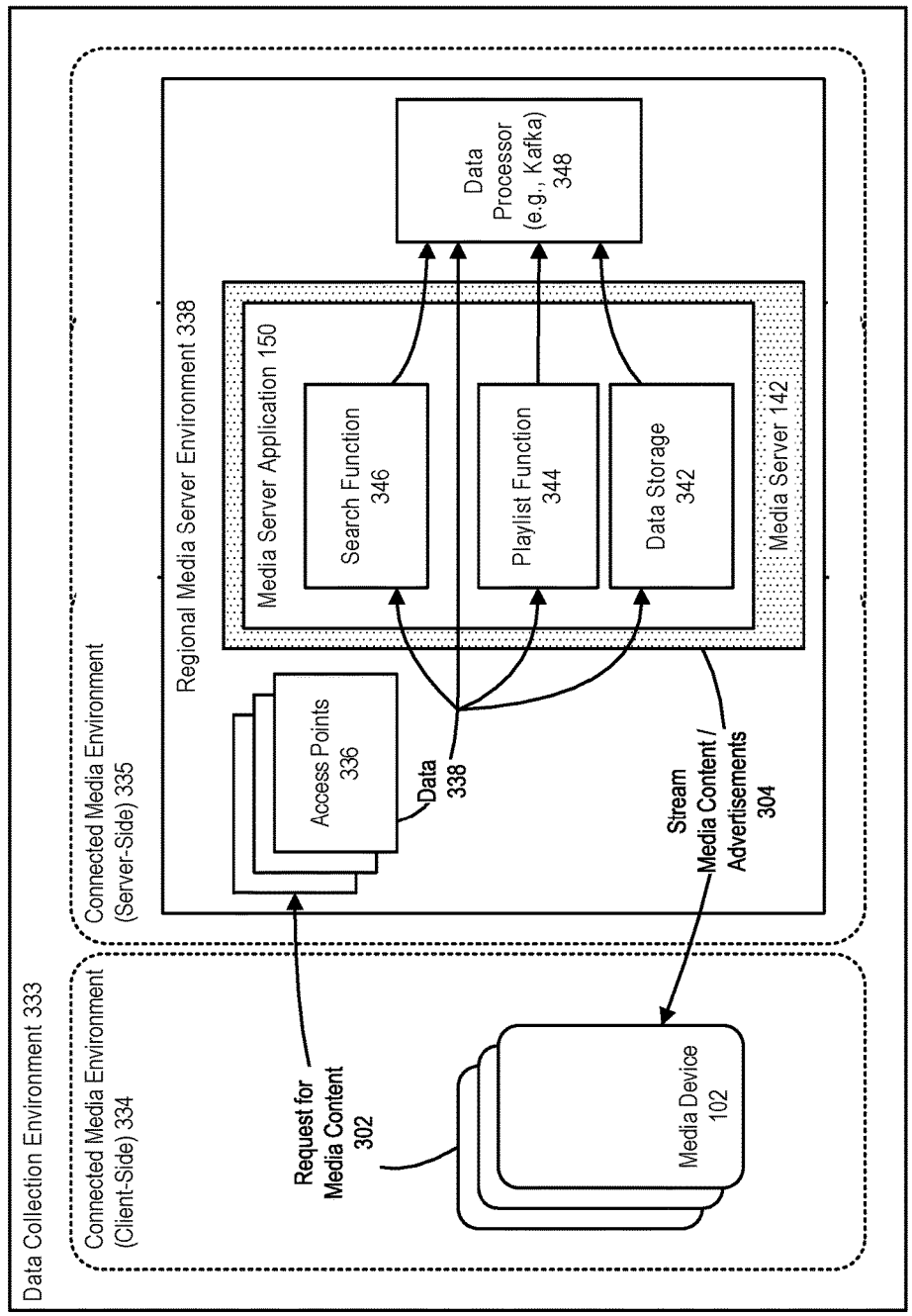
FIG. 6 illustrates a data collection environment, in accordance with an embodiment.

FIG. 6 illustrates a data collection environment, for use within a system for selection of music-styled sponsor-directed content or advertisements, in accordance with an embodiment.

As described above, in accordance with an embodiment, a connected media environment, for example a Spotify Connect environment, can include a server-side access point that enables communication between the connected media environment and a media server.

As shown in FIG. 6, in accordance with an embodiment, a data collection environment 333 enables collection of usage data from one or more connected media environments, each including a client-side 334, and a server-side 335 that provides access points 336. While the user uses a media server within a regional media server environment 339, for example by interacting with a media content data storage 342, a playlist function 344, or a search function 346, to retrieve, play, stream, or otherwise access media content items, a usage data 338 can be collected.

In accordance with an embodiment, information regarding the usage data can be communicated to a data processor 348 such as, for example, an Apache Kafka instance. In accordance with other embodiments, other types of data processor can be used.

Figure 7:
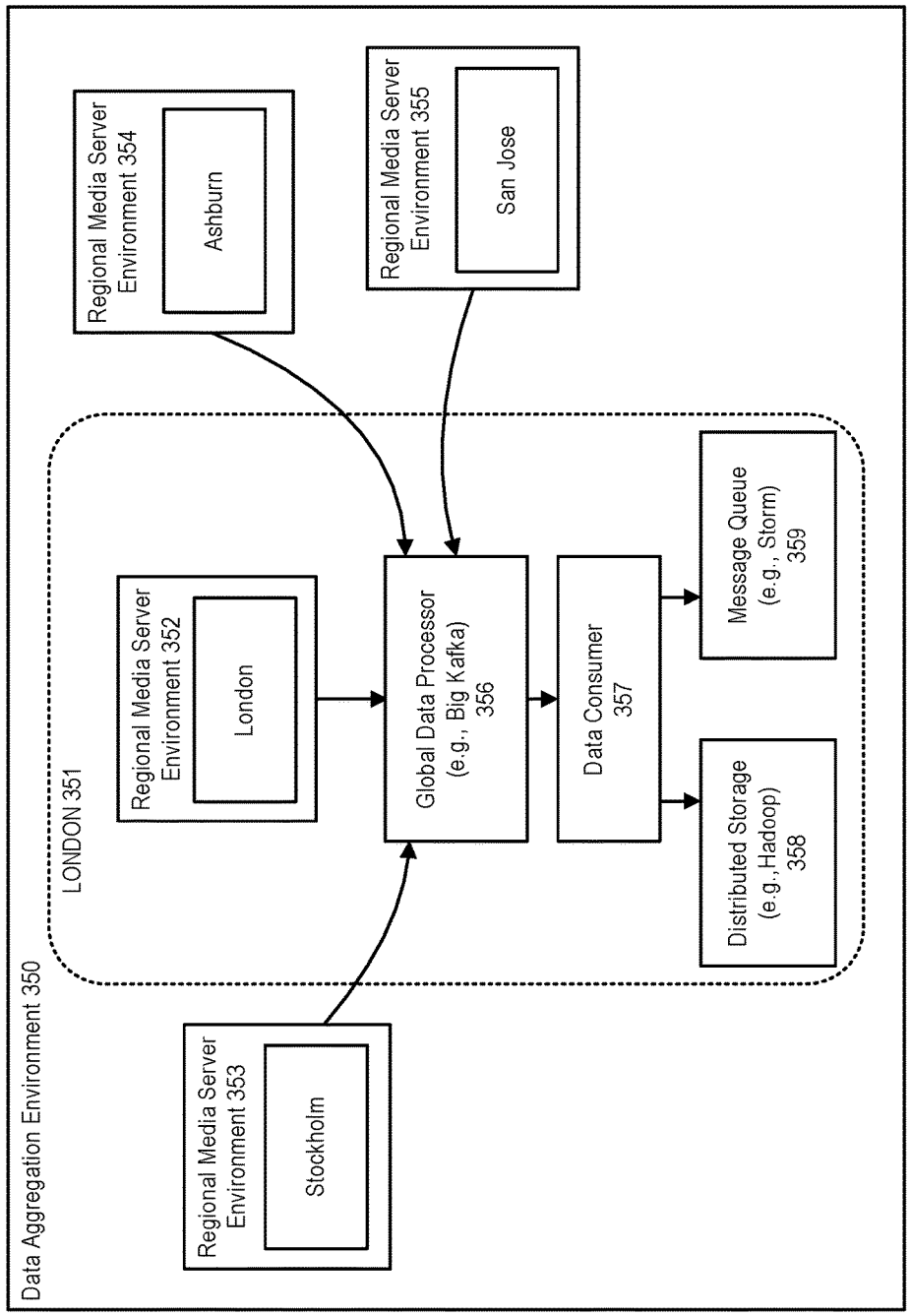
FIG. 7 illustrates a data aggregation environment, in accordance with an embodiment.

FIG. 7 illustrates a data aggregation environment, for use within a system for selection of music-styled advertisement or other sponsor-directed content, in accordance with an embodiment.

As described above, a data collection environment enables collection of usage data from connected media environments and access points while the user uses a media server to retrieve or otherwise access media content items. As shown in FIG. 7, in accordance with an embodiment, a data aggregation environment 350 enables usage data to be aggregated at a particular region (e.g., London 351) which includes a regional media server environment for providing media content 352, and is capable of receiving usage data from other regional media server environments globally (e.g., Stockholm 353, Ashburn 354, or San Jose 355).

In accordance with an embodiment, the system can use a global data broker 356 such as, for example, a Kafka instance, to broker the data to one or more data consumers 357 such as, for example, a Hadoop 358 distributed storage environment, or a Storm message queue 359. In accordance with other embodiments, other types of data brokers and data consumers can be used.

Figure 8:
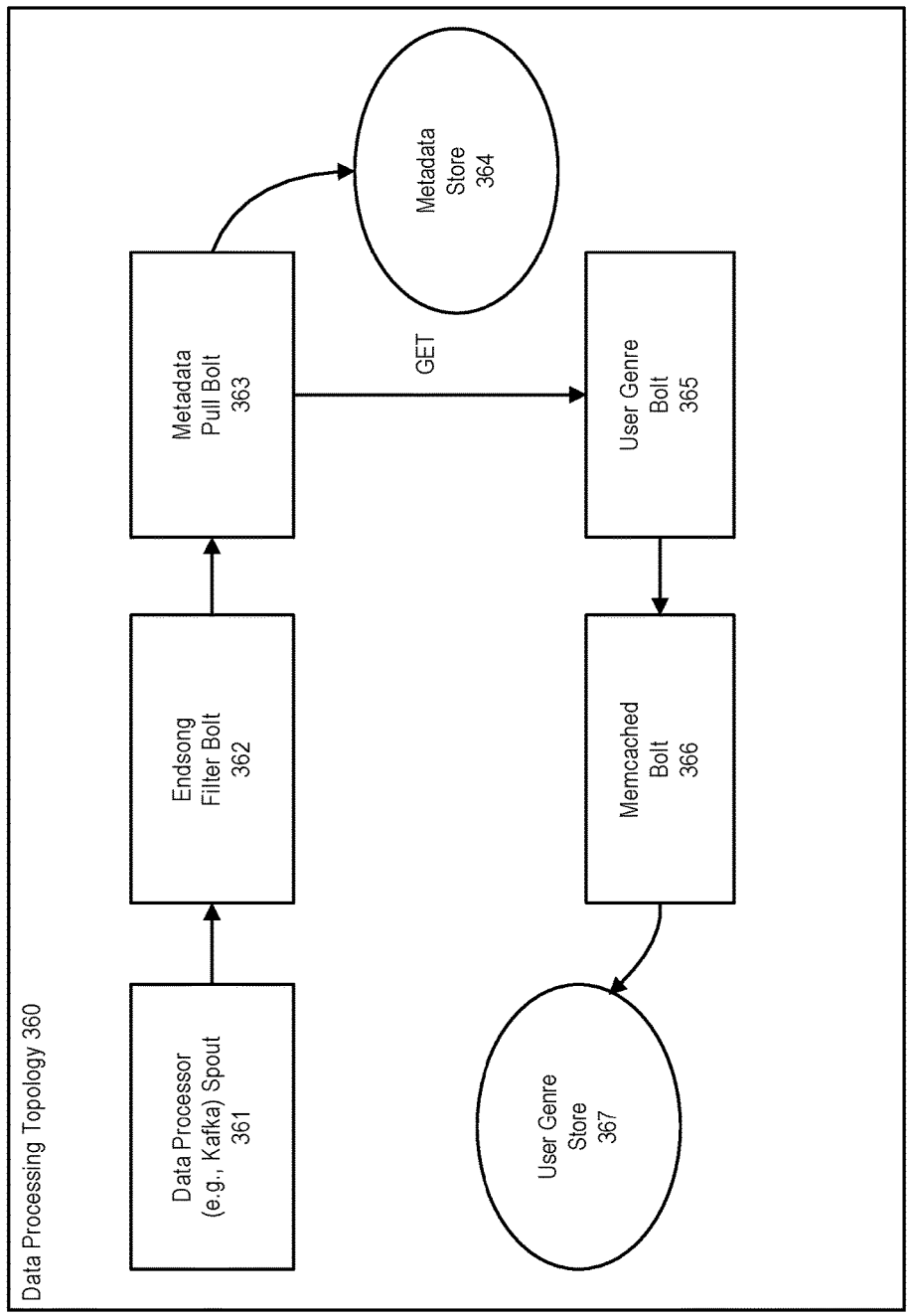
FIG. 8 illustrates a data processing topology, in accordance with an embodiment.

FIG. 8 illustrates a data processing topology, for use within a system for selection of music-styled advertisement or other sponsor-directed content, in accordance with an embodiment.

As shown in FIG. 8, in accordance with an embodiment, in a data processing topology 360, a distributed real-time computation system, such as a Storm message queue, can be used to process streaming media content data, for example through the use of spouts and bolts to define information sources and manipulations that allow batch, distributed processing of streaming data.

In such a topology, each spout can read from a queuing broker, such as a Kafka instance acting as a data broker as described above; while each bolt can process a number of input streams and produce a number of new output streams, incorporating functions such as filters, streaming joins, streaming aggregations, and communication with databases.

For example, in accordance with an exemplary embodiment, a Kafka spout 361 can be configured to stream data to an endsong filter bolt 362, which is configured to discard certain data tuples, for example those that are too short, those of certain platforms, local tracks, and those of certain regions.

In accordance with an exemplary embodiment, a metadata pull bolt 363 can be configured to obtain metadata for a streaming media content (for example, using a tuple.getStringByField("trackURI")), append fields in an output tuple, and output data to a metadata store 364, (using an outputFieldsDeclarer.declareStream("genres", new Fields ("username", "genre")).

In accordance with an embodiment, a user genre bolt 365 can be configured to emit a top genre for the user for each event, including maintaining a weighted genre map. a MemCached bolt 366 processes the stream, and a user genre 367 can be stored, for example, as metadata for a particular session.

Such functionality can be used as described above, to determine the genre or mood of the music selected by and currently being provided in a media stream to the user, either in real time, or by pre-analysis, so that its metadata can be later used by the media streaming logic and targeting service to select an advertisement or other sponsor-directed content that is most relevant to that genre or mood respectively. Similar functionality can be performed to determine mood, tempo, or other data that may be useful in characterizing a particular media content.

Although the above example illustrates the use of Kafka, Storm and Hadoop, to process large amounts of usage data, in accordance with various embodiments, other forms of data processors can be used.

Figure 9:
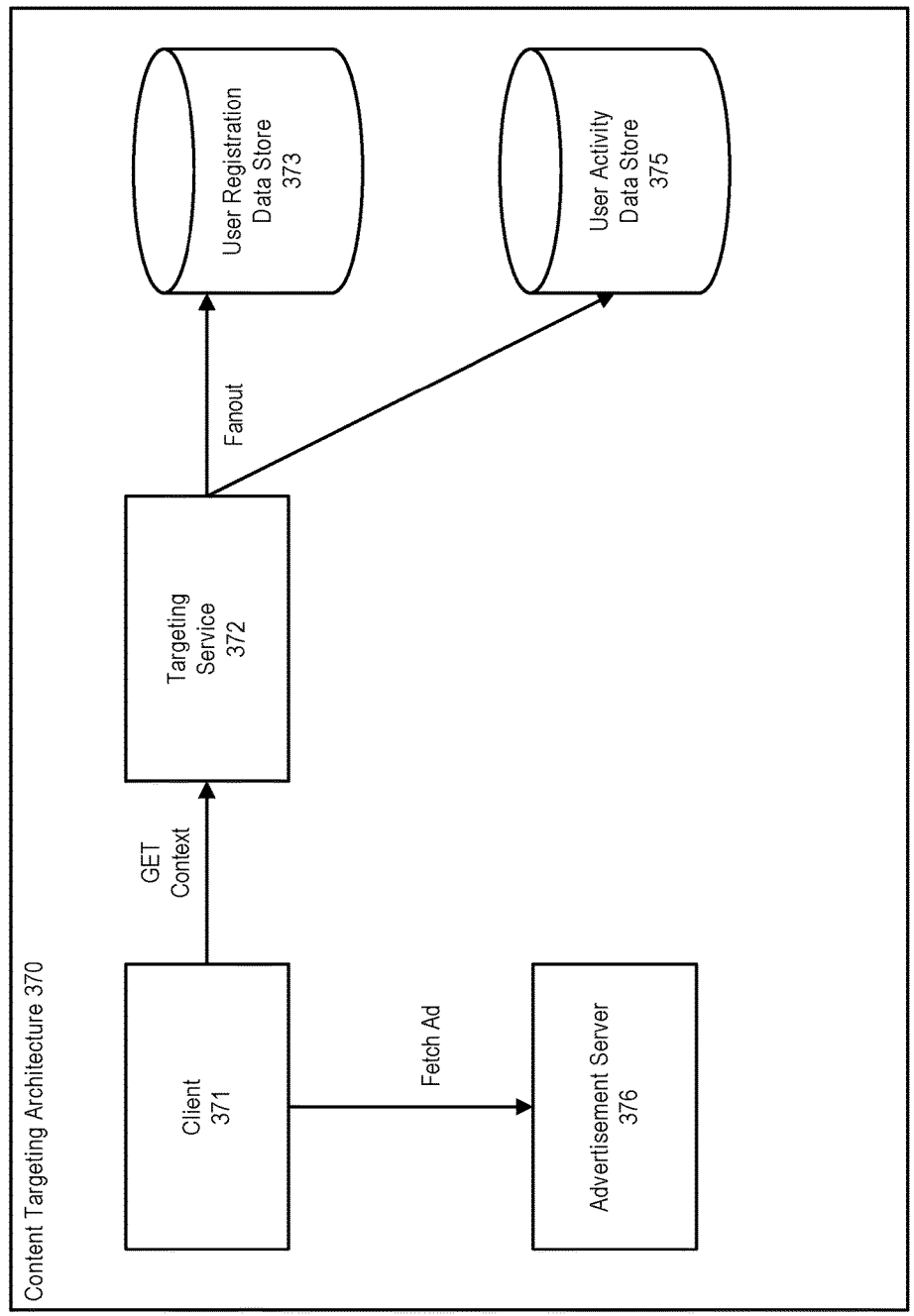
FIG. 9 illustrates a content targeting architecture, in accordance with an embodiment.

FIG. 9 illustrates a content targeting architecture, for use within a system for selection of music-styled sponsor-directed content or advertisements, in accordance with an embodiment.

As shown in FIG. 9, in accordance with an embodiment, in a content targeting architecture 370, a client 371, which can be the media streaming logic, or another entity within the media server, can access the targeting service 372 to obtain the context of a particular user. In accordance with an embodiment, the targeting service can access a registration data store 373 and an activity store 375 to obtain the context for the particular user. The context can be then returned to the requestor (which again can be the media stream logic, or another entity within the media server acting as a client), which determines an appropriate advertisement or other sponsor-directed content. The requestor/client can then fetch the advertisement from an advertisement server 376.

In accordance with an embodiment, the system can be used to support delivery of media content that is made free-of-charge through the insertion of advertisements into the streams of media content.

The marketable value of such inserted advertisements generally depends on their appeal to a particular user. For example, advertisements for products that may potentially appeal to a user may be "tuned out" by that same user if the advertisements interrupt, or otherwise interfere with the user's overall listening and/or viewing experience. Similarly, advertisements can interfere with a user's experience by advertising products and/or services that are not relevant to the user, that are not targeted at an appropriate time, and/or that are delivered in a style that is otherwise incongruent with listening experience of the user.

In accordance with various embodiments, the system can be used to provide advertisement or other sponsor-directed content that the system determines have some particular relevance to the user and/or to the media context which the user is receiving. The media server can then select, insert, and deliver additional sponsor-directed content, such as advertisements, based on music-styled and/or contextual information embedded in, and/or related to the user selected media context.

For example, in accordance with an embodiment, an advertisement can be selected for a product having an appropriate volume and energy level. Different advertisements of varying energy level, each advertising the same product, can be further chosen based, for example, on the genre of the music consumed.

In accordance with an embodiment, a metadata gathered in connection with a media content, for example a piece of music, can include measurables in the style, content and context of the user-selected music itself.

A user's experience with a music media content can be affected by certain fundamental concepts such as music styles associated with music. For example, a user's heart rate and/or energy level can be affected by qualities of the music that the user is listening to, such as, for example, the tempo, consonance, pitch, and texture of the music. Such music styles or qualities as tempo, consonance, pitch and texture can also be analyzed and stored as analytical data in the form of metadata in the media style repository.

As another example, a user may request music to be streamed that could alter the state of the user. For example, the user may select a higher tempo, bass-heavy music to help them prepare for a football game or to prepare for a night out on the town.

Alternatively, or additionally, the qualities of the music selected can be affected by the state of the user, rather than affecting the state of the user. For example, a user that is exercising at a gym can select music that complements, for example, the user's running pace while the user is working out.

In accordance with an embodiment, qualities of a played music can lead to an inference of the activity that a user is engaged in, and an appropriate sponsor-directed content or advertisement can be selected and inserted accordingly. For example, if the music streaming is determined in real-time to be high tempo, or is known to be associated with exercise, it can be inferred that the user is working out or engaged in a physical activity, and sponsor-directed content can be selected and served that is similarly fast-paced. As another example, a sponsor-directed content such as a product advertisement, can be selected to appeal to someone working out, such as a sports energy drink or sports equipment.

Additionally, a user's interest and/or engagement in advertisement or other sponsor-directed content for products and/or services can be based on inference of the user's activity from the music, one or more qualities of the music and the appeal of such music and qualities to users who participate in such activities. An inference, based on the music and the qualities of the music that the user listens to, can be made to the type of activity that the user is participating in, and from there to the type of sponsored content that would likely be of interest and engaging to the user.

In any of the above scenarios, a user's interest and/or engagement in advertisement or other sponsor-directed content inserted into a music stream can benefit from selection of content that complements the streamed media content, in one or more qualities; and can also benefit from selection of content that targets an activity in which the user is engaged.

Figure 10:
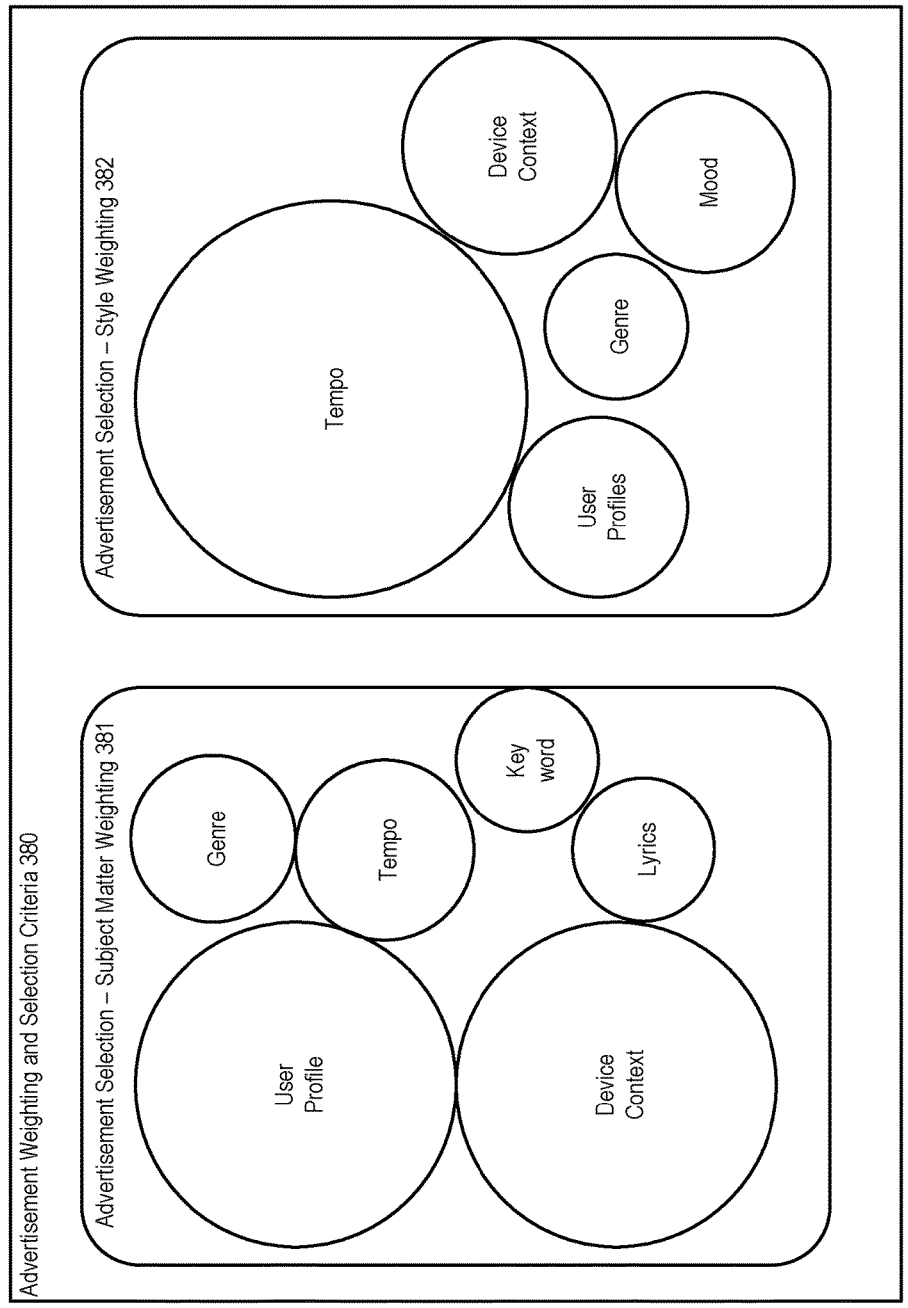
FIG. 10 illustrates an exemplary advertisement weighting and selection, in accordance with an embodiment.

FIG. 10 illustrates an exemplary advertisement weighting and selection, for use within a system for selection of music-styled sponsor-directed content or advertisements, in accordance with an embodiment.

As shown, in FIG. 10, in accordance with an embodiment, advertisement weighting and selection criteria 380 can be used to determine the subject matter of a selected advertisement 381, and the style of a selected advertisement 382.

In accordance with an embodiment, where the sponsor-directed content is an advertisement (or a plurality of advertisements), each advertisement is selected for both subject matter and style. As shown, the relative sizes of circles represent the relative weighting given to the quality described by the metadata.

For example, when the subject matter of an advertisement is selected, more weight can be given to user profile and device context, with lesser weight given to genre, tempo, keywords and lyrics. Subject matter for a user who has been known to respond to advertisements for local events (as determined by their user profile) can be selected based on this information. If local events are chosen as the subject matter, the media device context can determine those events that are local to the user, thereby narrowing the pool of available advertisements. Advertisements for the same subject matter can be made available in different styles to match the media content item. The selection of style for an advertisement can be chosen with different emphasis of qualities.

For example, in a particular implementation, it may be decided that tempo and device context are more heavily weighted than genre, mood and user profile. Where the sponsor-directed content is an advertisement, or a plurality of advertisements, each advertisement can be selected at for both subject matter and style.

As illustrated in FIG. 10, the relative sizes of circles can represent a relative weighting given to the quality described by the metadata. For example, when the subject matter of an advertisement is selected, more weight can be given to tempo and genre, with lesser weight given to keywords and lyrics.

As another example, subject matter for an up-tempo media content item from a genre associated with workouts (e.g., hip hop) could include, by way of example only, energy/recovery drinks, workout equipment such as shoes and clothes, and fast food advertisement focusing on the healthy menu options available.

In accordance with an embodiment, advertisements for the same subject matter can be available in different styles to match the media content item. The selection of style for an advertisement can be chosen with different emphasis of qualities. In this example, tempo and mood may be more heavily weighted than genre.

In accordance with an embodiment, advertisement or other sponsor-directed content can be selected based on data gathered about the user. For example, where the media content is music, the data gathered about the user can include measurables of the music itself, such as the genre of music typically listened to by the user and the tempo of the music typically listened to by the user. Advertisement or other sponsor-directed content can be served that are relevant to the tempo of the music that the user has been streaming. For example, if a user listens to music that is typically down-tempo, then a large portion of the time that the user streams media, an advertisement can be selected having a lower volume and energy level. Different energy advertisements for the same product can also be chosen based on the tempo of the music consumed.

In accordance with an embodiment, a usage data gathered as described above can vary in time. For example, in accordance with an embodiment, advertisement or other sponsor-directed content can be selected based on the entire streaming history of a user, or alternatively, advertisements can be selected based on a recent streaming history of the user. Advertisement or other sponsor-directed content can also be selected based on an analysis of the tempo metadata of the music being streamed in real-time, by algorithmically determining the general tempo of the music in the session. Those advertisements that are most relevant to the tempo of the music can be selected and inserted into the session.

In accordance with an embodiment, advertisement or other sponsor-directed content can be served that is relevant to the genre of the music the user has been streaming.

For example, the weighted genre of the music being streamed can be analyzed in real-time, and sponsor-directed content can be algorithmically determined based on the general genre theme of the music in that session. Advertisements can be selected and inserted into the session that are most relevant to the genre of the music.

As another example, if a user listens to classical music and easy listening music a large portion of the time that the user streams media, then an advertisement can be selected for a product typically consumed by the typical listener of classical music and easy listening music, such as a luxury-brand automobile, or a fine wine. Alternatively, it may be decided that a loud advertisement, such as for a sports energy drink, would be inappropriate, because the user is in a context where that advertisement does not make sense.

An advertisement can also be selected for a product having appropriate volume and energy level. For example, an advertisement can be selected having a lower volume and energy level. As above, different energy advertisement for the same product can also be chosen based on the genre of the music consumed.

In accordance with an embodiment, advertisement or other sponsor-directed content can be selected and served that is relevant to the mood of the music the user has been streaming. For example, the mood metadata of the music being streamed can be analyzed in real-time, and sponsor-directed content can be algorithmically determined based on the mood of the music in that session.

In accordance with an embodiment, advertisement or other sponsor-directed content can be selected and served in response to the real-time weather data of the location of the user as identified by the IP address of the location to which content is being streamed. Sponsor-directed content can be algorithmically determined based on the weather. The sponsor-directed content can be related to weather itself, for example, a sunny summer location could be an opportunity to promote sunscreen or other such products. Additionally, the sponsor-directed content can be related to a mood of the user inferred by the weather itself. For example, if the weather is stormy, sponsor-directed content can be selected and served for that session that assumes a downbeat or gloomy mood of the user.

In accordance with an embodiment, advertisement or other sponsor-directed content can be selected and served in response to an inference of the activity that a user is engaged in. For example, if the music streaming is determined in real-time to be high tempo, or associated with exercise, it can be inferred that the user is working out or engaged in a physical activity, and sponsor-directed content can be selected and served to is not slow in pace. Sponsor-directed content, where it is a product advertisement, can be selected to appeal to someone working out, such as a sports energy drink.

In accordance with an embodiment, location data can be used to select and serve advertisement or other sponsor-directed content. For example, if the user is determined to be in the Mojave Desert, then sponsor-directed content relevant to that context can be used. As another example, if an IP address of a Wi-Fi router is determined to belong to a gym, then sponsor-directed content can be selected and served related to exercise and fitness.

In accordance with an embodiment, real-time signals inferring mood or activity, can be used along with the profile constructed for the user's listing history and used together to identify appropriate advertisement or other sponsor-directed content. For example, users can be identified with an audience who are sports enthusiasts based on listening patterns, and sponsor-directed content can be targeted based on the audience that the user is identified with.

In accordance with an embodiment, advertisement or other sponsor-directed content can be selected and served that is targeted to keywords using the lyrical information of the music the user has been streaming. Lyrics of the music being streamed can be analyzed in real-time and advertisements can be selected and served to the user based on keywords searches using the lyrics. For example, a user may listen to audio with lyrics that contain the keyword "car" or "love". If the keyword is registered a certain number (x) times in a given time frame, then the system can add that user (temporarily) to a targetable segment that can be served contextual ads.

In accordance with an embodiment, keyword searches can also be used for entered text for playlist names or descriptions. For example, if a particular keyword is found in the user's playlist title such as "party", then that particular keyword can then be targeted for advertisements.

As described above, a profile can be generated for the user. For example, in addition to the signals described, other signals obtained by the content provider can be included in a user's listening history. Based on this history, base user profiles can be constructed for each user, for example describing the genres that the user likes to stream.

In addition to those described above, in accordance with an embodiment, other patterns can be determined from the user's history. For example, the user may listen to specific genres, or may explore new music. The profile can indicate the user's desire to discover or seek out different music, or can indicate that the user tends to listen to the same types of music, or even the same albums/artists, for example. The profile can also indicate whether the user follows trends, for example hot or trending tracks.

In accordance with an embodiment, actions taken by the user within the media application, or actions taken on the media device on which the software application is running can also be used to determine the context of the user and/or the relevance of sponsor-directed content to the user and/or determine that the user is irritated by sponsor-directed content.

For example, in accordance with an embodiment, the media application can determine that the user starts skipping ads, or that the user tries to lower the volume of the sponsor-directed content, either by means of their software application, or using buttons of the device. Such signals can indicate the relevance of the sponsor-directed content to the user. Certain actions taken by the user during sponsor-directed content can represent a negative signal that can be used by the system in real-time to improve the sponsor-directed content that is selected for the user.

In accordance with an embodiment, quality scores based on implicit positive and negative signals can be used to attempt to optimize the user's experience. For example, negative signals such as volume decreases, application focus changes, advertisement minimizations, attempted skips, application exits, can be collected and weighted. Positive signals such as click-to rate, audio/video completion rate, and the like can also be collected and weighted.

In accordance with an embodiment, both positive and negative signals can then be combined and an overall quality score can be obtained, allowing the server to quantify gains to relevancy and user experience. User experience data can continue to be collected, to iteratively refine the sponsor-directed content selection, in a feedback loop.

FIG. 11 illustrates an exemplary user/device information, for use within a system for selection of music-styled sponsor-directed content or advertisements, in accordance with an embodiment.

As shown in FIG. 11, in accordance with an embodiment, a user/device information 383 can include a user profile information 384, and a media device context 385. FIG. 11 illustrates an example of contents of a user profile and a metadata profile for media device content for use in selecting advertisements and/or other media that have a likelihood of being of interest to the user.

In accordance with an embodiment, as the location of the media device and user changes the user profile, the user profile can be updated with new location information using IP address and GPS capabilities. A user profile can be continuously generated and modified. For example, in addition to the data described, other data can be obtained from the user's listening history. Based on this history, profiles can be constructed for each user, for example describing the genres that the user likes to stream.

For example, as illustrated in the figure, a username SF_Mike defines the user for which the data has been aggregated. Data can fall into one or more categories, such as, for example "subject matter of ads interacted with by frequency", "Genre of media content streamed by frequency", "biographical detail" and "interests".

In accordance with other embodiment, different categories can be used to select different aspects of sponsor-directed content. For example, a "subject matter of ads interacted with by frequency" can be used to select a subject matter of an advertisement, while a "genre of media content streamed by frequency" can be used to select a style of an advertisement. Other categories, such as "biographical detail" and "interests" can also influence one or both of subject matter and style.

In accordance with an embodiment, each of the categories can influence both subject matter and style. For example, if a user listens to classical music and easy listening music a large portion of the time that the user streams media, then an advertisement can be selected for a product typically consumed by the typical listener of classical music and easy listening music, for example a luxury-brand automobile, or a fine wine. Such information can be obtained from third-party research companies.

As another example, if a user requests music that is typically down-tempo, then a large portion of the time that the user streams media, an advertisement can be selected having a lower volume and energy level. Different energy advertisements for the same product can also be chosen based on the tempo of the music consumed.

In accordance with an embodiment, real-time music relating mood or activity, can be collected along with the profile constructed for the user's listening history and used together to identify appropriate sponsor-directed content. For example, users can be identified with an audience who are sports enthusiasts based on listening patterns, and sponsor-directed content can be targeted based on the audience that the user is identified with.

In addition to those described above, in accordance with an embodiment, other patterns can be determined from the user's or user's history. For example, the user may listen to specific genres, or may explore new music. The user profile can indicate the user's desire to discover or seek out different music, or can indicate that the user tends to listen to the same types of music, or even the same albums/artists, for example. The profile can also indicate whether the user follows trends.

For example, a metadata profile for a media device context can include the username of the logged-in user, so that the two profiles can be tied together, and can further include categories related to a context of the media device, for example categories including "Location Context", "History of use of the device" and "Device Detail". A device which may typically lack GPS or other geographic positioning technology (e.g., an audio speaker) can be location tagged by other connected devices which do include GPS or other geographic positioning technology and which are using the device for media streaming.

With respect to location context, a sponsor-directed content can be selected and served in response to the real-time weather data of the location of the user as identified by the IP address and/or GPS address of the location to which content is being streamed.

For example, sponsor-directed content can be determined based on the weather. The sponsor-directed content can be related to weather itself, for example, a sunny summer location could be an opportunity to promote sunscreen or other such products. Alternatively, or additionally, the sponsor-directed content can be related to a mood of the user inferred by the weather itself. For example, if the weather is stormy, sponsor-directed content can be selected and served for that session that assumes a downbeat or gloomy mood of the user.

In accordance with an embodiment, location data can be used to select and serve sponsor-directed content. For example, if the user is determined to be in a geographic region known to have a particular climate, such as a dry or desert region, then sponsor-directed content relevant to that context, and that particular climate, can be used. As another example, if an IP address of a Wi-Fi router is determined to belong to a gym, then a sponsor-directed content can be selected and served based on that information.

With respect to device details, if the media device is a certain manufacturer make or model, sponsor-directed content can be selected from those manufacturers, or alternatively sponsor-directed content can be selected that is not related to the manufactures, but that targets products and/or services that are typically of interest to users that use those manufacturer makes and models of media devices. Profiles of user interests can be compiled for individual media devices, for use in determining sponsor-directed content, or for use as one component of many for determining sponsor-directed content.

In accordance with an embodiment, the metadata gathered about media content, for example music, can further include descriptive data of the music itself. A user's excitement level, or engagement level, can be affected by the genre, the mood, or the lyrics of a piece of music. For example, if a piece of music is more familiar to a user, the user may sing along or become more engaged with the music. If the user feels a certain connection with the lyrics or mood of the music, the user can become more engaged with the music. Keywords can likewise be associated with the music if that music pertains to certain activities or is known to trigger certain responses in users. The descriptive data of media content item(s) can also be described in metadata that can be associated with the media content item(s) and can be stored in the media style repository.

A user's interest and/or engagement in an advertisement inserted into a music stream can benefit from selection of an advertisement for a product and/or service that is likely to be popular with users who listen to music of a certain genre or mood.

For example, a user that requests a media content item that comprises classical music, may be found through market research to generally prefer to purchase certain types of automobiles. A user selection for classical music may prompt the media streaming logic of the media server to follow the media content by inserting an advertisement for certain automobiles that includes classical music playing as background music.

As another example, a user request for a media content item with evocative lyrics, about an automobile, may prompt the media streaming logic of the media server to follow the media content by inserting an advertisement for an automobile, or for a local classic car show. Lyrics of the music being streamed can also be analyzed in real-time and sponsor-directed content can be selected and served to the user based on keywords searches using the lyrics. For example, a user may listen to audio with lyrics that contain the keyword "car" or "love"." If that keyword is registered a certain number of times in a given time frame, then the system can add that user (temporarily) to a targetable segment that can be served related contextual ads.

As another example, a user's request for a media content item with a nostalgic mood, may prompt the media streaming logic of the media server to follow the media content by inserting sponsor-directed content identified as appealing to a sense of nostalgia.

Figure 12:
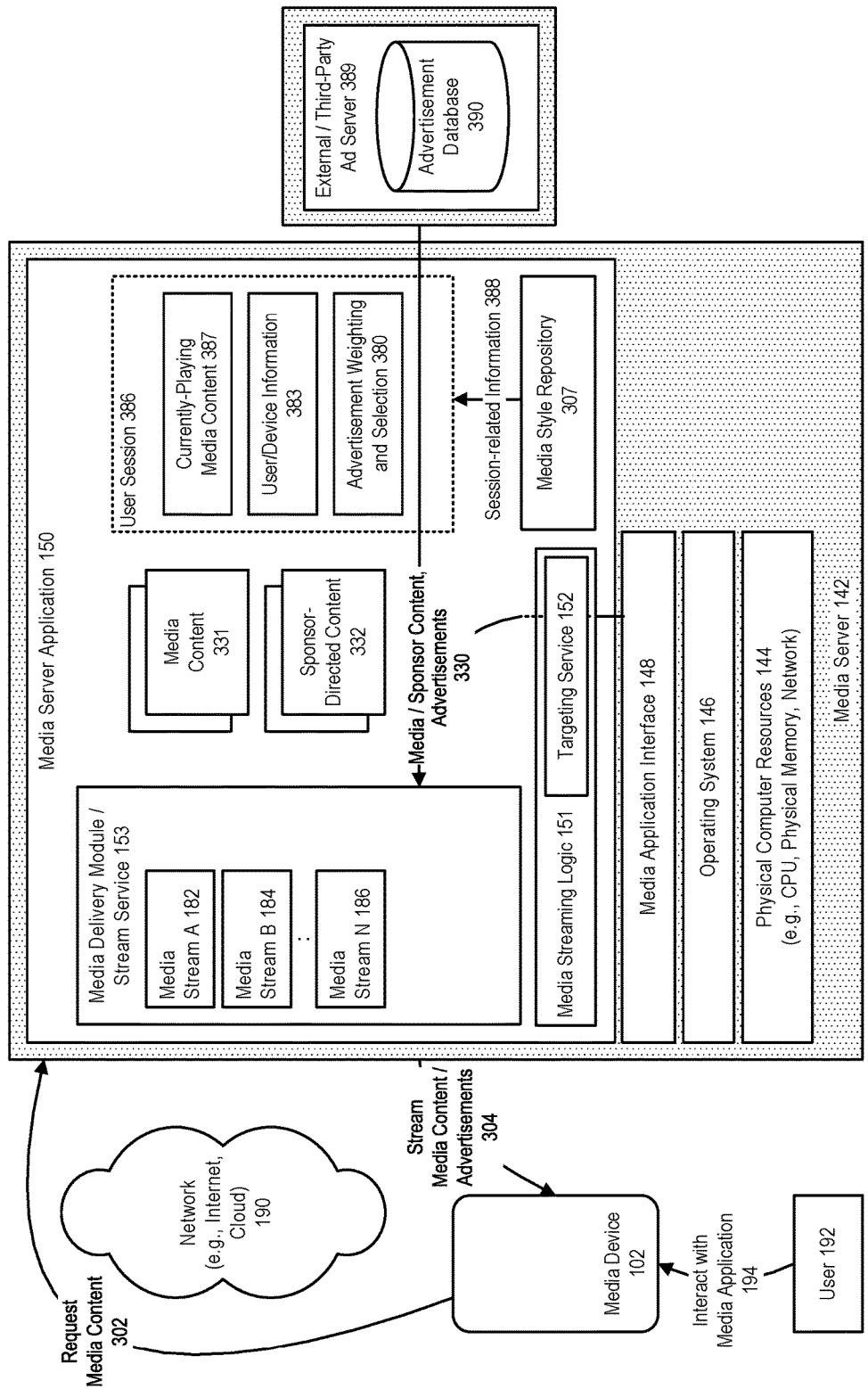
FIG. 12 further illustrates a system that supports selection of music-styled sponsor-directed content or advertisements, for insertion into a media stream, in accordance with an embodiment.

FIG. 12 further illustrates a system that supports selection of music-styled sponsor-directed content or advertisements, for insertion into a media stream, in accordance with an embodiment.

As shown in FIG. 12, in accordance with an embodiment, the media server can select, insert and deliver additional content, such as advertisements and sponsor media based on not only music styled and/or contextual information about the user selected media content, but also one or both of the particular user, and the particular media device, including determining for a user session 386 and currently playing media content 387 an advertisement weighting and selection, and use/device information, and currently-playing media content for all or a portion of the session, and session-related information 388 from the media style repository.

In accordance with an embodiment, the media server comprises a user profile database containing information about the user, and can further interact with one or more external/third-party media content or advertisement server 389 having an advertisement database 390.

Figure 13:
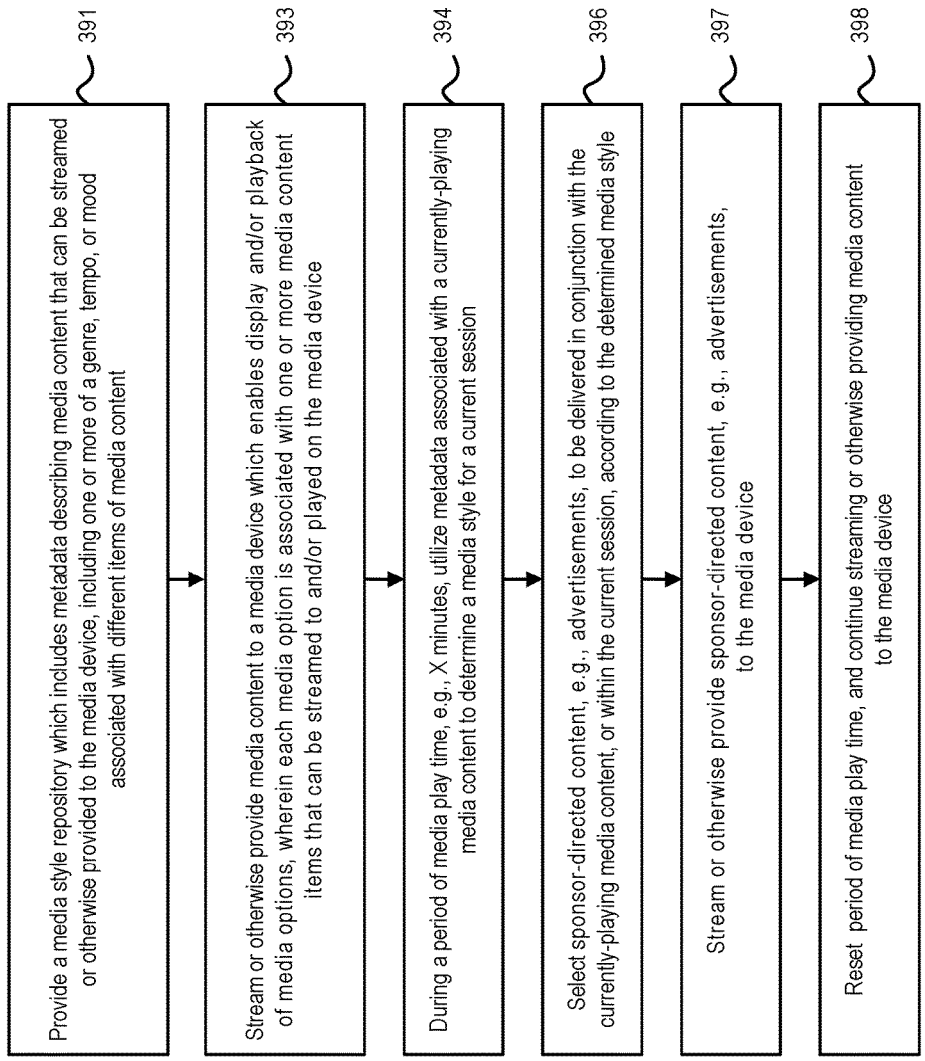
FIG. 13 illustrates a method for selection of music-styled sponsor-directed content or advertisements, for insertion into a media stream, in accordance with an embodiment.

FIG. 13 illustrates a method for selection of music-styled sponsor-directed content or advertisements, for insertion into a media stream, in accordance with an embodiment.

As shown in FIG. 13, in accordance with an embodiment, at step 391, a media style repository which includes metadata describing media content that can be streamed or otherwise provided to the media device, including one or more of a genre, tempo, or mood associated with different items of media content, is provided.

At step 393, media content is streamed or otherwise provided to a media device which enables display and/or playback of media options, wherein each media option is associated with one or more media content items that can be streamed to and/or played on the media device.

At step 394, during a period of media play time (e.g., X minutes), metadata associated with a currently-playing media content is utilized to determine a media style for a current session.

At step 396, sponsor-directed content, e.g., advertisements, are selected to be delivered in conjunction with the currently-playing media content, or within the current session, according to the determined media style.

At step 397, sponsor-directed content, e.g., advertisements, are streamed or otherwise provided to the media device.

At step 398, a period of media play time is reset, and the streaming or otherwise providing of media content to the media device continues.

In accordance with an embodiment, the system can stream media content for some period of time or session. When the stream time exceeds some amount of minutes (e.g., x minutes), the media server can be prompted to select and insert the sponsor-directed content into the stream. The media server can obtain metadata related to the just-streamed media content from the media style repository for use by the media streaming logic, which selects sponsor-directed content (e.g., one or more advertisements) to stream based on the obtained metadata.

In accordance with an embodiment, the weighted genre of the music being streamed can be analyzed in real-time, and sponsor-directed content can be determined based on the general genre theme of the music in that session. Advertisements can be selected and inserted into the session that are most relevant to the genre of the music. Once selected, the sponsor-directed content is streamed to the media device that requested the previous media content. After the sponsor-directed content has been delivered and consumed, the next media content items are streamed and the method is repeated. The obtained metadata can be purged and the time until the next break for sponsor-directed content can be reset.

In accordance with an embodiment, for each streamed media content item, metadata is obtained from the media style repository for use by the media streaming logic. Sponsor-directed content is determined by the media streaming logic based on aggregate obtained metadata. If the stream time does not exceed some amount of minutes (e.g., x minutes), the next media content item is streamed and the media streaming logic determines if additional or substitute sponsor-directed content should be selected and inserted into the stream based on the new aggregation of metadata that includes the metadata from the additional media content item. When the stream time exceeds some amount of minutes (e.g., x minutes), the updated determination of sponsor-directed content is streamed to the media device that requested the previous media content. After the sponsor-directed content has been delivered and consumed, the next media content items are streamed and the method is repeated. The obtained metadata can be purged and the time until the next break for sponsor-directed content can be reset.

In accordance with an embodiment, sponsor-directed content can be selected based on an analysis of the tempo metadata of the music being streamed in real-time, by determining the general tempo of the music in the session. Those advertisements that are most relevant to the tempo of the music can be selected and inserted into the session. However, gathered metadata used can vary in time. For example, in accordance with an embodiment, advertisements can be selected based on the entire streaming history of a user, or alternatively, can be selected based on the recent streaming history of the user.

In accordance with an embodiment, rather than weighting different qualities of the media content, the priority of different qualities can be used to narrow down options for sponsor-directed content.

For example, a pool of advertisements can be narrowed by first selecting the highest priority quality. Where the highest priority quality is genre, an advertisement decision can narrow the pool of available advertisements by excluding all advertisements that do not fall under the genre.

The advertisement decision can then narrow the pool of available advertisements using the next highest priority quality, for example excluding all advertisements that do not include certain keywords.

The advertisement decision can then narrow the pool of available advertisements using the next highest priority quality, for example excluding advertisements based on tempo.

The advertisement decision can then narrow the pool of available advertisements using the next highest priority quality, for example by excluding advertisements based on music pitch.

After all relevant qualities have been used to narrow the pool of available advertisements, an advertisement from the remaining set of advertisements can be selected and delivered to a media device that requested the media content of the media stream.

In accordance with an embodiment, a user's profile can be accessed to obtain information about the user. Context data for the media device requesting media content can then be obtained. The context data can be obtained based on the nature of the media device requesting media content or based on a location of the media device. The location of the media device can be used to obtain, for example, weather information at the location of the media device, or local events close to the media device, proximity to sponsors relative to the media device. Additionally, as the location of the media device and the user changes, the user profile can be updated with the new location using IP address and GPS capabilities.

Information about the type of media device itself can be helpful. For example, whether the media device is a mobile device, or a fixed device (for example, a desktop or home entertainment center) can be of use for the selection of sponsor media and advertisements. In accordance with an embodiment, this information can be obtained by one or more external databases. As this information is obtained, the media content can be streamed to the requesting media device or some period of time. When the stream time exceeds some amount of minutes (e.g., x minutes), the media server is prompted to select and insert the sponsor-directed content into the stream. The media server obtains metadata related to the just-streamed media content from the media style repository. The server selects sponsor-directed content or advertisements based on the user profile, media device context data and the obtained metadata. The sponsor-directed content is streamed to the media device that requested the previous media content. After the sponsor-directed content has been delivered and consumed, the next media content items are streamed and the method is repeated. The obtained metadata can be purged and the time until the next break for sponsor-directed content can be reset.

In accordance with an embodiment, a system is described for delivering advertisements associated with styles of media content, comprising a media server including a microprocessor, and a media server application executing thereon and adapted to receive requests from media devices for media content; a media streaming logic adapted to provide the media content in response to the requests from the media devices; a media style repository that stores one or more analytical and descriptive data describing the media content to be provided to the media devices; and a targeting logic which selects an advertisement or other sponsor-directed content to be delivered in conjunction with particular items of media content, based at least partly on the analytical and descriptive data associated with those particular items of media content.

In accordance with an embodiment, the system supports a method comprising providing, at a media server including a microprocessor, a media server application executing thereon and adapted to receive requests from media devices for media content; providing a media streaming logic adapted to provide the media content in response to the requests from the media devices; providing a media style repository that stores one or more analytical and descriptive data describing the media content to be provided to the media devices; and selecting an advertisement or other sponsor-directed content to delivered in conjunction with particular items of media content, based at least partly on the analytical and descriptive data associated with those particular items of media content.

In accordance with an embodiment, the analytical and descriptive data that is stored in the media style repository includes metadata describing one or more of a tempo, consonance, pitch, texture, genre, mood, lyrics, and keywords of the media content to be provided to the media devices, and is used by the media server to determine a style of media content being streamed or otherwise provided to a media device during a session.

In accordance with an embodiment, a user is associated with a user profile that is used by the media server application in selecting a particular advertisement or other sponsor-directed content.

In accordance with an embodiment, a media device is associated with a media device context, including information identifying a location of the media device that is updated as the location changes.

In accordance with an embodiment, the media server is adapted to coordinate the location of a media device and user thereof, with information describing one or more events, places, and environmental conditions in proximity to the media device and the user, for use in selecting a particular advertisement or other sponsor-directed content.

In accordance with an embodiment, at least some of the one or more analytical and descriptive data describing the media content is provided by a third-party provider.

Watch-Now Functionality

In accordance with an embodiment, the system includes support for watch-now functionality. A media play logic at a media device controls playback of media content and advertisements as received from a media server, and can be configured for regular media play, or extended media play. Periodically, for example when input is received from a user to skip to a next media option for playback, the user can be prompted to watch an advertisement, in return for extended media play. Upon receiving an election by the user to watch the advertisement in return for extended media play, the media application plays the advertisement, and configures the media play logic for an extended period of advertisement-free media play.

For example, in accordance with an embodiment, when an offered and elected advertisement has been viewed in its entirety, users may enjoy a 60 minute long extended media play period of no-advertisements. Alternatively, if the user elects to not view the offered advertisement, the media play logic can be configured for regular media play, for example by playing an advertisement every 15 minutes.

In accordance with an embodiment, during playing of an advertisement, a user can continue to navigate the media player interface, by minimizing/hiding the advertisement. Users can also configure their media application to always play the longer advertisements.

Figure 14:
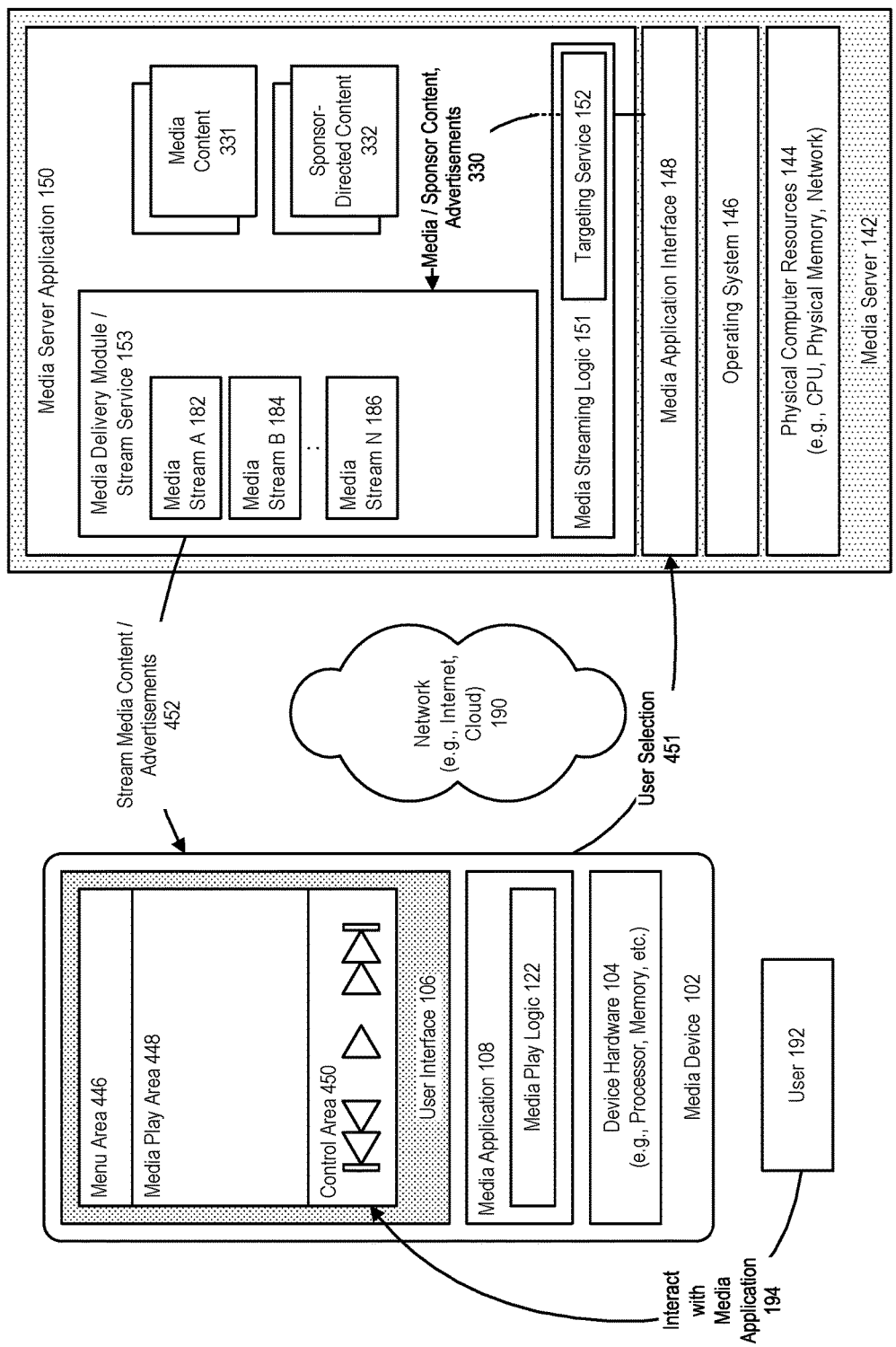
FIG. 14 illustrates a system that supports watch-now functionality, in accordance with an embodiment.

FIG. 14 illustrates a system that supports watch-now functionality, in accordance with an embodiment.

As shown in FIG. 14, and as described above, in accordance with various embodiments, the media device can be, for example, a personal computer system, handheld entertainment device, tablet device, smartphone, television, audio speaker, in-car entertainment system, or other type of electronic or media device that is adapted or able to prepare, control the presentation of, and/or play media content, for example, music, video, or television content. Each of the media device and the media server can include, respectively, one or more physical device or computer hardware resources, such as one or more processors, physical memory, network components, or other types of hardware resources. A media device can optionally include a user interface, which is adapted to display media options, and to determine a user interaction or input. The media device can also include a media application and media play logic which controls the playback of media content received from the media server, for playing either at a requesting client device, or at a controlled client device. A user can interact with the media application at a media device, for example using the user interface, and issue requests to access media content, such as the playing of a selected music or video item at their media device or at a controlled device, or the streaming of a media channel or video stream to their media device or to a controlled device.

In accordance with an embodiment, the media server application can be used to stream music, songs, video, or other forms of media content, to media devices. A media stream service can prepare media content for streaming to one or more streams. A media application interface can receive requests from media devices to retrieve media content from the media server. Media content items and/or samples associated therewith can be provided within a database or repository, or received at the media server from another source. Advertisements, which can be injected into media streams, can also be provided within a database or repository, or received at the media server from another source. A media streaming logic can be used to retrieve or otherwise access the media content items and advertisements, in response to requests from media devices, and populate streams with corresponding media content and advertisement data that can be returned to the requesting device.

In accordance with an embodiment, the media device can include a user interface, which displays a menu area 446, media play area 448, and control area 450, and which is adapted to display media options and determine user inputs to, e.g., select, play, pause, or skip a particular media option. Selecting a particular media option 451 can be used as a request or instruction to the media server application to stream 452 or otherwise return a corresponding particular item of media content for playback on the media device.

For example, in accordance with various embodiments, the media server can stream or otherwise communicate music, video, or other forms of media content to the media device in response to user selections.

In accordance with an embodiment, the media device can include a media application, together with a media play logic, which can be provided, for example as an installable software application or app, and thereafter used to control the playback of media content items received from the media server application. In accordance with an embodiment, the media play logic can be configured for regular media play, or extended media play.

In accordance with an embodiment, a user can interact with the user interface and issue requests, for example the playing of a selected music or video item on their media device. The user's selection of a particular media option can be communicated to the media server application, e.g., via the Internet or other form of network communication. The media server application can then stream corresponding media and/or advertising content as one or more streams, to the media device, for playback to the user.

In accordance with an embodiment, streaming media can be implemented either as real-time on-demand transfer of media content, where only a least amount of needed bytes are transferred to the client exactly at the right time; or as progressive downloaded where parts of the media are downloaded in advance in any order and are eventually completely cached on the client.

In accordance with an embodiment, when an input is received from a user to skip to a next media option for play, the user can be prompted to watch or listen to an advertisement now, in return for extended media play.

For example, in accordance with an embodiment, the offered advertisement can be a longer advertisement than would typically be injected into the media stream. Upon receiving an election by the user to watch an advertisement now, in return for extended media play, the media application plays the advertisement, and then skips to the next media option for play, and configures the media play logic for extended media play. Accordingly, the user can manually select between the options of regular media play and extended media play. With regular media play the user may experience an advertisement at shorter media playback intervals, such as for example every fifteen minutes. With extended media play the user may experience an advertisement at longer media play intervals, such as for example every hour.

Additionally, in accordance with an embodiment, the user may select an option that the user automatically opts-in for the extended media play with the longer advertisements presented between longer intervals of media playback.

For example, in accordance with an embodiment, when an offered and elected advertisement has been viewed or listened to in its entirety, users may enjoy a 60 minute long extended media play period of no-advertisements.

Alternatively, in accordance with an embodiment, if the user elects to not view the advertisement, the media play logic can be configured for regular media play, for example by playing an advertisement every 15 minutes. In accordance with an embodiment, during playing of an advertisement, a user can continue to navigate the media player interface, by minimizing/hiding the advertisement. Users can also configure their media application to always play the longer advertisements.

Figure 15:
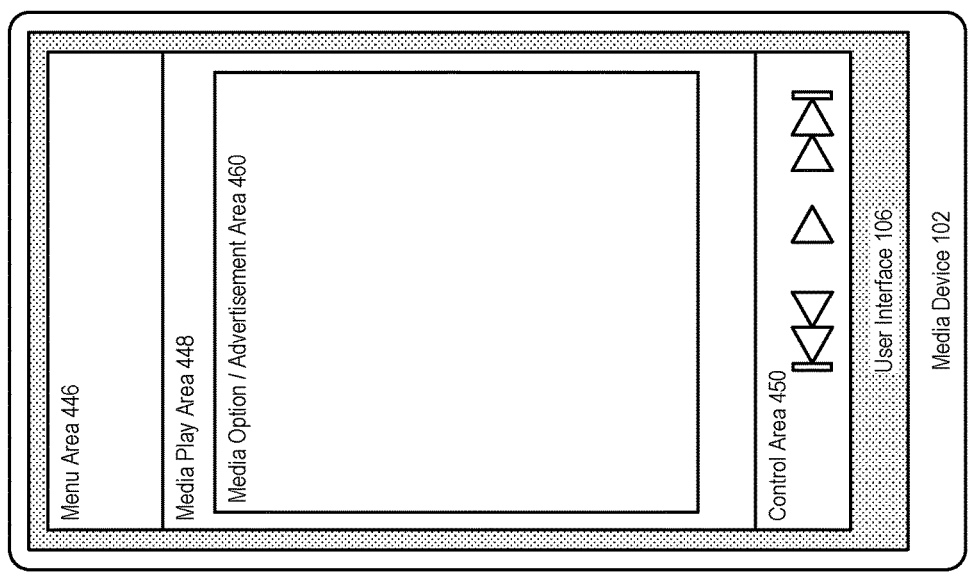
FIG. 15 illustrates a use of watch-now functionality, in accordance with an embodiment.

FIG. 15 illustrates a use of watch-now functionality, in accordance with an embodiment.

As shown in FIG. 15, a media device with a user interface is provided which enables the display of media options in a media option/advertisement area 460, wherein each media option is associated with one or more media content items that can be streamed to and/or played on the media device.

Figure 16:
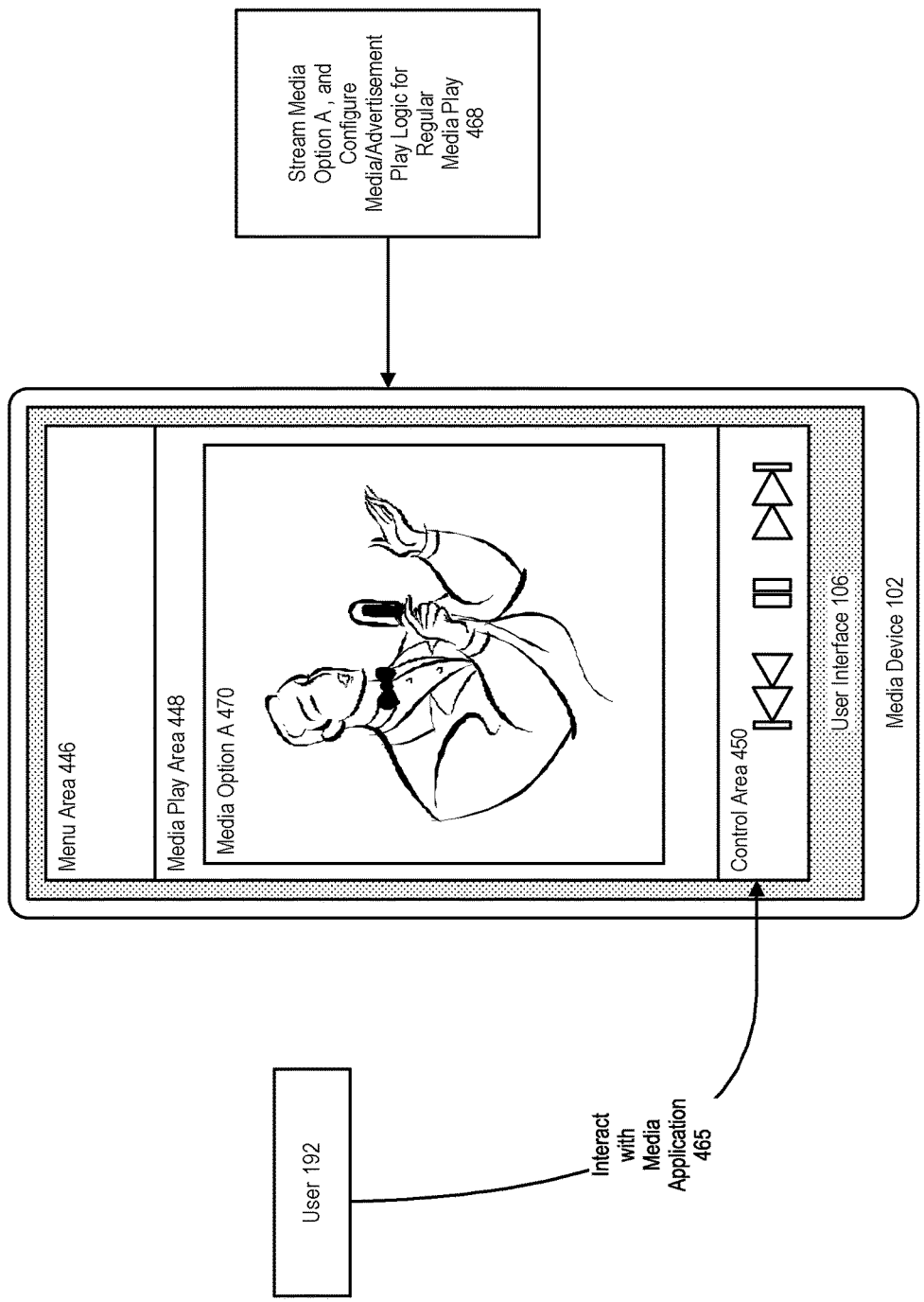
FIG. 16 further illustrates a use of watch-now functionality, in accordance with an embodiment.

FIG. 16 further illustrates a use of watch-now functionality, in accordance with an embodiment.

As shown in FIG. 16, a user can interact 465 with the user interface and issue requests, for example the playing of a selected music or video item on their media device. In response, the system can stream 468 an appropriate media option (e.g., media option A 470), and configure the media play logic for regular media play.

Figure 17:
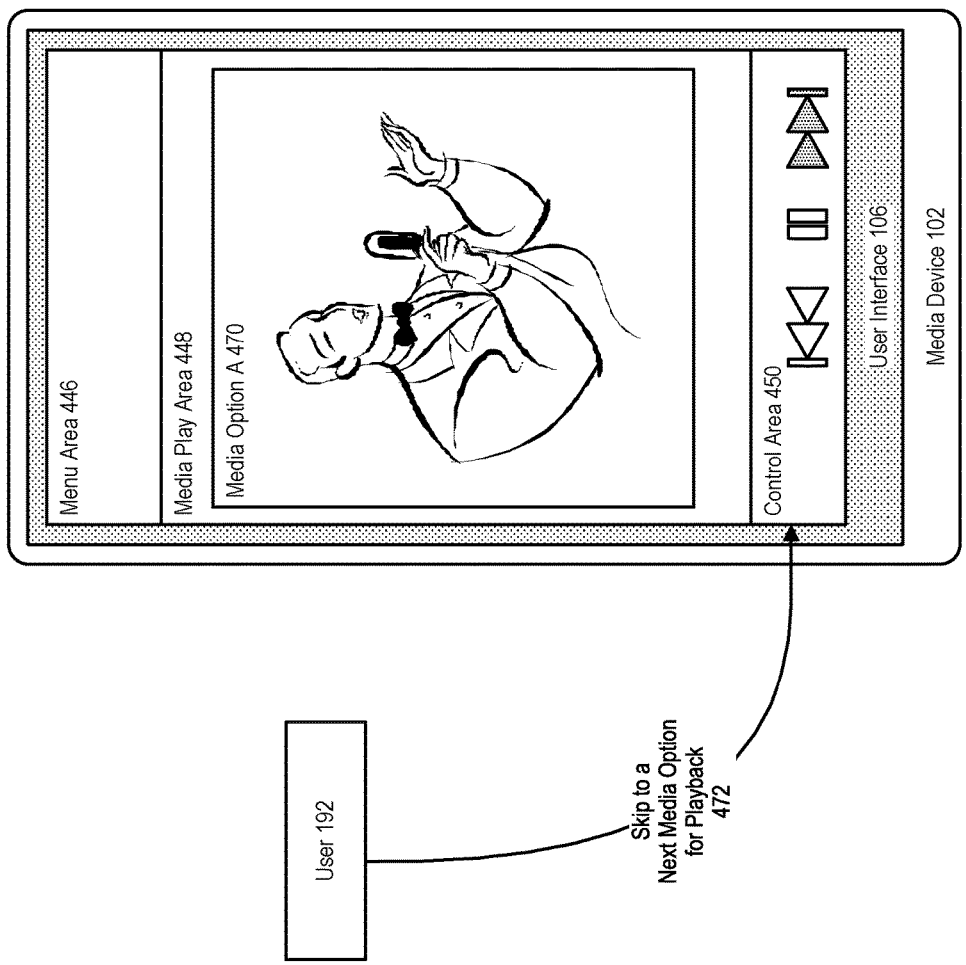
FIG. 17 further illustrates a use of watch-now functionality, in accordance with an embodiment.

FIG. 17 further illustrates a use of watch-now functionality, in accordance with an embodiment.

As shown in FIG. 17, a user can provide an input 472, e.g., to skip to a next media option for playback.

Figure 18:
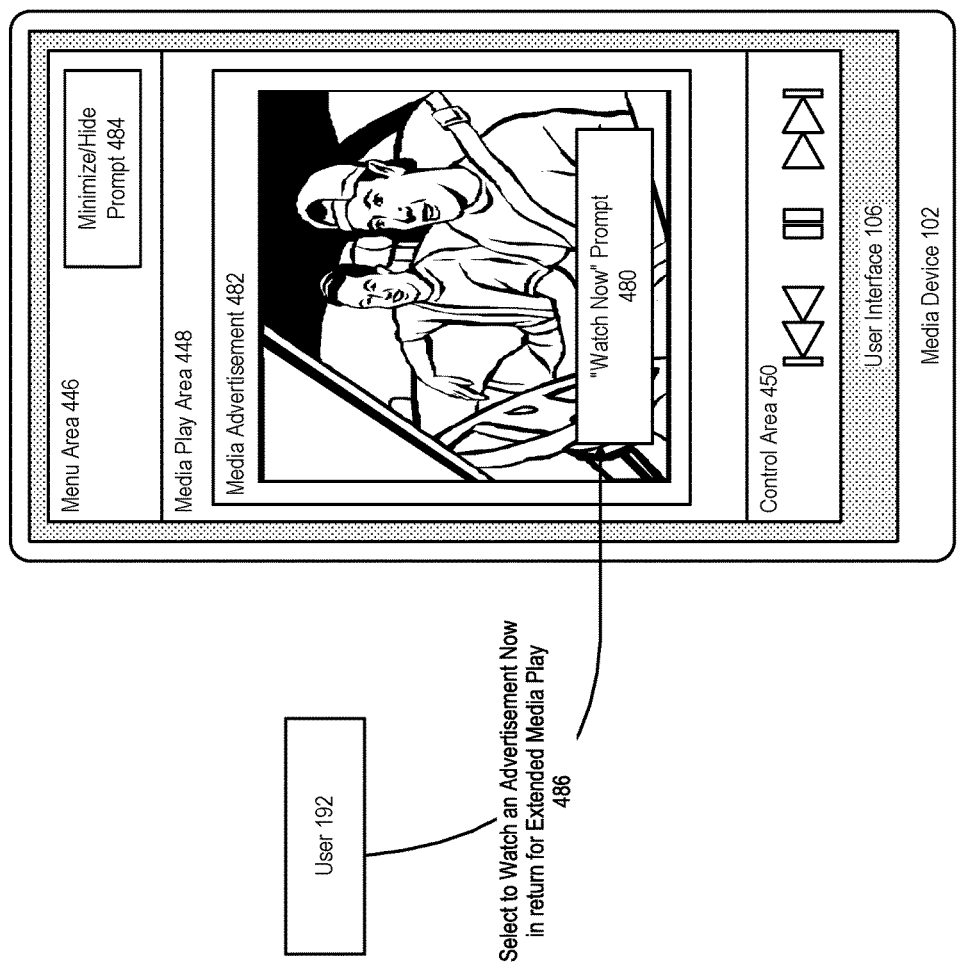
FIG. 18 further illustrates a use of watch-now functionality, in accordance with an embodiment.

FIG. 18 further illustrates a use of watch-now functionality, in accordance with an embodiment.

As shown in FIG. 18, when an input is received from a user to skip to a next media option for playback, the user can be prompted 480 to watch an advertisement 482 now, in return for extended media play. For example, the offered advertisement can be a longer advertisement than would typically be injected into the media stream. A user can minimize 484, or select 486 the option, or otherwise elect to watch an advertisement now, in return for extended media play.

Figure 19:
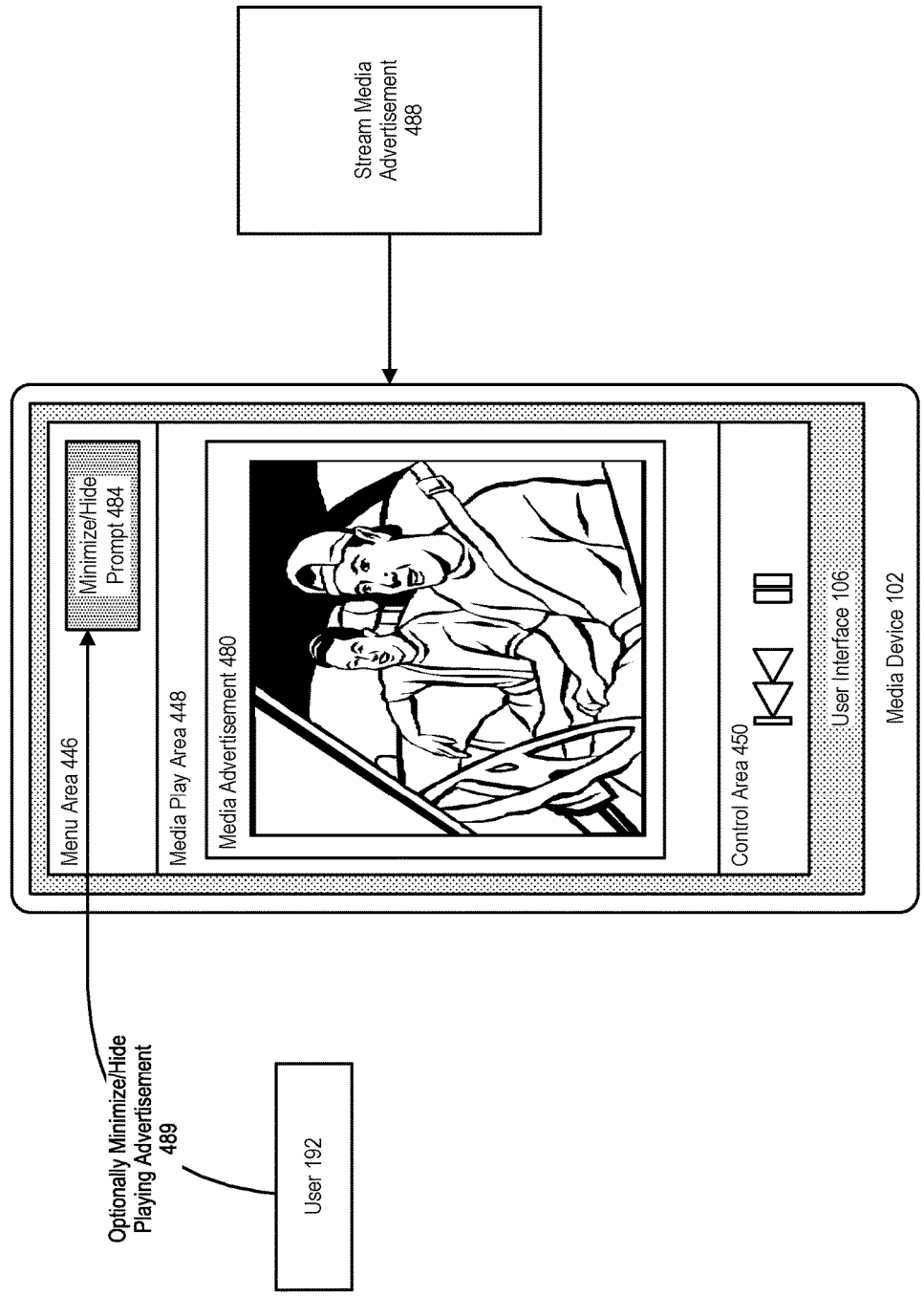
FIG. 19 further illustrates a use of watch-now functionality, in accordance with an embodiment.

FIG. 19 further illustrates a use of watch-now functionality, in accordance with an embodiment.

As shown in FIG. 19, in accordance with an embodiment, during the playing 488 of an advertisement, a user can continue to navigate the media player interface, by minimizing/hiding 489 the advertisement. Users can also configure their media application to always play the longer advertisements.

Figure 20:
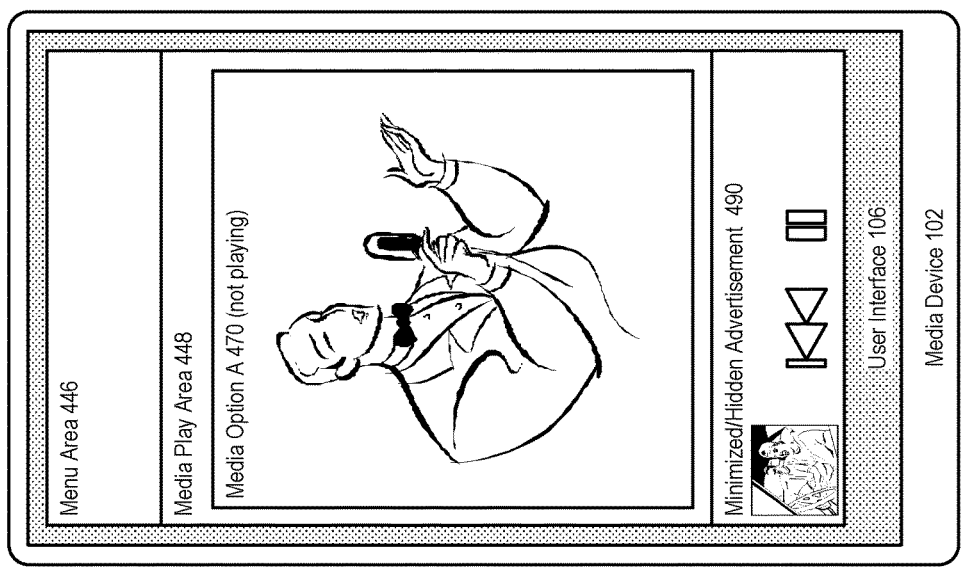
FIG. 20 further illustrates a use of watch-now functionality, in accordance with an embodiment.

FIG. 20 further illustrates a use of watch-now functionality, in accordance with an embodiment.

As shown in FIG. 20, in accordance with an embodiment, the playing advertisement can be minimized or hidden to an area 490 of the interface, allowing the user to continue to navigate the media player interface. In accordance with an embodiment, it is possible to use long audio advertisements, with or without a still picture, instead of a video advertisement.

Figure 21:
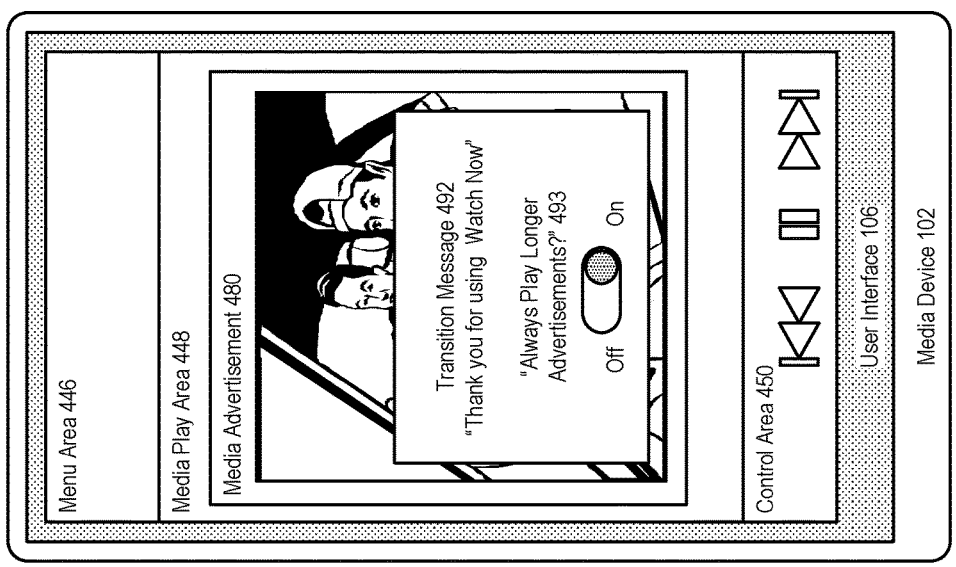
FIG. 21 further illustrates a use of watch-now functionality, in accordance with an embodiment.

FIG. 21 further illustrates a use of watch-now functionality, in accordance with an embodiment.

As shown in FIG. 21, upon completion of the playback of the advertisement, the user can be presented with a transition message 492. In accordance with an embodiment, the user can elect to always receive the long advertisements by turning long advertisements "ON" 493. Using the above example, in an hour the user will receive another long advertisement automatically.

Figure 22:
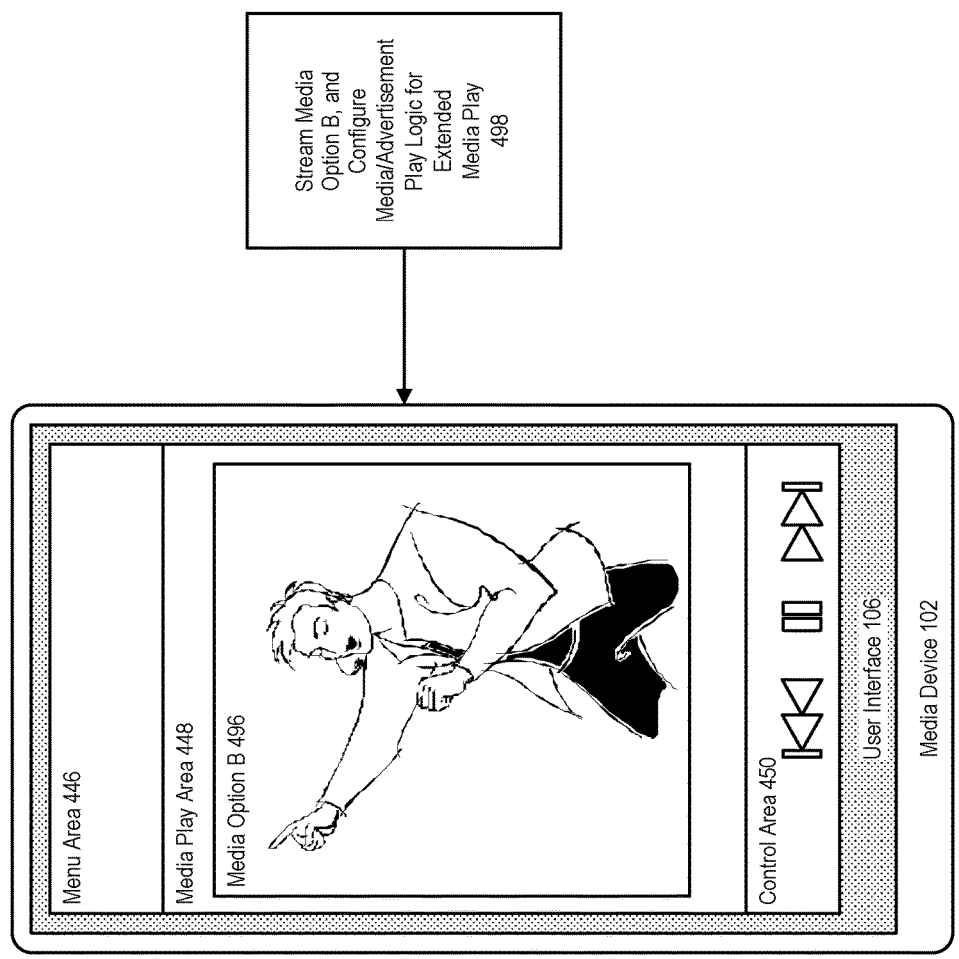
FIG. 22 further illustrates a use of watch-now functionality, in accordance with an embodiment.

FIG. 22 further illustrates a use of watch-now functionality, in accordance with an embodiment.

As shown in FIG. 22, upon completion of the playback of the advertisement, the system can then skip to the next media option for playback (e.g., media option B 496), and configure 498 the media play logic for extended media play.

For example, in accordance with an embodiment, when an elected advertisement has been viewed in its entirety, users may enjoy a 60 minute long extended media play period of no-advertisements; instead of a regular media play that plays, for example, an advertisement every 15 minutes.

Figure 23:
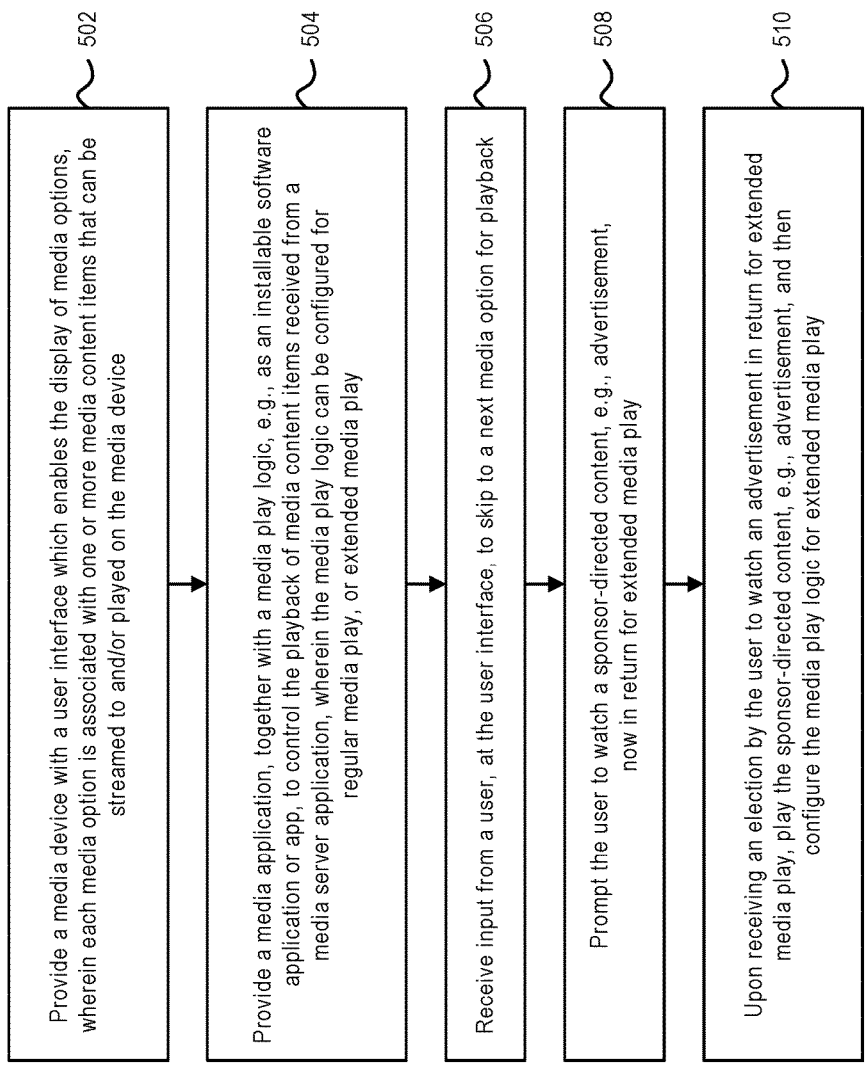
FIG. 23 illustrates a method for providing watch-now functionality, in accordance with an embodiment.

FIG. 23 illustrates a method for providing watch-now functionality, in accordance with an embodiment.

As shown in FIG. 23, at step 502, a media device with a user interface is provided which enables the display of media options, wherein each media option is associated with one or more media content items that can be streamed to and/or played on the media device.

At step, 504, a media application, together with a media play logic, for example as an installable software application or app, is provided to control the playback of media content items received from a media server application, wherein the media play logic can be configured for regular media play, or extended media play.

At step 506, input is received from a user, at the user interface, to skip to a next media option for playback.

At step 508, the user is prompted to watch an advertisement now, in return for extended media play. For example, the advertisement can be a longer advertisement than would typically be injected into the media stream.

At step 510, upon receiving an election by the user to watch an advertisement now, in return for extended media play, the media application plays the advertisement, and then skips to the next media option for playback, and configures the media play logic for extended media play.

In accordance with an embodiment, a system is described for providing media content including watch-now functionality, comprising a media device including a microprocessor; a user interface adapted to display media options corresponding to items of media content, and determine user inputs; and a media play logic adapted to control playback of media content received from a media server, including periodically displaying, at the user interface, a prompt to a user to elect to play an offered advertisement or other sponsor-directed content, in return for a period of extended media play, and upon receiving, as a user input, an election by the user to play the offered advertisement or other sponsor-directed content, in return for the period of extended media play, playing the offered advertisement or other sponsor-directed content and one of configuring the media play logic for the period of extended media play including relatively less frequent subsequent advertisements, or prompting the user to select one of an extended media play configuration or a regular media play configuration.

In accordance with an embodiment, the system supports a method comprising providing, at a media device including a microprocessor, a user interface adapted to display media options corresponding to items of media content adapted to be received from a media server, and determine user inputs; controlling playback of media content received from the media server, including periodically displaying, at the user interface, a prompt to a user to elect to play an offered advertisement or other sponsor-directed content, in return for a period of extended media play, and upon receiving, as a user input, an election by the user to play the offered advertisement or other sponsor-directed content, in return for the period of extended media play, playing the offered advertisement or other sponsor-directed content and one of configuring the media play logic for the period of extended media play including relatively less frequent subsequent advertisements, or prompting the user to select one of an extended media play configuration or a regular media play configuration.

In accordance with an embodiment, the media server is adapted to insert the offered advertisement or other sponsor-directed content into a media stream being streamed by the media server to the media device.

In accordance with an embodiment, the media play logic is adapted so that, upon an election not being received to play the offered advertisement or other sponsor-directed content in return for the period of extended media play, then the media play logic is configured for regular media play configuration including relatively more frequent subsequent advertisements.

In accordance with an embodiment, the media play logic is adapted to be configurable to always play offered advertisements, as if they had been elected by the user for playing, in return for periods of extended media play.

In accordance with an embodiment, the media server one or both stores the media content and the advertisement or other sponsor-directed content, or receives the media content and the advertisement or other sponsor-directed content from another system, for providing to the media device.

In accordance with an embodiment, the system further comprise a plurality of media devices, and a plurality of media servers adapted to stream media content and advertisements to the media devices.

Selection of Advertisements Based on Playlist Context

In accordance with an embodiment, the system includes support for selection of targeted advertisement or other sponsor-directed content based on a playlist context. A media device enables access by a user to one or more playlists of media content at a media server. Advertisements can be selected for providing to the user, based on one or more characteristics of a playlist, such as the playlist's description, or the playlist being part of an advertisement campaign. For example, a playlist bearing a particular descriptive title can be used to trigger advertisements that may be relevant to that descriptive title. Adding a particular song to a playlist can be used to trigger advertisements that may be relevant to that song.

In accordance with an embodiment, both sponsor-curated and user-curated playlists can be analyzed by the system, for example using the techniques describe above, in order to trigger advertisements to insert into the media stream controlled by that playlist, while the user is listening to (or in the case of a video playlist, watching) those media content items indicated within the playlist.

For example, an advertisement can be targeted to a user based on a playlist name, keywords found in the playlist, or a playlist description and/or metadata derived from such information.

For example, playlists curated by users and stored in a playlist memory/database either at the user's media device or at the media server can provide good representations of mood, context, genre, and other qualities of the media content items associated with the playlists.

In accordance with an embodiment, selection by a user of a sponsor-curated or user-curated playlist can also be used to trigger the insertion of an advertisement. For example, if a sponsor-curated playlist includes a soundtrack from a movie, then an advertisement for that movie can be triggered and streamed to the user together with the soundtrack for the move. A sponsor-curated playlist may also be part of an advertisement campaign. Should a user select that playlist or media from that playlist, the user will also receive an advertisement related to the advertisement campaign.

Figure 24:
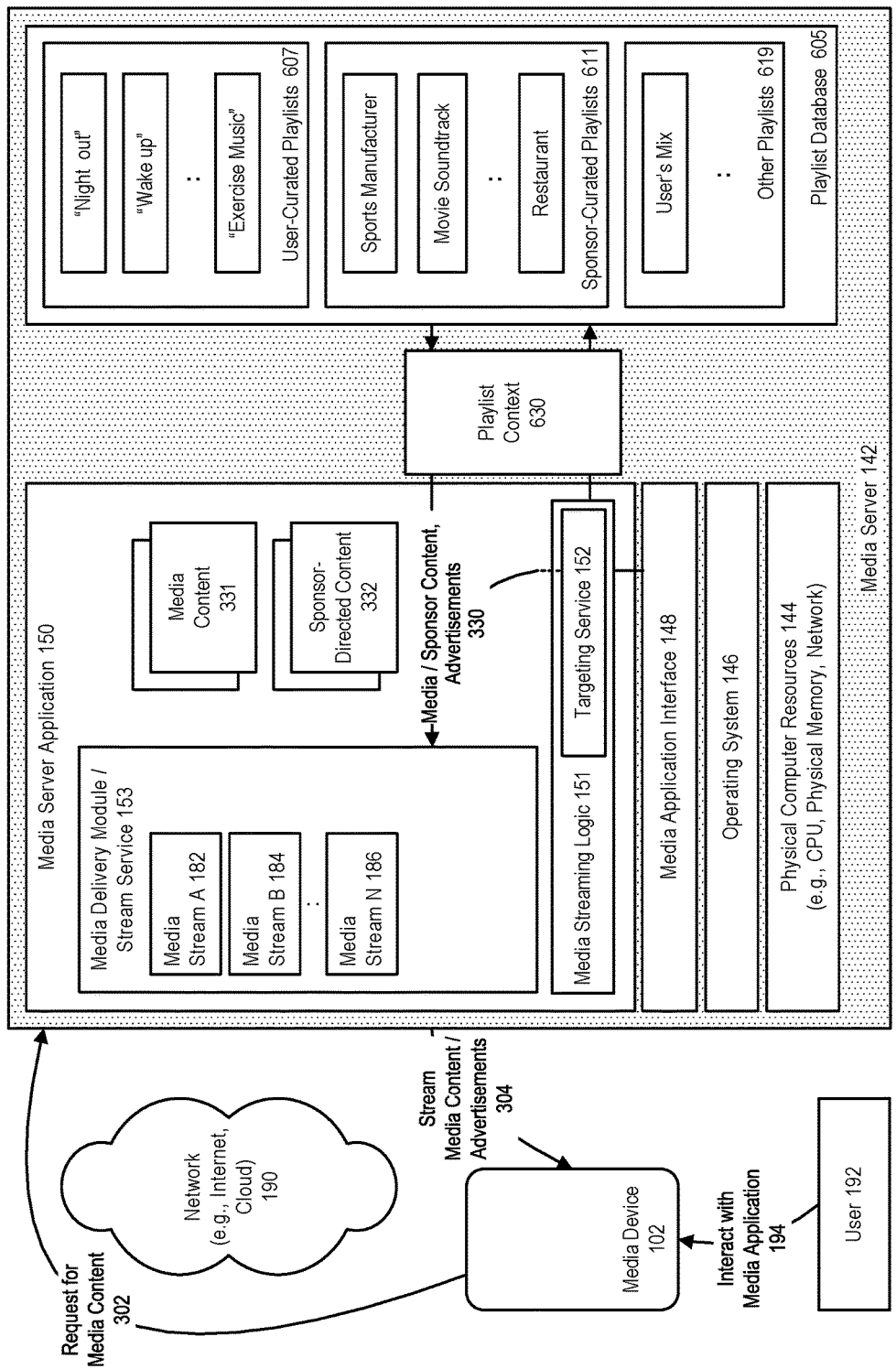
FIG. 24 illustrates a system that supports selection of targeted advertisements based on a playlist context, in accordance with an embodiment.

FIG. 24 illustrates a system that supports selection of targeted advertisements based on a playlist context, in accordance with an embodiment.

As shown in FIG. 24, and as described above, in accordance with various embodiments, the media device can be, for example, a personal computer system, handheld entertainment device, tablet device, smartphone, television, audio speaker, in-car entertainment system, or other type of electronic or media device that is adapted or able to prepare, control the presentation of, and/or play media content, for example, music, video, or television content. Each of the media device and the media server can include, respectively, one or more physical device or computer hardware resources, such as one or more processors, physical memory, network components, or other types of hardware resources. A media device can optionally include a user interface, which is adapted to display media options, and to determine a user interaction or input. The media device can also include a media application and media play logic which controls the playback of media content received from the media server, for playing either at a requesting client device, or at a controlled client device. A user can interact with the media application at a media device, for example using the user interface, and issue requests to access media content, such as the playing of a selected music or video item at their media device or at a controlled device, or the streaming of a media channel or video stream to their media device or to a controlled device.

In accordance with an embodiment, a playlist database 605 includes information about one or more user-curated playlists 607, sponsor-curated playlists 611, or other playlists 619. For example, a sponsor-curated playlist can be identified as or associated with a sporting goods manufacturer, movie soundtrack, or restaurant. A user-curated playlist can be identified as or associated with the description of an activity, for example "night out", "wake up", or "exercise music". Other playlists can be associated with other descriptions, for example a User's Mix. Again, these are provided by way of example and are not intended to be limiting examples.

In accordance with an embodiment, when a user or device interacts with a playlist, e.g., to create or use, the system can recognize a playlist context 630 associated with that interaction.

In accordance with an embodiment, a sponsor-directed content or advertisement can be selected based on one or more qualities of media content items associated with the user curated playlist.

For example, in accordance with an embodiment, playlists can be curated according to themes, or commonality of music qualities. Advertisements promoting music or sponsor-directed content can be provided in is less like message-based advertisements, can include, for example, music track samples inserted between music content items in a playlist. Such music track samples or sponsor-directed content can be well targeted by analysis of user curated playlists. For example, if a playlist includes all tracks falling under a certain subgenre of music, then an advertisement from a newly released compilation of such songs can be inserted into the media stream, or a sample from one or more tracks in the newly released compilation can be inserted into the media stream. Such specificity in curated music can be well suited for tightly targeted sponsor-directed content.

Keywords within a user curated playlist title, or within a description of the playlist can be used to select sponsor-directed content. For example, a playlist titled "wake-up" can key the media streaming logic of a media server to select and insert promoted music with early morning themes.

Keywords extracted from an analysis of a playlist can further be refined in meaning by analysis of the music content of the playlist to potentially improve selection of sponsor-directed content. For example, as described above, metadata about the tracks in the playlist can be obtained and analyzed in a similar manner to analysis of ad hoc streams.

For example, metadata describing the musical qualities (e.g., mood, genre, tempo, etc.) of the media content of the playlist can be combined with the text of the playlist to determine what the title and/or description of the playlist represents. Such an analysis can be especially useful for analyzing playlists curated by users.

In accordance with an embodiment, sponsor-directed content targeting user curated playlist can be determined through analysis of the playlist in real time or near-real time as the user requests the playlist to be streamed. Alternatively, the playlist can be analyzed separately from a request to stream, and metadata created by the analysis can be associated with the playlist for the use in selecting sponsor-directed content each time the playlist is played.

Figure 25:
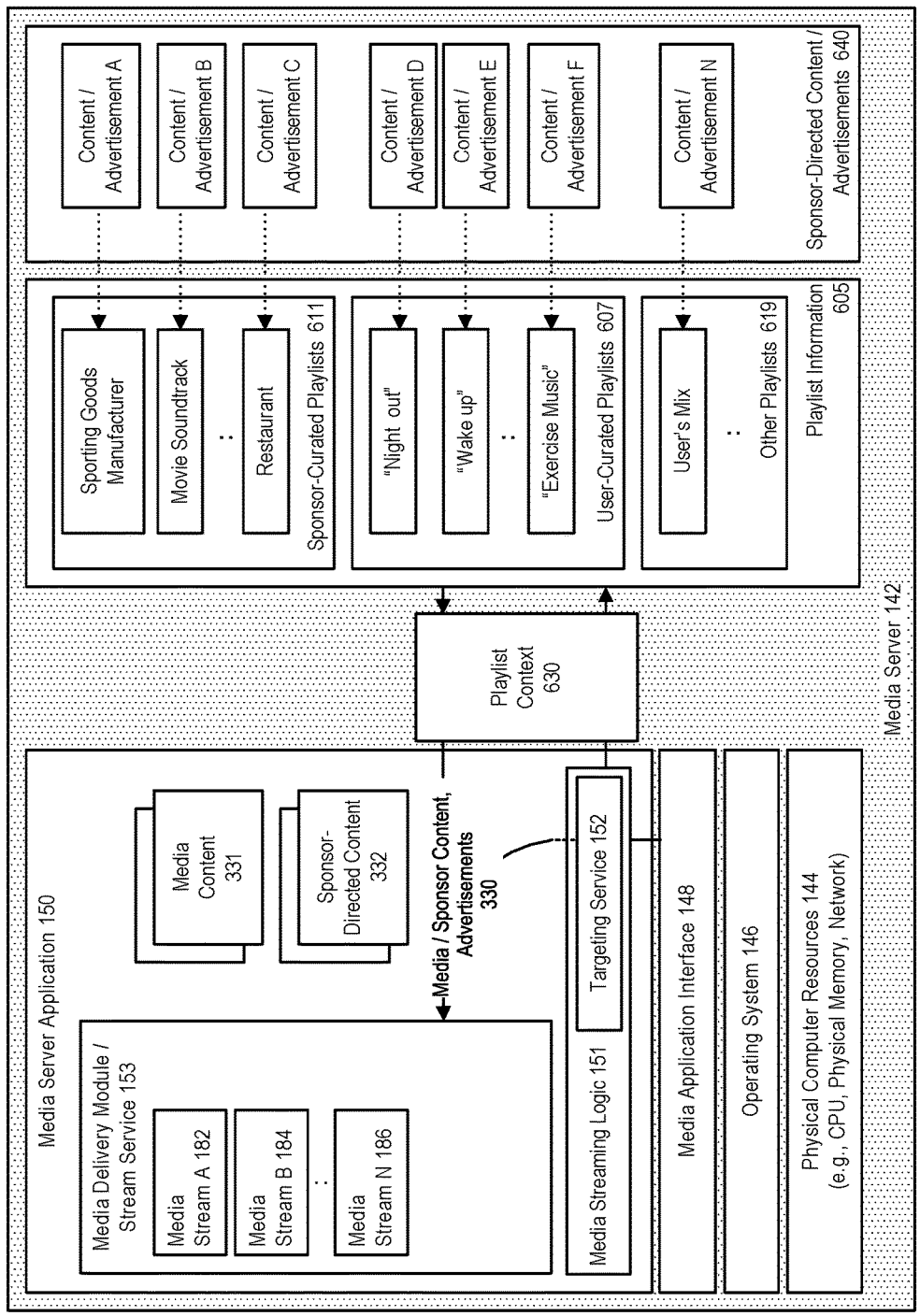
FIG. 25 further illustrates selection of targeted advertisements based on a playlist context, in accordance with an embodiment.

FIG. 25 further illustrates selection of targeted advertisements based on a playlist context, in accordance with an embodiment.

As shown in FIG. 25, in accordance with an embodiment, each playlist can be associated with sponsor-directed content or advertisements 640, such as content/advertisement A through N. This allows the system to determine appropriate sponsor-directed content for a particular playlist.

Figure 26:
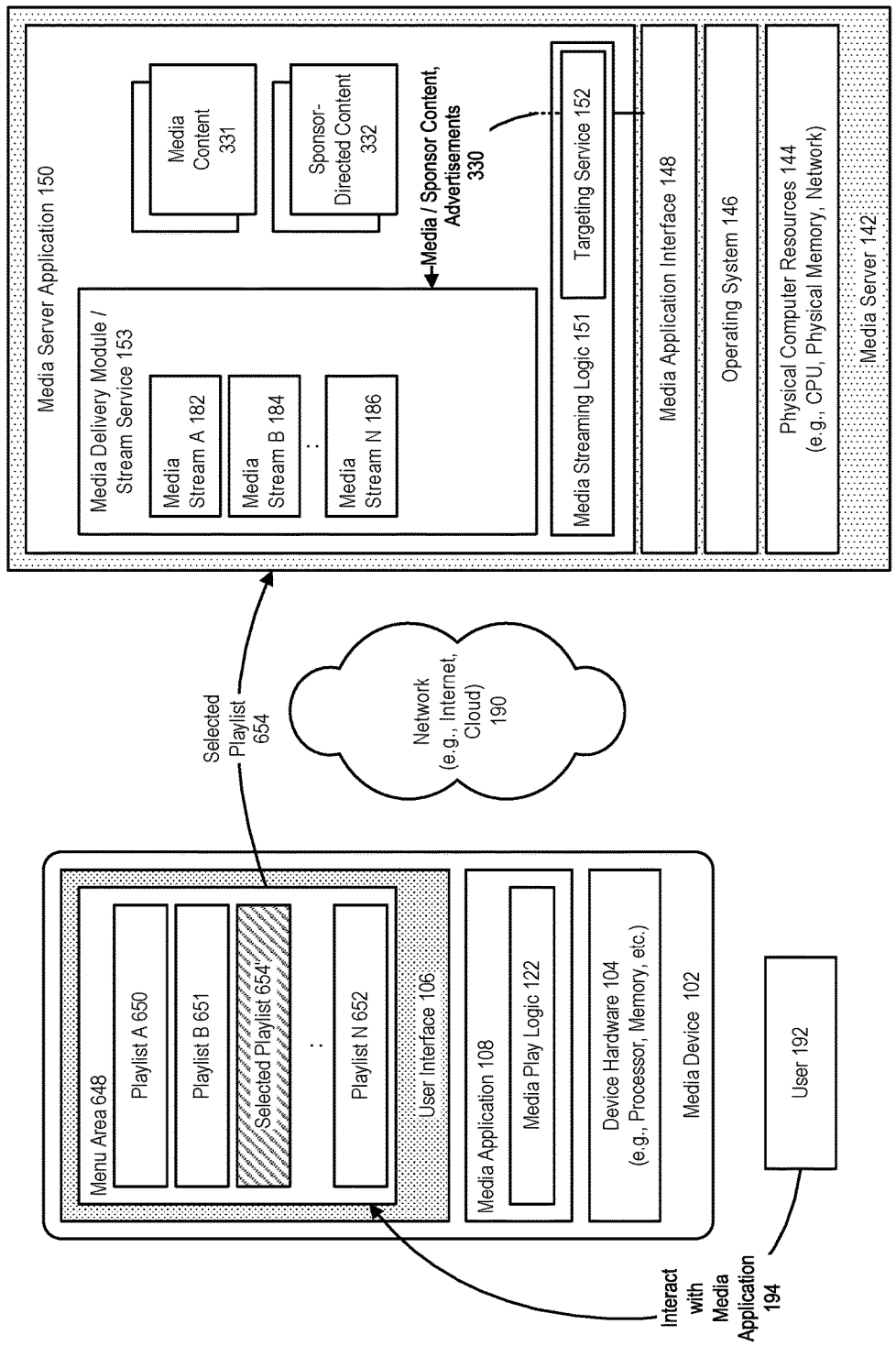
FIG. 26 further illustrates selection of targeted advertisements based on a playlist context, in accordance with an embodiment.

FIG. 26 further illustrates selection of targeted advertisements based on a playlist context, in accordance with an embodiment.

As shown in FIG. 26, the user interface can allow a user to select one of a plurality of playlists, including playlist A 650, B 651 through N 652. When a particular playlist is selected, data indicating the selected playlist 654 is passed to the media server for use in targeting.

Figure 27:
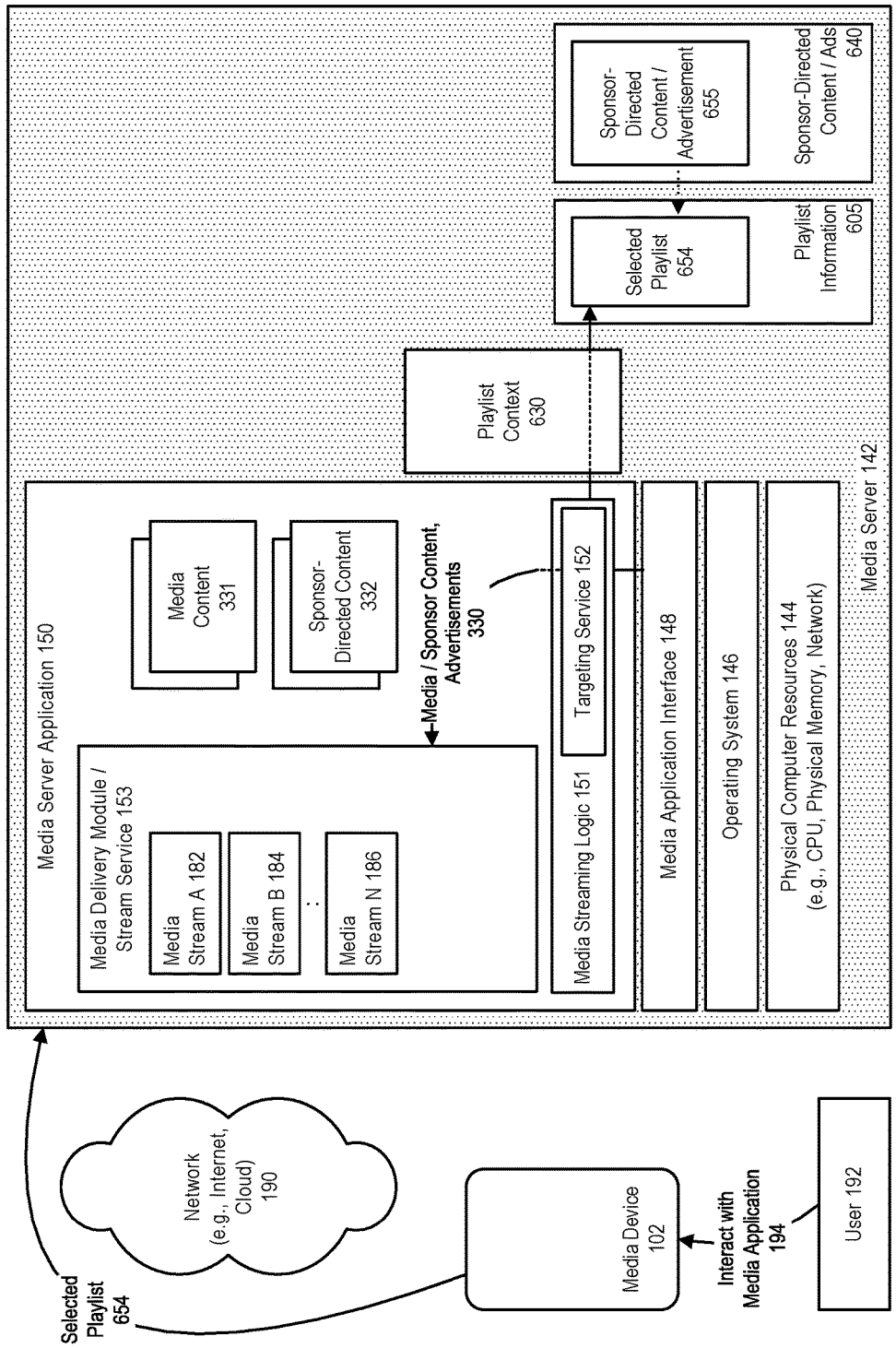
FIG. 27 further illustrates selection of targeted advertisements based on a playlist context, in accordance with an embodiment.

FIG. 27 further illustrates selection of targeted advertisements based on a playlist context, in accordance with an embodiment.

As shown in FIG. 27, in accordance with an embodiment, the selected playlist and its playlist context can be used to determine an appropriate sponsor-directed advertisement 655.

Figure 28:
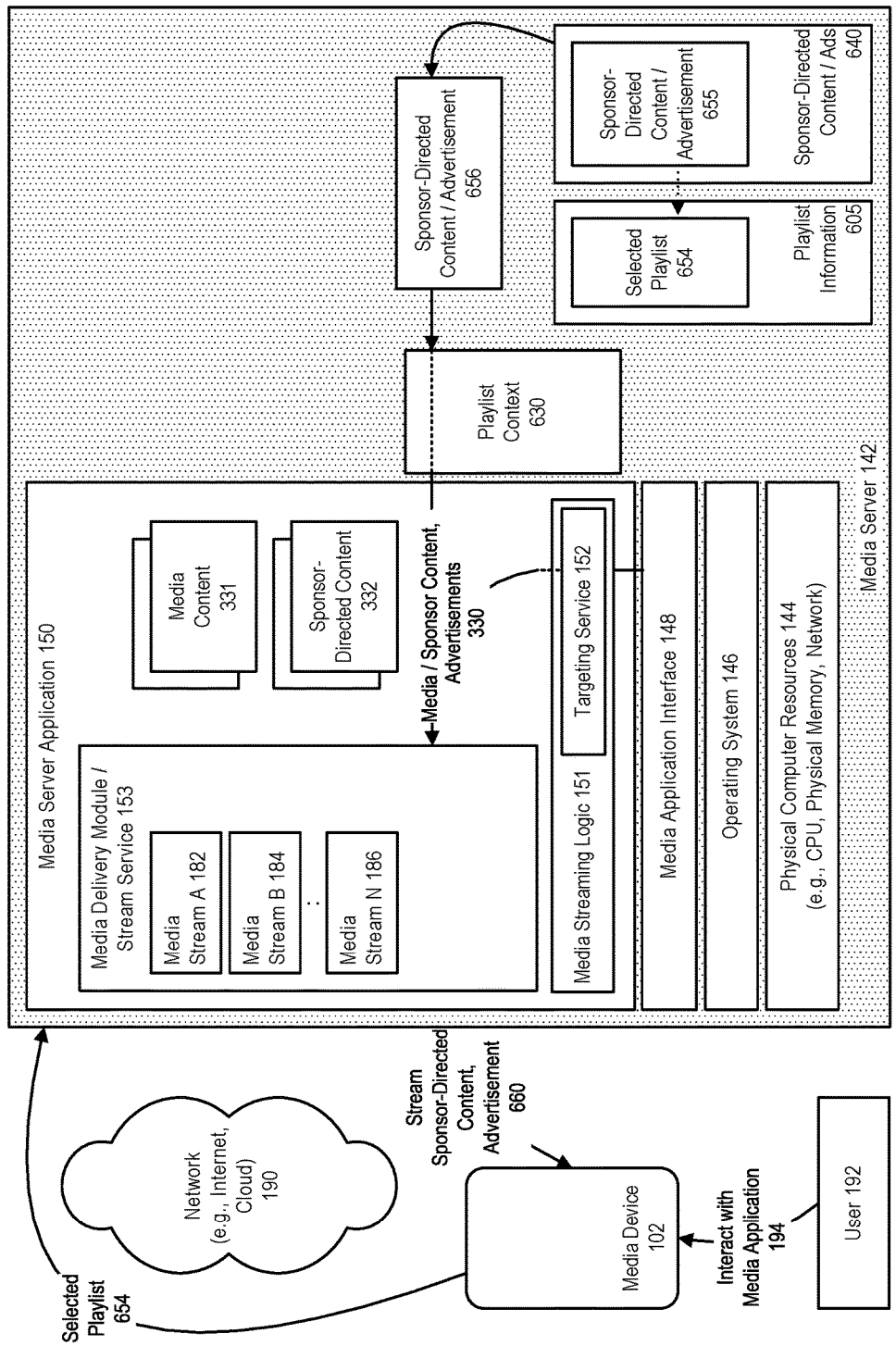
FIG. 28 further illustrates selection of targeted advertisements based on a playlist context, in accordance with an embodiment.

FIG. 28 further illustrates selection of targeted advertisements based on a playlist context, in accordance with an embodiment.

As shown in FIG. 28, in accordance with an embodiment, the sponsor-content advertisement 656 can be provided to the media server, for streaming 660 to the media device.

A user can interact with the user interface of the user media device. The user media device is similar to previously described user media devices in that it has an operating system that runs on a microprocessor. The media device includes a media application with a media play logic which controls the user interface and the user selections sent to the media server. The media application and the media play logic control and receive user interactions from the menu area, the media play area and the control area.

Figure 29:
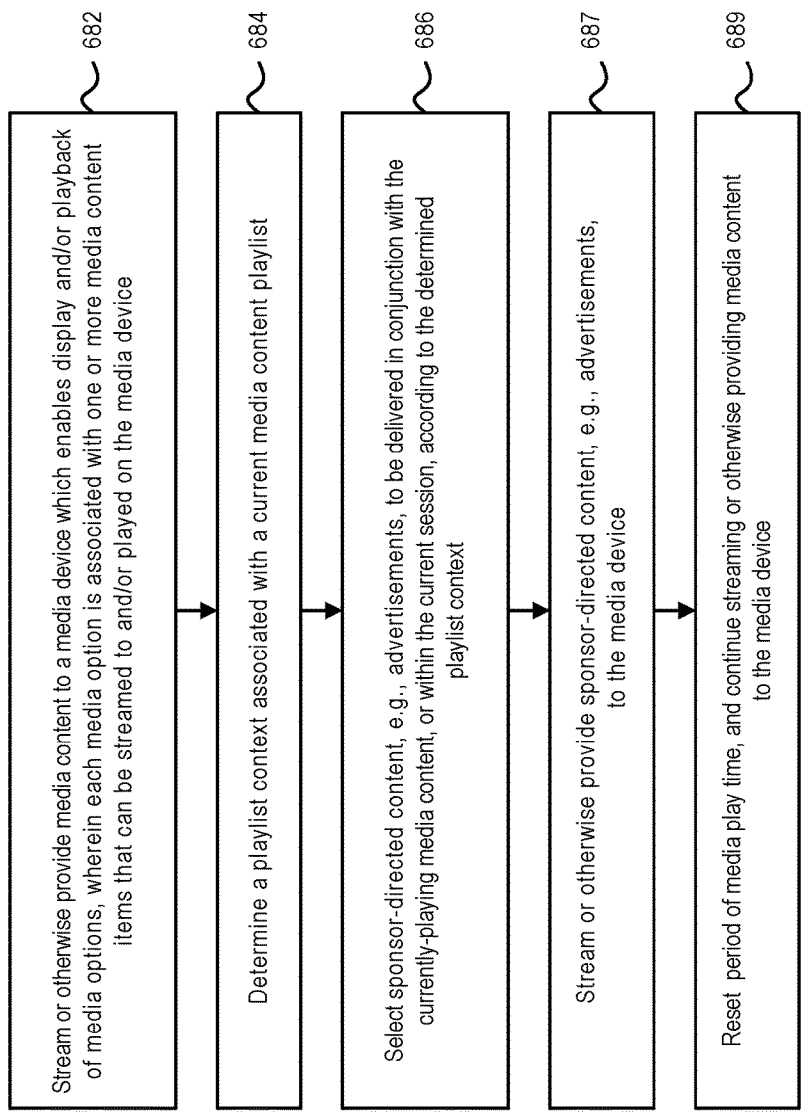
FIG. 29 illustrates method of selecting targeted advertisements based on a playlist context, in accordance with an embodiment.

FIG. 29 illustrates method of selecting targeted advertisements based on a playlist context, in accordance with an embodiment.

As shown in FIG. 29, in accordance with an embodiment, at step 682, media content is streamed or otherwise provided to a media device which enables display and/or playback of media options, wherein each media option is associated with one or more media content items that can be streamed to and/or played on the media device.

At step 684, a playlist context associated with a current media content playlist, is determined.

At step 686, sponsor-directed content, e.g., advertisements, is selected to be delivered in conjunction with the currently-playing media content, or within the current session, according to the determined playlist context.

At step 687, sponsor-directed content, e.g., advertisements, is streamed or otherwise provided to the media device.

At step 689, a period of media play time is reset, and the streaming or otherwise providing media content to the media device continues.

The media server can trigger analysis when a number of followers (or subscribers) and/or stream instances of a user curated playlist exceeds a threshold, at which point the playlist can be presumed to be of sufficient quality and appeal. The playlist can then be analyzed for keywords using the playlist name and/or the description accompanying the playlist. Sponsor-directed contents (e.g., advertisements) can then be associated with the playlist based on the analysis.

In accordance with an embodiment, sponsor curated playlists (stored in playlist memory or database) can relate to content associated with the sponsor, or with partners of the sponsors, in accordance with an embodiment. The sponsor curated playlist (e.g., media playlists) can be curated based on the business of the sponsor, the advertisements of the sponsor, the advertisement campaigns of the sponsor, and the activities of the sponsor and/or the sponsor's community, by way of example. The playlists can be curated with themes that can appeal to services and/or products of the sponsor. For example, a restaurant may curate a morning playlist, with advertisements for a breakfast menu, inserted at appropriate breaks, in the media stream.

Alternatively, instead of advertisements, the playlist can be curated with music with lyrics and/or themes that reference the sponsor in a pop culture context and/or that mention in lyrics breakfast foods that happen to be sold as part of the breakfast menu. Such playlists can, for example, include mentions of the sponsor more briefly than the length of a typical advertisement, relying instead on a brief mention in combination with the lyrics and themes of the playlist.

As another example, a sports equipment manufacturer curated work-out playlist can provide the opportunity for the manufacturer to insert advertisements for services and/or products of the manufacturer in the media stream for the work-out playlist. The association of the manufacturer with athletics and fitness can allow the manufacturer to build goodwill with potential customers and partners not by inserting sponsor advertisements, but rather by inserting content about partners such content about partners may include partners that may sell products or services that may interest fitness users, such as heart rate monitors. Such content may alternatively be content that is of use to fitness users, such as public service-style announcements that provide guidelines for maintaining hydration. Such community-oriented playlist curating can help gain a following for the sponsor and further associate goodwill with the sponsor.

In accordance with an embodiment, the system can receive a request to stream a playlist and streaming media content from the playlist for some period of time. When the stream time exceeds some amount of minutes (e.g., x minutes), the media server is prompted to select and insert the sponsor-directed content into the stream. The media server selects sponsor-directed content (e.g., advertisements) to stream from a pool of content generally associated with the playlist and/or sponsor-directed content or advertisements associated with the playlist. The sponsor-directed content can be selected from the pool of content randomly, or based on sponsor prioritization, and/or based on the qualities of the media content of the playlist and/or the user profile, and/or the media device context. Once selected, the sponsor-directed content is streamed to the media device that requested the playlist.

In accordance with an embodiment, the sponsor-directed content can be selected from the pool of content, based on the qualities of the media content of the playlist, the user profile, and/or the media device context. As described, the method comprises receiving a request to stream a playlist to a media device and streaming media content from the playlist to the media device for some period of time. When the stream time exceeds some amount of minutes (e.g., x minutes), the media server is prompted to select and insert the sponsor-directed content into the stream. The media server determines a pool of sponsor-directed content associated with the playlist.

In accordance with an embodiment, the media server can obtain metadata related to the just-streamed media content from a metadata, and optionally contextual information from a user profile, and/or contextual information about the media device. The metadata and contextual information can be used by the media streaming logic of the media server to select sponsor-directed content (e.g., one or more advertisements) from the pool of sponsor-directed content determined to be associated with the playlist. Once selected, the sponsor-directed content is streamed to the media device that requested the previous media content. After the sponsor-directed content has been delivered and consumed, the next media content items are streamed and the method is repeated. The obtained metadata can be purged and the time until the next break for sponsor-directed content can be reset.

As described above, sponsor curated playlists can be curated by the sponsor, but alternatively can be curated on behalf of the sponsor by the third-party. In accordance with an embodiment, playlists can be created on behalf of a sponsor by a centralized group of teams associated with the media server. In accordance with an embodiment, playlists can be manually created and curated, for example, by selected teams based on, e.g., genre, mood, target activity. In other embodiments, playlists can be created and curated for rotating sponsorship.

For example, a workout playlist can be created and subsequently sponsored based on rising popularity among users. Sponsorships may lapse or otherwise expire, giving other sponsors an opportunity to sponsor playlists that continue to be popular among a user base. Sponsor-directed content can be updated based on changes in sponsorship. Sponsor playlists can be branded and promoted using the name of the sponsor, or alternatively the sponsors can remain hidden, having a presence in the sponsor-directed content or advertisements, but otherwise maintaining a low profile. In accordance with an embodiment, multiple sponsor playlists can be collected together under a brand, and promoted together under the brand.

Sponsor playlists can further be curated that are directly related to a product and/or service of the sponsor. For example, a sponsor playlist of music from the soundtrack of a movie can be sponsored by the producers of the movie. Sponsor-directed content can include advertisements for the movie itself. The server can determine if music played from the soundtrack is played in the context of the playlist, or rather played in a radio context and not associated with the soundtrack in particular.

Playlist information, such as track listings, descriptions, title, and optionally metadata, can be stored, for example, in a database of the media server or an external database accessible to the media server. Operations can be performed on the playlist, include, for example, deleting a track, adding a track, deletion of playlist, and/or modification of text of the playlist. Once updated, the information in the database can be stored in the databases.

In accordance with an embodiment, a system is described for delivering a media content based on a playlist context, comprising a media device including a microprocessor; a user interface adapted to display media options, including playlists, corresponding to items of media content, and determine user inputs; and a media play logic adapted to control playback of media content received from a media server, wherein the media play logic is adapted to trigger and to receive from the media server, a stream of media content, in conjunction with a particular advertisement or other sponsor-directed content, depending on a selected playlist.

In accordance with an embodiment, the system supports a method comprising providing, at a media device including a microprocessor, a user interface adapted to display media options, including playlists, corresponding to items of media content adapted to be received from a media server, and determine user inputs; and controlling playback of media content received from the media server, including triggering and receiving from the media server, a stream of media content, in conjunction with a particular advertisement or other sponsor-directed content, depending on a selected playlist.

In accordance with an embodiment, advertisements or other sponsor-directed content received by the media device, from the media server, depends at least partly on analytical and descriptive data associated with particular items of media content, and a user profile associated with the user.

In accordance with an embodiment, the analytical data that provides for the delivery of advertisements or other sponsor-directed content includes at least one of a tempo, consonance, pitch and texture of media content associated with the selected playlist.

In accordance with an embodiment, the descriptive data that provides for the delivery of advertisements or other sponsor-directed includes at least one of a genre, mood, lyrics, and keywords of media content associated with the selected playlist.

In accordance with an embodiment, the user profile that provides for the delivery of advertisements or other sponsor-directed includes at least one of a location data and a type of media device associated with the user.

In accordance with an embodiment, the user profile that provides for the delivery of advertisements or other sponsor-directed includes a location data coordinated with at least one of events, places, and environmental conditions in proximity to the user.

In accordance with an embodiment, the playlists include one or more user-curated or sponsor-curated playlists, each of which indicates items of media content that can be related to one or more advertisements for a particular sponsor.

In accordance with an embodiment, a sponsor-curated playlist includes media selections that can be related to an advertisement campaign of the sponsor and are used to determine advertisements related to that advertisement campaign.

In accordance with an embodiment, advertisements received by the media device depend at least partly on analytical and descriptive data associated with the sponsor-curated playlist.

Enhanced User-Sponsor Interaction

In accordance with an embodiment, the system includes support for delivery of media content with enhanced user-sponsor interaction. User interaction with a media device can be provided by, for example, voice or tactile command, in addition or as an alternative to the device's regular user interface. For example, a user can interact with an advertisement or other sponsor-directed content, by speaking to or shaking their device, to signal a preference for a particular type of content or advertisement. As another example, a spoken or shaking action can be used to trigger or to pause an advertisement break within a media stream, so that the user can control advertisement breaks to better suit their particular lifestyle.

In accordance with an embodiment, the system can be used to improve the user experience of receiving sponsor-directed content or advertisements, by allowing the user to have control of, manage, and interact with such sponsor-directed content through user inputs. In accordance with various embodiments, the system can use alternative methods of signaling a user preference for an advertisement style or type. For example, such alternative methods can allow a user to select the previously described watch-now or play now functionality whereby the user obtains extended media play for playing a longer advertisement. Such alternative methods can also allow the users to skip, or rate, or up vote or down vote an advertisement using audio or voice inputs and commands through by way of example, a headset microphone in a mobile device. Accordingly, user feedback can be taken into account as advertisements are streamed to the user.

In accordance with an embodiment, alternative methods of signaling user preference can use a shaking action with a mobile device to trigger an advertisement break or pause. With such shaking action, the user can start or stop advertisement breaks earlier than scheduled as the user desires. Alternatively a shaking action could trigger a longer advertisement break such that the user does not receive and avoids the next scheduled advertisement break.

Such features enable the user to manage how and when the user receives and plays an advertisement. This control over the advertisement enhances the user's enjoyment and allows the user to take in more of the advertisement and learn more about the message of the advertisement at the user's own pace.

Figure 30:
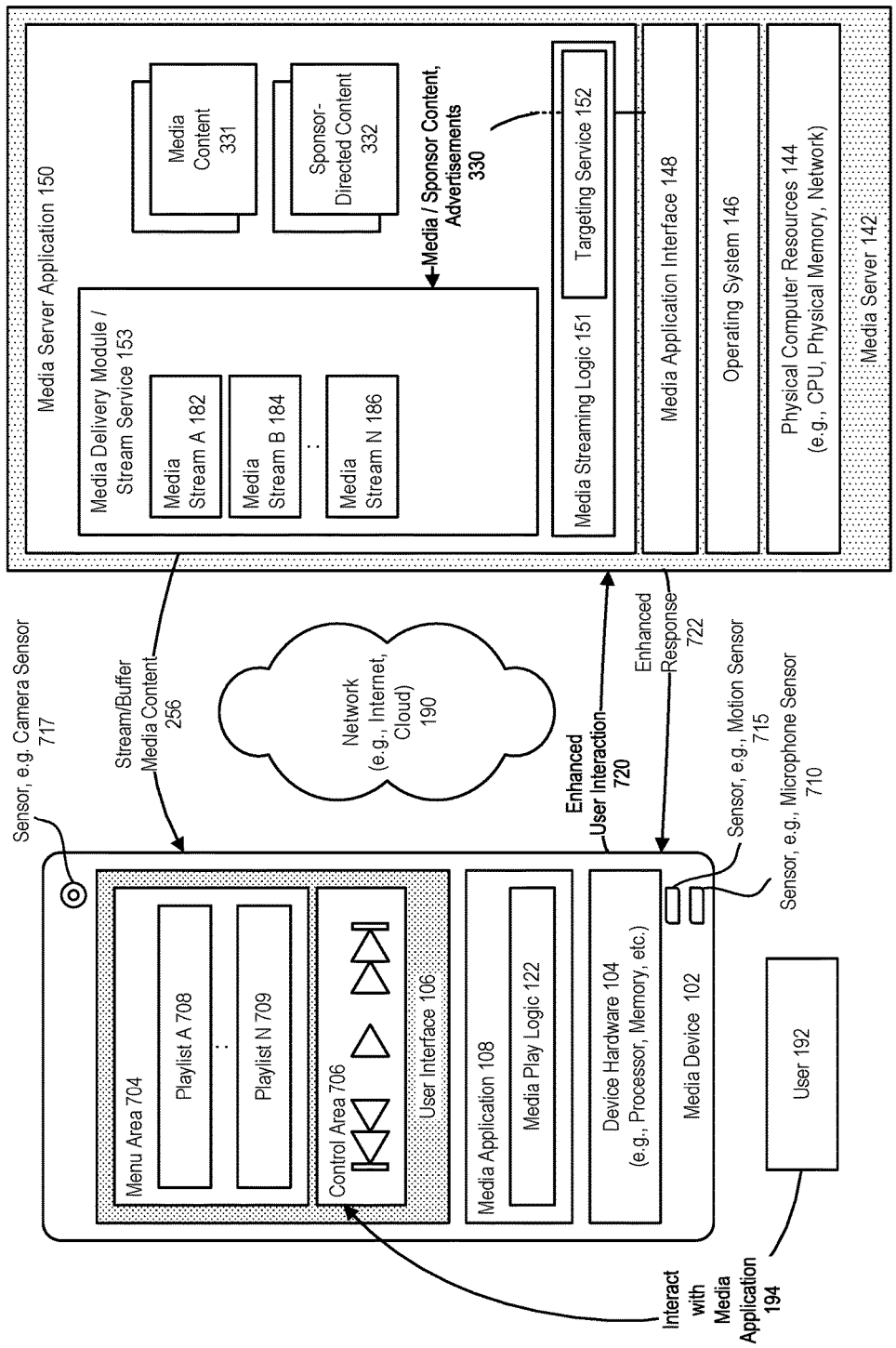
FIG. 30 illustrates a system that supports delivery of media content with enhanced user-sponsor interaction, in accordance with an embodiment.

FIG. 30 illustrates a system that supports delivery of media content with enhanced user-sponsor interaction, in accordance with an embodiment.

As shown in FIG. 30, and as described above, in accordance with various embodiments, the media device can be, for example, a personal computer system, handheld entertainment device, tablet device, smartphone, television, audio speaker, in-car entertainment system, or other type of electronic or media device that is adapted or able to prepare, control the presentation of, and/or play media content, for example, music, video, or television content. Each of the media device and the media server can include, respectively, one or more physical device or computer hardware resources, such as one or more processors, physical memory, network components, or other types of hardware resources. A media device can optionally include a user interface, which is adapted to display media options, and to determine a user interaction or input. The media device can also include a media application and media play logic which controls the playback of media content received from the media server, for playing either at a requesting client device, or at a controlled client device. A user can interact with the media application at a media device, for example using the user interface, and issue requests to access media content, such as the playing of a selected music or video item at their media device or at a controlled device, or the streaming of a media channel or video stream to their media device or to a controlled device.

In accordance with an embodiment, the media device can include a user interface, which displays a menu area 704, and control area 706, and which is adapted to one of a plurality of playlists, including playlist A 708 through N 709. Selecting a particular media option or playlist can be used as a request or instruction to the media server application to stream or otherwise return a corresponding particular item of media content for playback on the media device.

As shown in FIG. 30, the media device can include one or more sensors, such as a microphone sensor 710, motion sensor 715, and/or camera sensor 717. The sensors can be use to provide an enhanced user interaction 720, with a media server, and receive an enhanced response 722.

In accordance with an embodiment, a user can interact with the media device through a variety of methods including the control buttons of control area, through motion sensors (which sense the user shaking the media device), through front and back facing cameras, and through a swiping or tapping action on the media play area which is presently displaying the media advertisement. It is to be understood that such interactive moves can be accomplished in addition to the use of the buttons in the control area. It is further to be understood that such interactive moves can be accomplished at any time even when the user is watching media and/or advertisements on the media play area. Whatever actions the user takes, such actions can be sent as user prompts to the media server.

Figure 31:
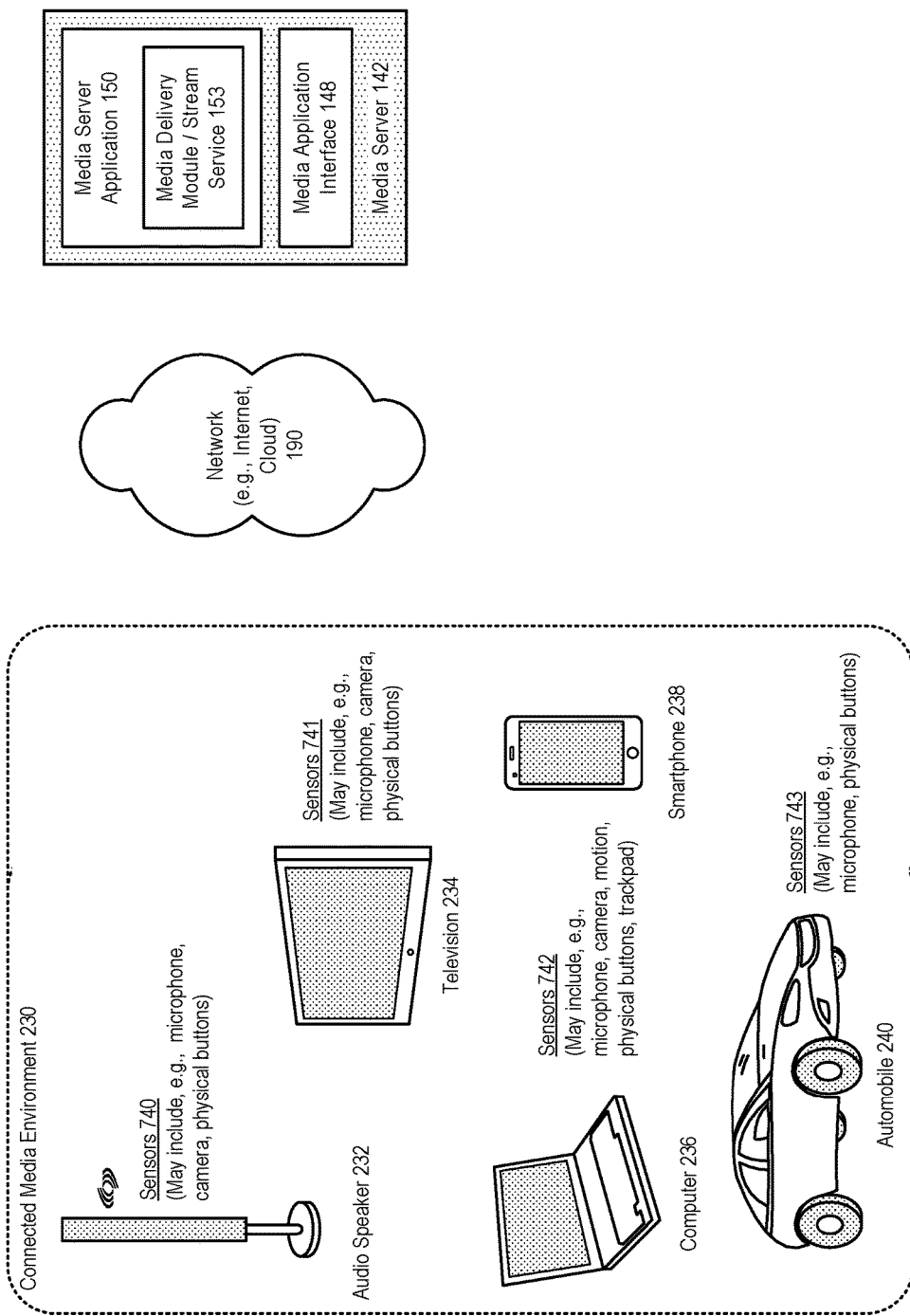
FIG. 31 further illustrates delivery of media content with enhanced user-sponsor interaction, in accordance with an embodiment.

FIG. 31 further illustrates delivery of media content with enhanced user-sponsor interaction, in accordance with an embodiment.

As shown in FIG. 31, example sensors can include, audio speaker sensors 740 such as a microphone, camera, or physical buttons; television sensors 741 such as a microphone, camera, or physical buttons; smartphone or computer sensors 742 such as a microphone, camera, motion detector, or physical buttons or trackpad; or automobile sensors 743 such as a microphone, or physical buttons.

Figure 32:
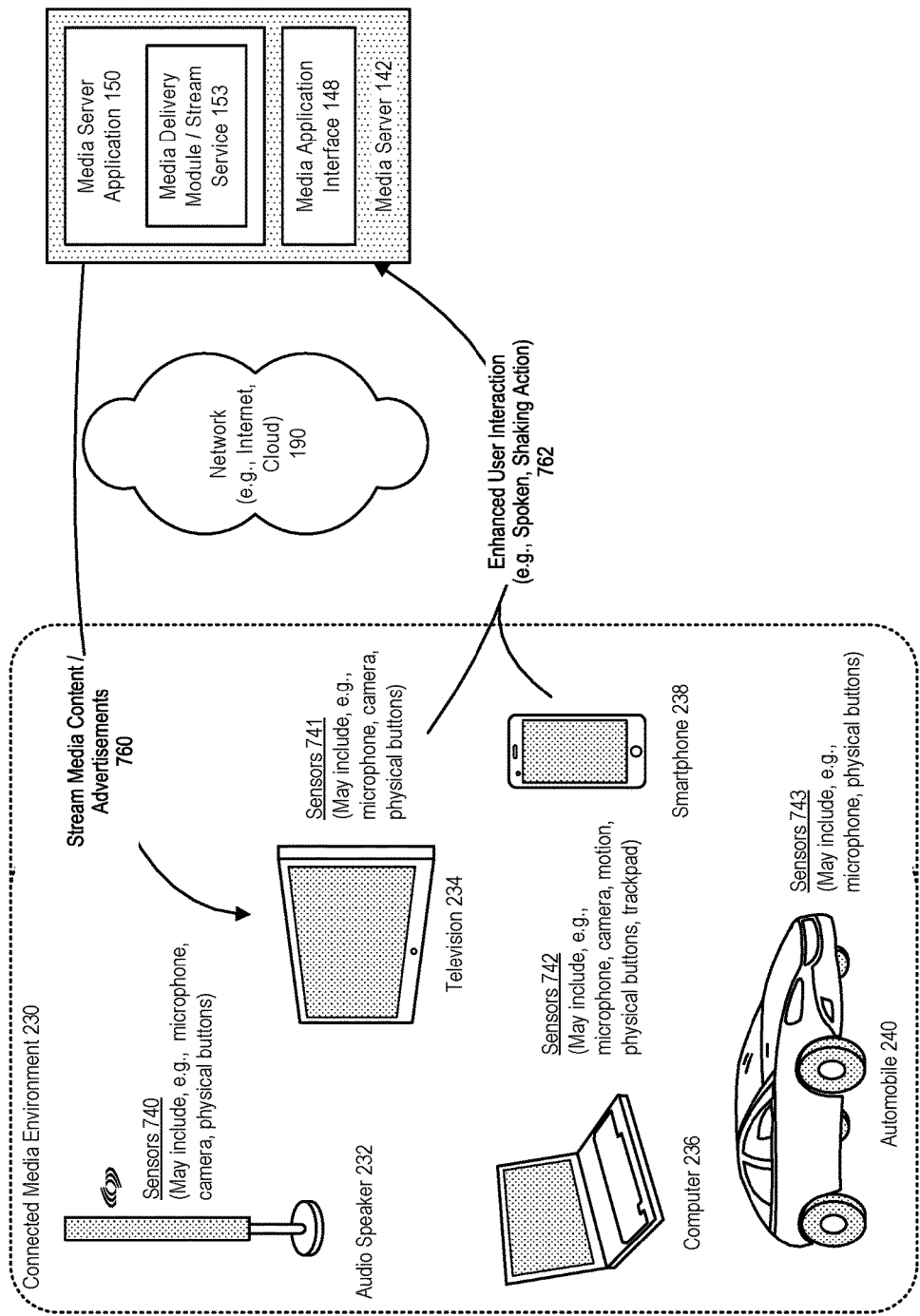
FIG. 32 further illustrates delivery of media content with enhanced user-sponsor interaction, in accordance with an embodiment.

FIG. 32 further illustrates delivery of media content with enhanced user-sponsor interaction, in accordance with an embodiment.

As shown in FIG. 32, a media device can receive streamed media content/advertisements 760 from the media server. At a particular point in time, a user can provided an enhanced user interaction 762, for example a shaking or spoken action, which is detected by the sensors of that mobile device and communicated to the media server. For example, the user can be prompted using an audio prompt to e.g., shake their media device or speak to follow a particular action.

Figure 33:
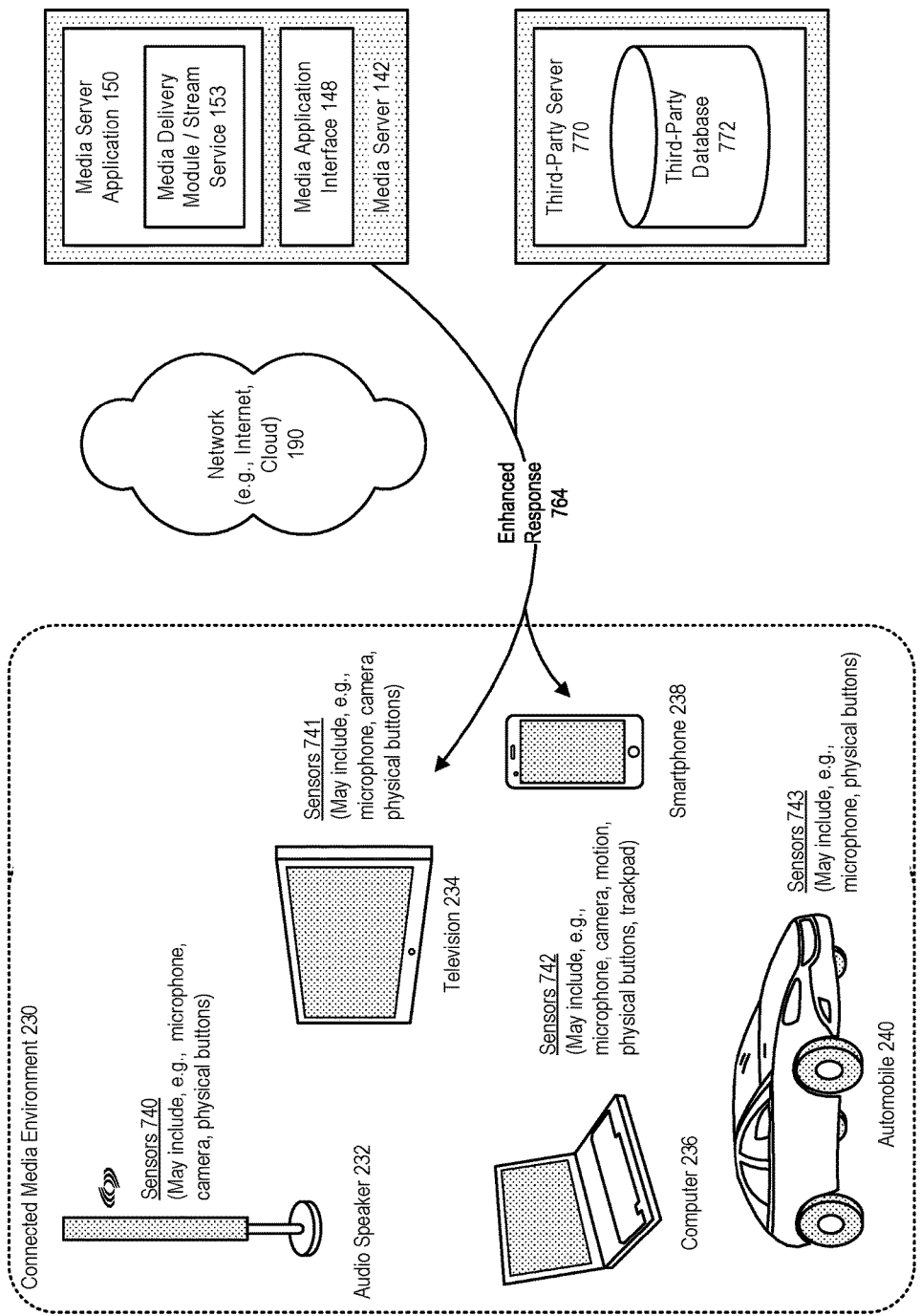
FIG. 33 further illustrates delivery of media content with enhanced user-sponsor interaction, in accordance with an embodiment.

FIG. 33 further illustrates delivery of media content with enhanced user-sponsor interaction, in accordance with an embodiment.

As shown in FIG. 33, the media device and user can receive an enhanced response 764, either from the media server, or from a third-party server 770, including a third-party database 772 of additional content.

Figure 34:
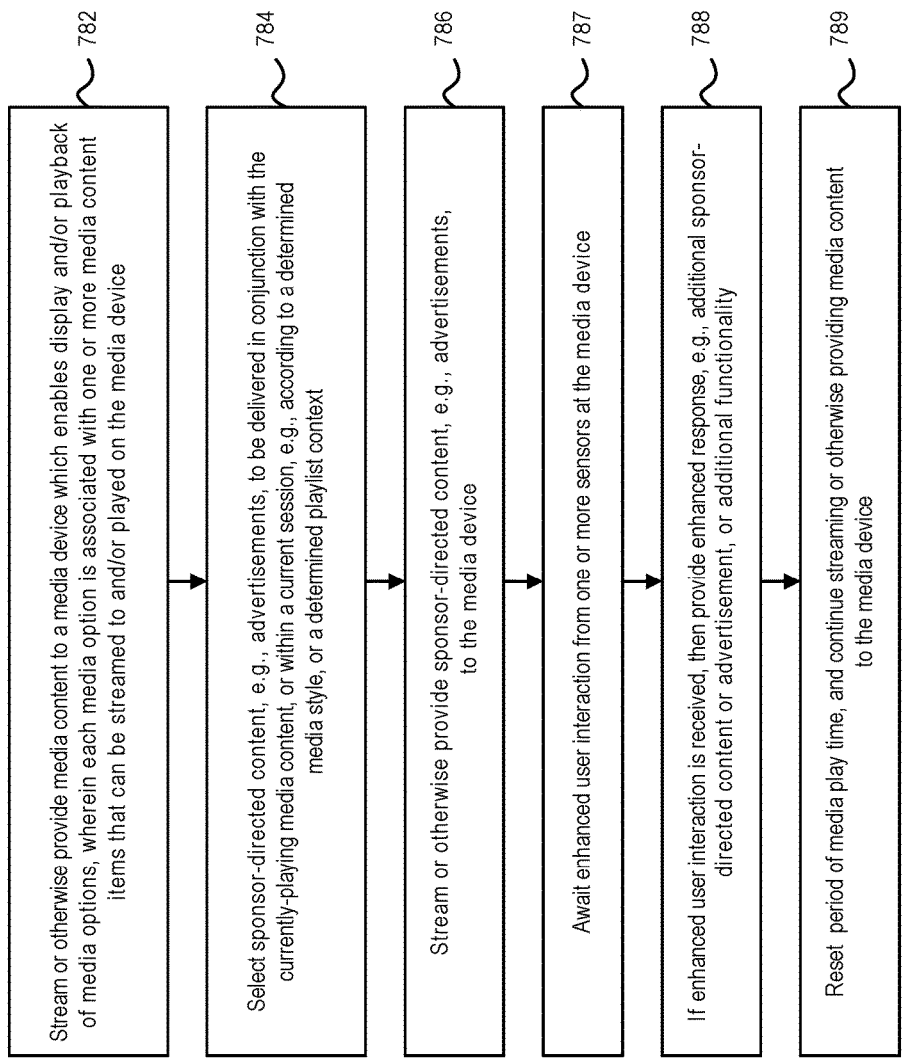
FIG. 34 illustrates a method for supporting delivery of media content with enhanced user-sponsor interaction, in accordance with an embodiment.

FIG. 34 illustrates a method for supporting delivery of media content with enhanced user-sponsor interaction, in accordance with an embodiment.

As shown in FIG. 34, at step 782, media content is streamed or otherwise provided to a media device which enables display and/or playback of media options, wherein each media option is associated with one or more media content items that can be streamed to and/or played on the media device.

At step 784, sponsor-directed content, e.g., advertisements, is selected to be delivered in conjunction with the currently-playing media content, or within a current session, e.g., according to a determined media style, or a determined playlist context.

At step 786, sponsor-directed content, e.g., advertisements, is streamed or otherwise provided to the media device.

At step 787, the system awaits an enhanced user interaction from one or more sensors at the media device.

At step 788, if an enhanced user interaction is received, then the system provides an enhanced response, e.g., additional sponsor-directed content or advertisement, or additional functionality.

At step 789, a period of media play time is reset, and the streaming or otherwise providing of media content to the media device continues.

In accordance with an embodiment, the interactive sponsor-directed content or advertisements can be selected based on one or more of media content qualities, playlist inclusion, user profile information and media device context, for example, as described above.

As described above, a user requesting a media stream can interact with a media play area of a media device to play, pause, advance, replay, and otherwise control the media content (and for that matter sponsor-directed content or advertisements) being delivered to the media play area of the media device.

Interaction can occur, for example, within a control area displaying icons corresponding to individual controls, for example by way of contact with a touch screen and/or by way of selection using an input device such as an onscreen pointer controlled by a mouse. Interaction can also occur anywhere in the media play area where enabled, either by controls, including gesture controls such as swiping left or right across the touchscreen, or by pop-up icons, for example.

Interaction can also occur during delivery of sponsor-directed content or advertisements, although the displayed controls and/or the interaction within the media play area can be different from those enabled during play of requested media content. For example, a sponsor may desire to prevent a user from skipping sponsor-directed content or advertisements by disabling or removing advance icons or interactions, such as swiping right to advance.

In accordance with an embodiment, a sponsor can tailor permitted interactions during delivery of sponsor-directed content or advertisements. Permitted interactions could include advancing to alternative sponsor-directed content or advertisements, or engaging with sponsor-directed content at a deeper level.

For example, a user may find a displayed advertisement appealing, and in accordance with an embodiment can be permitted to "learn more" by touching the sponsor-directed content displayed in the media play area of the media device or by touching a "learn more" button displayed in a control area. Additional and/or more extensive sponsor-directed content or advertisements can then be delivered to the media device.

Alternatively and/or additionally, some other action can occur relative to interaction with sponsor-directed content. For example, the media application can be prompted to launch a web browser on the media device and load the sponsor's website for the product in the web browser or load a site for purchasing the product, such as a product page for an online retailer. The media application can be prompted to launch other applications, for example, a map application. Such map application can then be prompted to load a specific physical address and/or prompted to load turn-by-turn or step-by-step directions to some location based off of input of location data describing the location of the media device.

In order to avoid interrupting the user's experience, upon interacting with sponsor-directed content via the media play area of the media device, a user can be prompted to confirm the user's desire to "learn more" or otherwise interact with the sponsor-directed content.

Some additional interactions can be enabled. For example, a replay icon or replay-causing swipe gesture can be enabled to allow a user to replay sponsored content, as such interactions can imply that the user may be interested in sponsor-directed content due to repeated hearing. This can be useful if the user is distracted, for example, or if the user may have just heard only a portion of the sponsor-directed content.

Certain media content streamed to a media device is consumed by the user with limited interaction by the user with the media device. For example, a user may stream multiple media content items, such as entire albums or playlists of music, or media content items of long length, such as an audio book or a lecture. The user may listen to a requested stream using headphones, and place the media device out of sight, for example in a pocket, shoulder bag, or on an armband. Where the media device is a smartphone, for example, the user may be required to retrieve the smartphone, enter a password to unlock the smartphone, select the media application on the touchscreen, and wait for the media play area to fill the touchscreen before being able to interact with sponsor-directed content.

In accordance with various embodiments, a user can interact with sponsor-directed content by interacting with a media device using inputs to the media device other than, or in addition to the standard touch-or-click interface of a media application used to play a media stream. The interaction can be transmitted by the media device to a media server via a user prompt. The media application interface of the media server can prompt the media server application to send additional sponsor-directed content, for example to subscribe the user to an artist or a playlist, play promoted music, play favorite promoted music, or perform any other function to the media application.

Alternatively, the media server application, or the media application, can send a response to the media device, for example a command to open an external application such as a command to open a web browser to a specific web address or a command to open a map application to a specific physical address in order to obtain additional sponsor-directed content.

In accordance with the above, interaction with the media device can be achieved through multiple different inputs and sensors. In accordance with an embodiment, a user can shake a smartphone having motion sensors to indicate interest in an advertisement, for example, rather than unlocking the user's phone and opening the application. If the interaction is likely unfamiliar to the user, the sponsor-directed content can prompt the user by means of audio instruction at the beginning of the sponsor-directed content (e.g., "shake device to learn more"). The media application of the media device can receive inputs from the motion sensors, interpret the shaking as a user prompt, and send the user prompt to the media server. The media server application interface can determine how to respond to the user prompt based on instructions associated with the particular advertisement to which the user responds.

In accordance with an embodiment, to obtain prompts from a user, a connection can be established with the core operating system of the media device, so that signals from sensors and other input devices such as camera or microphone can be read by the media application. In accordance with an embodiment, the media application determines which sensor information and input signals constitute user prompts, and control the information that is sent to the media server. In accordance with an embodiment, the media application and media server are capable of activating sensors, obtaining data from the operating system, and applying the data to an attribution for the application.

For example, in accordance with an embodiment, data received from the operating system can act as a "click" action, where click=true indicates prompting interest. In another embodiment, all sensor information and input signals can be sent directly to the media server where the media application interface can determine how to use the information received.

In accordance with various embodiments, detecting a user prompt using motion sensing with sensor is one form of interacting with a media device to generate a user prompt. However, many other input that can be detected by the media device, can be used to indicate a prompt. For example, smartphones and other mobile devices include integrated microphones that can be used for voice interaction. Rather than instructing a user to click on the interface to learn more, an audio prompt can be delivered such as "say the words 'learn more'" or "at the tone, say 'learn more' if you want to learn more" in order to obtain or learn more about a sponsored product and/or service.

Audio prompts for triggering interaction with promoted music can include, for example, "say the words 'play track'" or "say the words 'follow artist'", or some other combination of prompt words appropriate to the sponsor-directed content. Voice commands can be integrated into the media application's ability to launch other applications.

For example, a provider of a product and/or service can be contacted by verbally speaking the words "dial now", which could take the user to the phone function of a smartphone and dial a number to contact a customer service representative of the provider.

In accordance with an embodiment, the method can comprise streaming media content or some period of time. When the stream time exceeds some amount of minutes (e.g., x minutes), the media server is prompted to select and insert the sponsor-directed content into the stream. The media streaming logic selects sponsor-directed content (e.g., one or more advertisements) to stream based on one or more of obtained metadata related to qualities of the streamed media content, metadata related to a playlist where the playlist is selected for playback, user profile information, and media device context, for example, media device location. Once selected, the sponsor-directed content is streamed to the media device that requested the previously streamed media content. The media server can listen for a user prompt as the sponsor-directed content is delivered and consumed. If a prompt is detected, a response is launched that is appropriate to the sponsor-directed content that is being delivered at the moment of the prompt.

As described above, in accordance with an embodiment, the response can be, for example, to stream additional related sponsor-directed content and/or to launch an application, such as an external web browser with a specific web address related to additional sponsor-directed content or a map application such as with a specific location and with turn-by-turn or step-by-step directions to the location.

In accordance with an embodiment, the method comprises requesting a plurality of media content items, receiving a media stream in response to the request, receiving sponsor-directed content or advertisements inserted into the media stream, and prompting interaction with the sponsor-directed content in response to an indication by a user. A response to the interaction with the sponsor-directed content is then received.

As described above, such indication can be in at least one of the forms such as, touching a button on the control area or in the media play area, swiping the media play area screen, shaking the media device and accordingly its motion sensor, making a motion that is captured by the camera, and/or making a voice command that is captured by the microphone. The request for content items can be made via a user or client operating on the media device and can include, for example, video and/or audio content items, and/or playlist(s) including video and/or audio content items aggregated together in a playlist.

In accordance with an embodiment, the request is received by a media server and the media stream is received by the media device from the media server in response. After some period of time, the media server selects the sponsor-directed content and inserts the sponsor-directed content or advertisements into the stream.

In accordance with an embodiment, the user prompts an interaction with sponsor-directed content or advertisements by one or more inputs and sensors of the media device supplementing an interface of the media device. The response to the interaction with the sponsor-directed content can be determined by the media server and delivered to the media device, for example in the form of additional related sponsor-directed content inserted into the stream and/or a command to launch an application, such as an external web browser with a specific web address or a map application with a specific location and with turn-by-turn or step-by-step directions to the location.

For example, a user may use multiple different media devices to stream music from a media server. Different media devices can have different inputs that they accept and sensor information that they receive. For example, a user may use a desktop computer at work or home, a laptop computer on the road, a smartphone or other mobile device throughout the day. The inputs and/or sensor information used can depend on the type of media device being used and/or the context (for example, location) in which the media device is being used.

For example, a smartphone typically includes an integrated microphone, an integrated camera, motion sensors, location or GPS capabilities and physical buttons. A laptop typically includes an integrated microphone, an integrated camera, a track pad, and physical buttons including a keyboard and trackpad buttons. A desktop, however, may or may not include a microphone, and may or may not include a camera, but instead may include a mouse, and physical buttons including a keyboard and mouse buttons. Other devices to which media can be streamed, including television sets and internet connected radios (home or auto), may be limited to physical buttons, or may be controlled by sensor-equipped home entertainment devices. For example, a television connected with a motion sensing device can recognize gestures.

In addition to enabling different interactions with sponsor-directed content based on available inputs and/or sensor information, in accordance with an embodiment, the sponsor-directed content itself can be tailored based on knowledge of the inputs and/or sensor information available to the media device to which the media server streams media content.

As described above, media device context information can be useful to selecting sponsor-directed content. In the examples described above, location data can allow sponsor-directed content to be delivered based on local weather, local events, and/or the nature of a location. Sponsor-directed content can also be delivered based on knowledge of a make and model of the media device, from which the media server can ascertain available inputs and/or sensor information.

The additional inputs and sensor information can be useful in many different contexts other than the ones described above. For example, if a user prefers to listen to music or other programming while cooking in the kitchen, the user's hands may be full or wet with cooking ingredients, and therefore be unable to physically interact with the media device streaming media content from the media server. The user can, alternatively, interact with the media device by speaking verbal commands to "learn more" or to otherwise interact with sponsor-directed content.

In accordance with an embodiment, the media application can further allow the user to use different inputs and/or sensor information to operate the media application to play media content items and to interact (to pause, advance or replay), for example, with media content items. Encouraging use of verbal commands to request and play media content can improve the user's familiarity with interacting with the media application and thereby make interacting with sponsor-directed content more natural.

As additional input devices and sensor information becomes available on different media devices, the media applications operating on those devices can incorporate additional functionality. Embodiments described herein are not intended to be limited to the specific inputs and sensor information described herein.

As previously indicated, actions taken by the user with the media application can also be used to determine the context of the user and/or the relevance of sponsor-directed content to the user and/or determine that the user may not wish to recall sponsor-directed content.

For example, the media application can determine that the user starts skipping advertisements, or that the user tries to lower the volume of the sponsor-directed content, either by the user's interaction with the media application or by the use of the physical buttons of the media device. Such signals can indicate the relevance of the sponsor-directed content to the user. Certain actions taken by the user/user during sponsor-directed content can represent a negative signal that can be used in real-time to improve the sponsor-directed content that is selected for the user.

Quality scores based on implicit positive and negative signals can be used to attempt to optimize the user's experience. For example, negative signals such as volume decreases, media application focus changes, advertisement minimizations, attempted skips and media application exits, can be collected and weighted. Positive signals such as click-to rate, audio/video completion rate, and the like can also be collected and weighted.

In accordance with an embodiment, both positive and negative signals can then be analyzed and an overall quality score can be obtained, allow the server to quantify user experience. User experience data can continue to be collected to iteratively refine the sponsor-directed content selection, in a feedback loop.

In accordance with an embodiment, a system is described for providing enhanced user-sponsor interaction in a media environment, comprising a media device including a microprocessor; a user interface adapted to display media options corresponding to items of media content, and determine user inputs; and a media play logic adapted to control playback of media content received from a media server, including associating a request with the media device to cause a plurality of media content items to be delivered as a media stream from the media server to the media device; receiving, at the media device, an advertisement or other sponsor-directed content inserted into the media stream by the media server; and one of prompting or determining, using one or more sensors of the media device, an interaction by a user in connection with the advertisement or other sponsor-directed content, for use in providing an enhanced user-sponsor interaction.

In accordance with an embodiment, the system supports a method comprising providing, at a media device including a microprocessor, a user interface adapted to display media options corresponding to items of media content adapted to be received from a media server, and determine user inputs; controlling playback of media content received from the media server, including associating a request with the media device to cause a plurality of media content items to be delivered as a media stream from the media server to the media device; receiving, at the media device, an advertisement or other sponsor-directed content inserted into the media stream by the media server; and one of prompting or determining, using one or more sensors of the media device, an interaction by a user in connection with the advertisement or other sponsor-directed content, for use in providing an enhanced user-sponsor interaction.

In accordance with an embodiment, the interaction by the user in connection with the advertisement or other sponsor-directed content, is recognized as an indication by the user to skip through the advertisement or other sponsor-directed content.

In accordance with an embodiment, the interaction by the user in connection with the advertisement or other sponsor-directed content, is recognized as an indication of the user's preference for the advertisement or other sponsor-directed content, or a request to receive additional information in connection with the advertisement or other sponsor-directed content.

In accordance with an embodiment, the interaction by the user in connection with the advertisement or other sponsor-directed content, is recognized as an indication for the user to receive a period of extended media play in exchange for displaying a particular advertisement.

In accordance with an embodiment, the one or more sensors of the media device includes one or more microphone, motion sensor, or camera adapted to determine a gesture by the user as a user interaction.

In accordance with an embodiment, in response to a determined user interaction in connection with the advertisement or other sponsor-directed content, the method includes receiving an additional advertisement or other sponsor-directed content.

Delivery of Content and Advertisements in a Connected Media Environment

In accordance with an embodiment, the system includes support for delivery of media content and advertisement or other sponsor-directed content across a connected media environment. Playback can selectively follow a user from one location to another location, or from one media device to another media device, either maintaining a same session or switching sessions depending on the user's location, media device used, and user activity. Playback of advertisement or other sponsor-directed content can be synchronized between different areas of the connected media environment, or between different media devices, for example between a secondary device such as an audio speaker in a particular room, which is being controlled by a primary device such as a smartphone in another room.

In accordance with an embodiment media and advertisements may be played or viewed on a secondary media device which is synchronized with the primary media device of the user. In other words an embodiment provides for synchronized and connected media and advertisements.

Figure 35:
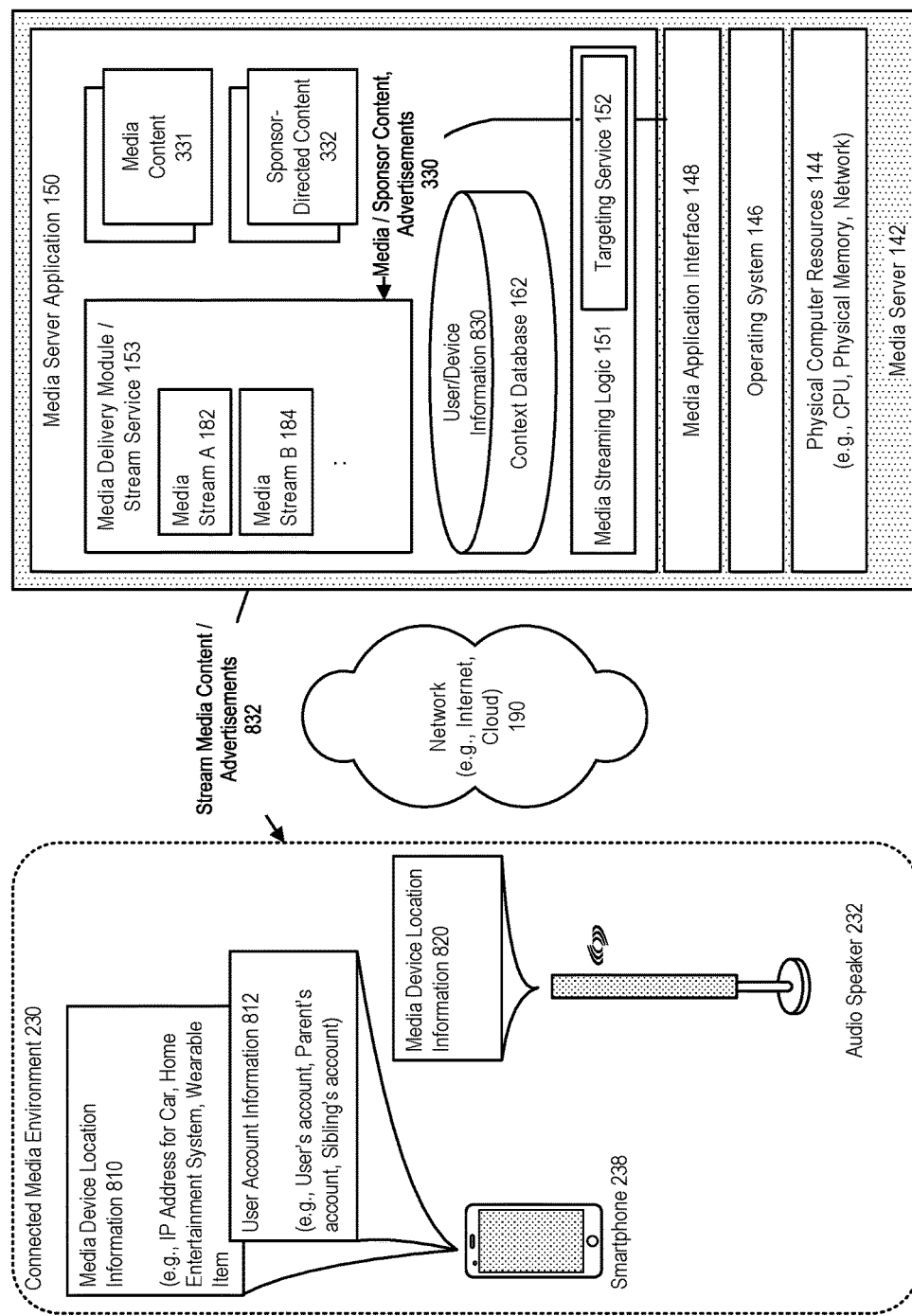
FIG. 35 illustrates a system that supports delivery of media content and sponsor-directed content or advertisements across a connected media environment, in accordance with an embodiment.

FIG. 35 illustrates a system that supports delivery of media content and sponsor-directed content or advertisements across a connected media environment, in accordance with an embodiment.

As shown in FIG. 35, and as described above, in accordance with various embodiments, the media device can be, for example, a personal computer system, handheld entertainment device, tablet device, smartphone, television, audio speaker, in-car entertainment system, or other type of electronic or media device that is adapted or able to prepare, control the presentation of, and/or play media content, for example, music, video, or television content. Each of the media device and the media server can include, respectively, one or more physical device or computer hardware resources, such as one or more processors, physical memory, network components, or other types of hardware resources. A media device can optionally include a user interface, which is adapted to display media options, and to determine a user interaction or input. The media device can also include a media application and media play logic which controls the playback of media content received from the media server, for playing either at a requesting client device, or at a controlled client device. A user can interact with the media application at a media device, for example using the user interface, and issue requests to access media content, such as the playing of a selected music or video item at their media device or at a controlled device, or the streaming of a media channel or video stream to their media device or to a controlled device.

In accordance with an embodiment, each media device can be associated with media device location information and/or user account information. For example a user's smartphone device can be associated with a media device location information 810 including one or more of an Internet address for use in a car, home entertainment system or as a wearable item, together with a user account information 812 such as being associated with a user's account parents account, siblings accounted etc.

Similarly, in accordance with an embodiment, an audio speaker can be associated with a media device location information 820. User/device information 830 can be provided at the media server, which allows the server to stream media content/advertisements 832 to the appropriate device within the connected media environment Accordingly, a user can move between media devices and have a continuous flow of media and/or advertisements and not abruptly be placed in the middle of new media or advertisements or have media or advertisements discontinued. In this manner, the media and advertisements can be synchronized and effectively connected between media devices, even though different users may be registered to the other media devices and even though different users may be using the different media devices.

In accordance with an embodiment, media and advertisements can be connected between, for example, a bedroom desktop platform, a living room home entertainment system, a wearable media device such as a smart watch, and an automobile navigation system as the user moves between those locations, with the different user media devices used in each of those locations.

In accordance with an embodiment, media and advertisements can be different between for example different rooms of a home. The different advertisements may be targeted to the different activities that may occur in different locations and/or room or may be targeted to the different devices located in the different locations and/or rooms.

Additionally, In accordance with an embodiment, media and advertisements may be served to wearable devices such as smart watches, smart glasses, helmets, self-powered headsets or earphones, and even wearable clothing. Media and advertisements can be delivered to media devices such as smartphones, tablets, laptops, desktop platforms and other platforms and such media and advertisements can be synchronized and served to wearable devices.

Accordingly, an advertisement, for example, can be served to a desktop platform and said advertisement may have a companion advertisement that is served to a wearable device such as a smart watch. The companion advertisement may allow the user to obtain more information related to the advertisement initially served to the desktop platform. Such additional information may be relevant to the user as the user moves about, and does not have access to the original desktop platform. Such additional information may, for example, be directs to a location or venue relevant to the original advertisement. Such additional information may, for example, include additional information that becomes more relevant when the user reaches a location or destination such as a restaurant first described in the original advertisement served to the desktop platform. Such additional information may include directions to a location that are served to a smart watch, smart glasses, another wearable device and/or a mobile phone.

Conversely, in accordance with an embodiment, the user may first hear an original advertisement on a wearable device, and later go to a desktop platform to view a companion advertisement that provides more information, and more easily and completely viewed information, such as maps and text about the topic of interest to the user.

For example, an advertisement may be streamed to a wearable device about an event. The user may then go to a desktop platform and log onto a website and be connected to the companion advertisement about the same event.

Additionally, advertisements can be targeted based on motion sensors in wearable media devices. Accordingly, when a user is moving as indicated by the motion sensors or the user changes from a stationary media device to a wearable media device, media and advertisements can be targeted and streamed to the user based on the real-time motion sensor data provided by the wearable or mobile media device.

In accordance with an embodiment, users can move from location to location and from media device to media device, and stay within the same session to continuously receive the same stream of media and advertisements. The devices are effectively connected and the media and advertisements are accordingly connected and synchronized together.

In accordance with an embodiment, in the menu area of the user media device, menus can be displayed to allow the user to move from media device to media device and location to location and stay within the same session. The menu area can show a menu of media device locations at menu and a menu of user/device accounts/privileges. The media device location menu can store the IP addresses of the various user media devices as well as the physical location information. The user/device accounts/privileges menus indicates which user devices and associated accounts that the user has access to and is able to add to any session for the streaming of media and advertising.

Figure 36:
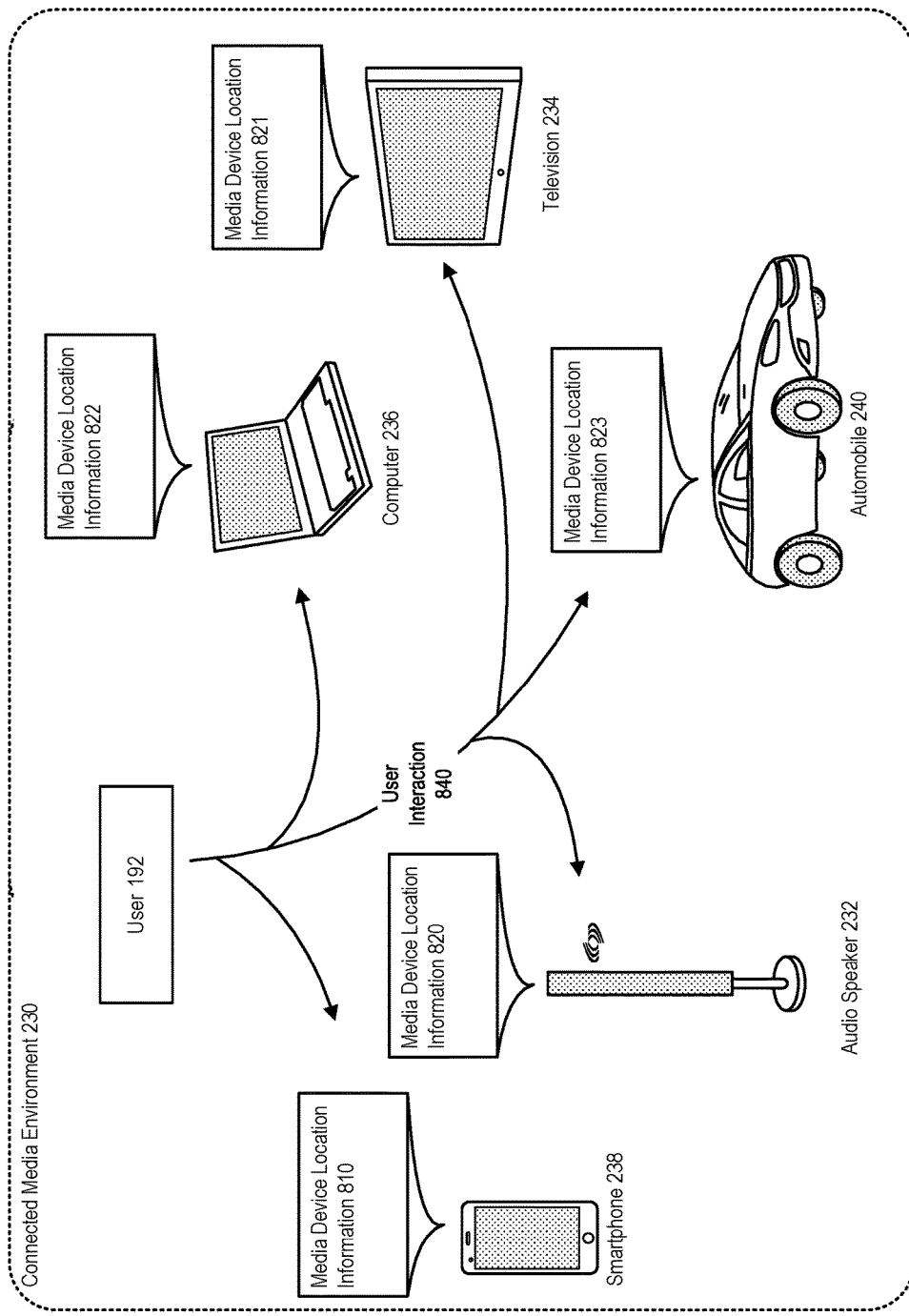
FIG. 36 further illustrates delivery of media content and sponsor-directed content or advertisements across a connected media environment, in accordance with an embodiment.

FIG. 36 further illustrates delivery of media content and sponsor-directed content or advertisements across a connected media environment, in accordance with an embodiment.

As shown in FIG. 36, each of the other devices such as television, computer and in-car entertainment systems can be similarly associated with a media device location information 821, 822, 823 respectively, and can allow user interaction 840.

Figure 37:
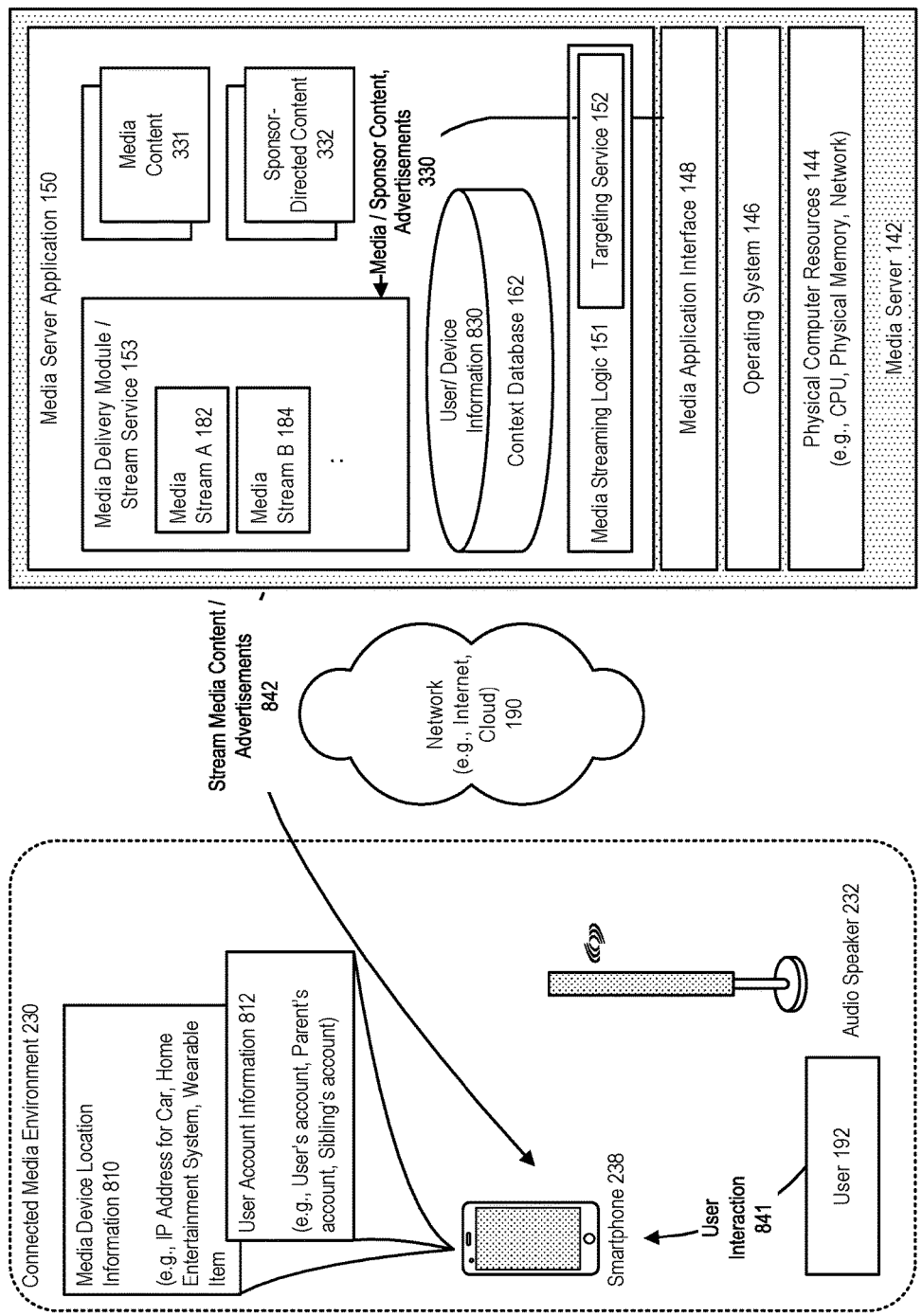
FIG. 37 further illustrates delivery of media content and sponsor-directed content or advertisements across a connected media environment, in accordance with an embodiment.

FIG. 37 further illustrates delivery of media content and sponsor-directed content or advertisements across a connected media environment, in accordance with an embodiment.

As shown in FIG. 37, as the user interacts 841 with a first device, in this example their smartphone, the media server can use its user/device information to direct 842 the media content and/or advertisements to the appropriate device.

Figure 38:
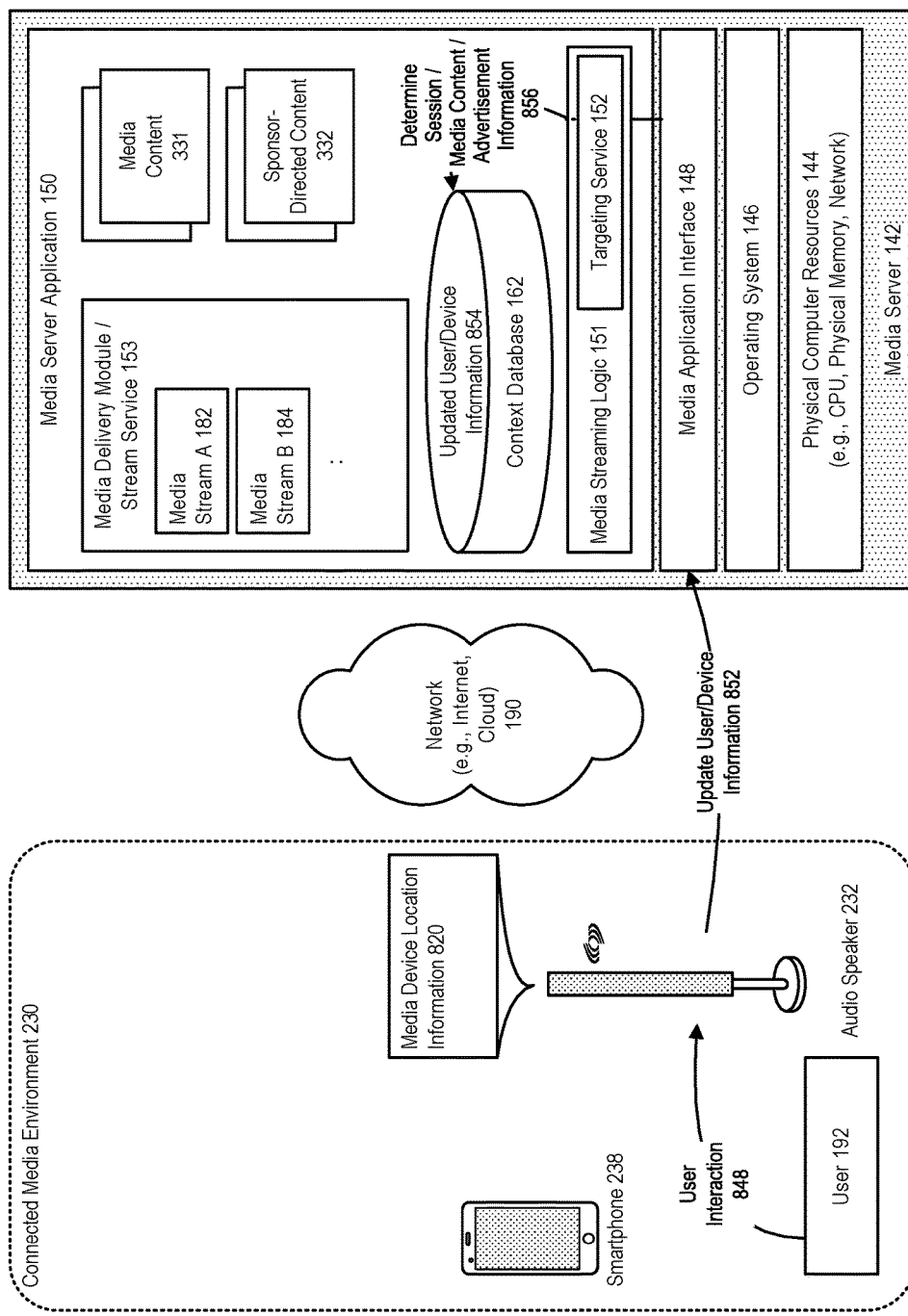
FIG. 38 further illustrates delivery of media content and sponsor-directed content or advertisements across a connected media environment, in accordance with an embodiment.

FIG. 38 further illustrates delivery of media content and sponsor-directed content or advertisements across a connected media environment, in accordance with an embodiment.

As shown in FIG. 38, if the user interacts 848 with a second or different device, or requests that content be sent to a different destination device, in this example their audio speaker, the connected media environment can update 852 the user/device information at the media server, to provide an updated user/device information 854. The media streaming logic can then use the updated user/device information to determine 856 a session/media content/advertisement information, based on the current context.

Figure 39:
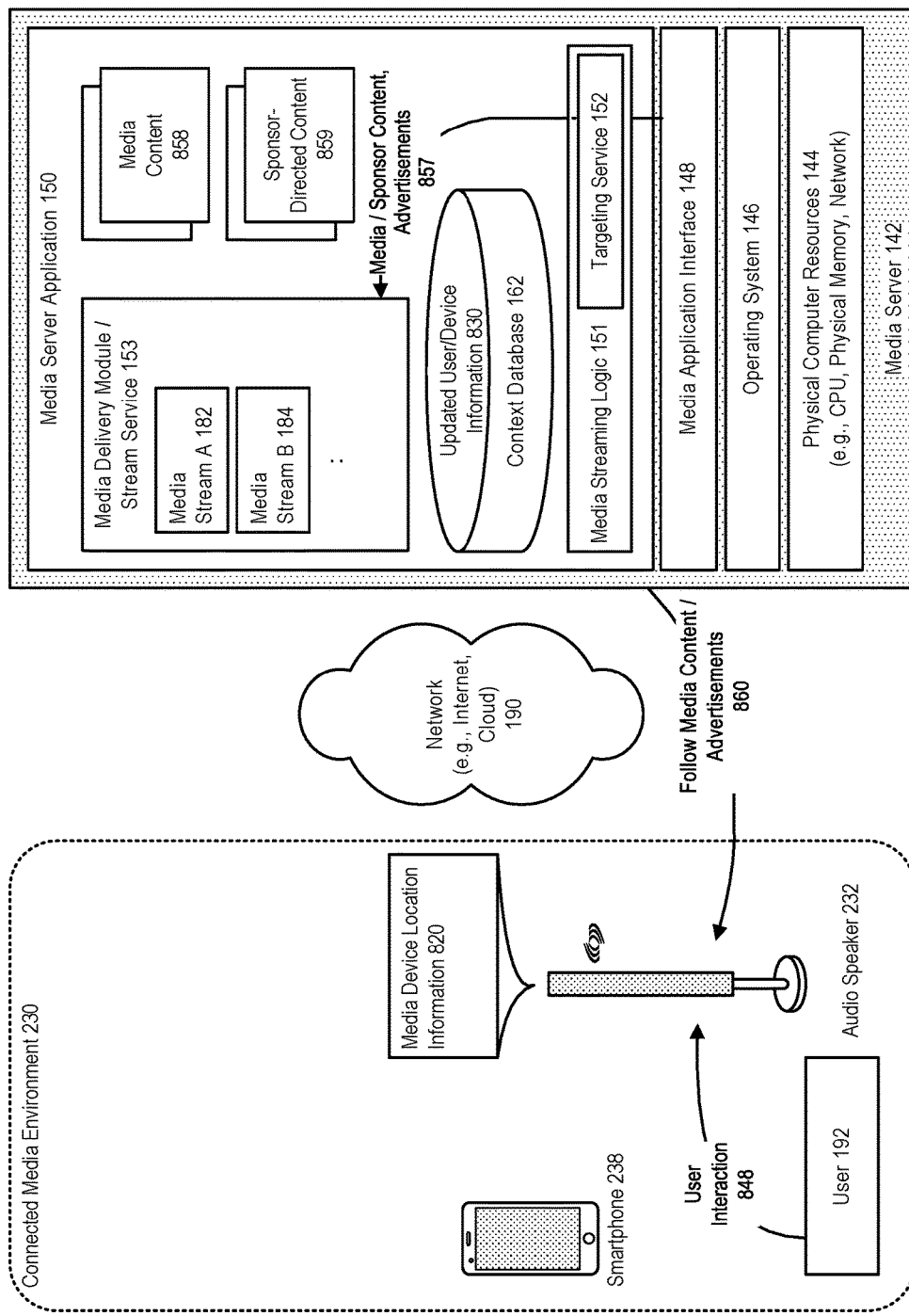
FIG. 39 further illustrates delivery of media content and sponsor-directed content or advertisements across a connected media environment, in accordance with an embodiment.

FIG. 39 further illustrates delivery of media content and sponsor-directed content or advertisements across a connected media environment, in accordance with an embodiment.

As shown in FIG. 39, the targeted selection 857 of potentially different media content 858 and/or advertisement 859 can be directed to the different destination device within the connected media environment, to follow 860 the user as they move within the connected environment, including from one device to another.

Figure 40:
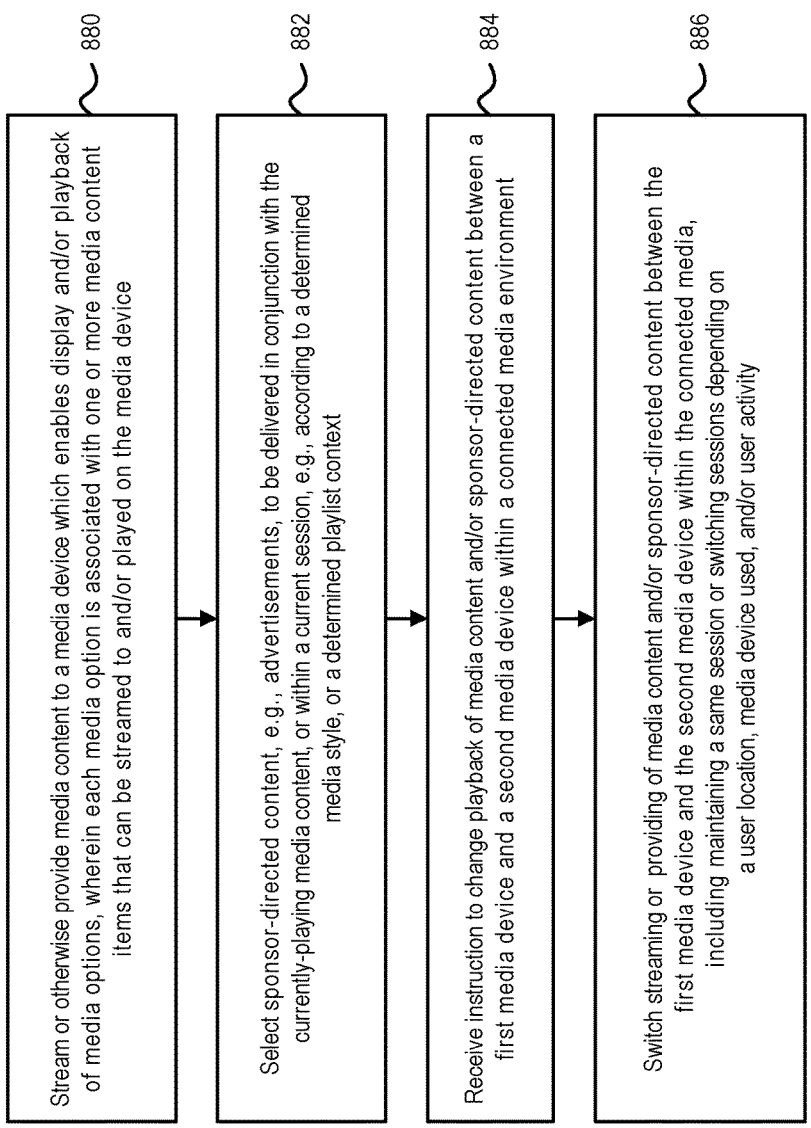
FIG. 40 illustrates a method for supporting delivery of media content and sponsor-directed content or advertisements across a connected media environment, in accordance with an embodiment.

FIG. 40 illustrates a method for supporting delivery of media content and sponsor-directed content or advertisements across a connected media environment, in accordance with an embodiment.

As shown in FIG. 40, at step 880, media content is streamed or otherwise provided to a media device which enables display and/or playback of media options, wherein each media option is associated with one or more media content items that can be streamed to and/or played on the media device.

At step 882, sponsor-directed content, e.g., advertisements, is selected to be delivered in conjunction with the currently-playing media content, or within a current session, e.g., according to a determined media style, or a determined playlist context At step 884, instruction is received to change playback of media content and/or sponsor-directed between a first media device and a second media device within a connected media environment.

At step 886, streaming or providing of media content and/or sponsor-directed content is switched between the first media device and the second media device within the connected media, including maintaining a same session or switching sessions depending on a user location, media device used, and/or user activity. In accordance with an embodiment, the sponsor content can also be adjusted, to better fit the capabilities of the new or second device, such as moving from a wearable first device, to a desktop second device.

In accordance with an embodiment, a connected media environment can provide a more seamless experience to a user as the user moves from one location to another location, streaming media content and/or advertisements to different platforms or media devices appropriate to the user's environment at any given time.

In accordance with an embodiment, the connected media environment can include connected devices associated with a common account (e.g., username), multiple related accounts, and/or multiple subaccounts.

For example, a user may desire that a requested media stream follow the user from device to device based on access to the user's account.

As another example, the user may be running on a trail and listening to a media stream on a mobile device, before going home in the car. The user can continue a media stream over the car entertainment system, which can launch an embedded media application that automatically logs into the user's account or asks the user to select among multiple accounts for login. Arriving home and walking in the house, the user can then instantly pick up where the user left off by turning on the home entertainment system to reengage the media server using the media application embedded in the home entertainment system. The user's session can be paused and streaming can continue the next morning on the car entertainment system on the drive into the office, where in the office, the user can then continue the media stream at the user's desktop workstation.

By continuing the stream, the user can use extended play time obtained on one device for listening to watch-now and/or play now advertisements or other promotions on a different device. Additionally, companion advertisements may be delivered to a second device in the streamed session. Sponsor-directed content can be selected based in part on sponsor-directed content that has been previously streamed, including on a different device within the connected media environment, thereby more intelligently selecting sponsor-directed content to improve the user's experience. The user can continue listening to the requested media content items in the media stream.

The above functionality can be useful where continuity is important, for example when listening to an audio book or lecture. It can also be useful where the user desires to continue listening to a playlist of music.

In some embodiments, a user's listening preferences can vary with context. Access to a user's account from different media devices can automatically trigger switching between playlists or music content request queues, or can prompt the user to be asked if a change in programming is desired.

For example, if a home entertainment device is voice control enabled, as the user enters the home and turns on the home entertainment device, the home entertainment device can provide an audio prompt such as "welcome home, continue playing 'Jazz' or another set of selection?" A user can stay logged into media applications on multiple different devices and select the device that is actively streaming at any given time.

In accordance with an embodiment, within a connected media environment, users may access media streams via a common internet connected wireless router. A common setup may include, for example, home entertainment system, televisions and radios having embedded media applications, (such as media application) for streaming media content, one or more desktop, laptop, and/or tablet computers each having a media application downloaded and installed as a client, and one or more mobile devices, each having a mobile version of the media application installed as a client. The devices within the connected media environment used for streaming media content can depend on a user's activity and the quality of user's experience. If multiple devices are logged into different accounts via a common wireless router, media content selections, and selection of sponsor-directed content, and incentives such as rewards, can be aggregated across the multiple accounts that access the media server via the common router.

For example, if a user is cooking in the kitchen, the user may start streaming media from a radio or laptop placed on a kitchen counter, with a client logged in under the user's mother's username. If the user moves to the living room after the user is finished in the kitchen, the user may want to stream media to a home entertainment system having higher quality audio speakers, but having a client logged in under the user's username. If the user then retires to the bedroom to read a book, the user may want to stream media to a television perched on a bureau having an embedded media application logged in under the user's own name. In accordance with an embodiment, the entire session, including media content requests and sponsor-directed content selection can seamlessly transfer between devices on the network.

In accordance with an embodiment, the method comprises streaming media content for some period of time. If the media server detects that the user is streaming from another media device, the media server can obtain the context of the now-streaming device. If both devices are streaming through a common connected media environment, the media server can obtain any information about that environment which it might have previously stored. The media server then continues streaming media content to the requesting media device. When the stream time exceeds some amount of minutes (e.g., x minutes), the media server is prompted to select and insert the sponsor-directed content into the stream. The media streaming logic selects sponsor-directed content (e.g., one or more advertisements) to stream based on one or more of obtained metadata related to qualities of the streamed media content, metadata related to a playlist where the playlist is selected for playback, user profile information, and media device context. Once selected, the sponsor-directed content is streamed to the media device that requested the previously streamed media content.

As described above, the context of a media device can be used to select sponsor-directed content for streaming to the user. In accordance with an embodiment, accessing a media server from a connected media environment can provide an opportunity to obtain additional information for drawing inferences about what activities the user may be engaged in. For example, if the environment is profiled as a user's residence, sponsor-directed content can be targeted to domestic activities. Receiving a signal that a user is connecting from a mobile device to a home entertainment system can be a signal to the media server for determining what that user is doing, allowing the media server to optimize the advertisement experience based on that signal.

For example, if the user is streaming from a home entertainment center and has moved the stream to the kitchen, and the local time is identified as within a lunch window, advertisements for nearby eateries that serve lunch can be selected for streaming.

In accordance with an embodiment, if a connected media environment is a commercial business, for example, the commercial business can sponsor media contents streamed via their router to multiple different mobile devices running media application clients logged into multiple different accounts.

For example, if a grocery chain provides free Wi-Fi to customers shopping at their locations, sponsor-directed content inserted into a media stream can include advertisement(s) for products sold by the grocery chains. Coffee shops commonly provide free Wi-Fi, providing an opportunity for the coffee shop to provide sponsor-directed content. For example, some stores often promote musical artists and prominently display compact discs at kiosks and at registers for sale to customers. Sponsor-directed content inserted into a media stream can include promoted tracks that can be purchased from such stores.

In accordance with an embodiment, the method comprises streaming media content for some period of time. If the media server detects that the user is streaming from a network that acts as a connected media environment for multiple devices, the media server can determine if the environment sponsors media streams. If the connected media environment is identified as a sponsor of media streams, the media server can access a pool of sponsor-directed content associated with the connected media environment. The media server then continues streaming media content to the requesting device. When the stream time exceeds some amount of minutes (e.g., x minutes), the media server is prompted to select and insert the sponsor-directed content into the stream. The media streaming logic selects sponsor-directed content (e.g., one or more advertisements) to stream from the pool identified via the connected media environment based on one or more of obtained metadata related to qualities of the streamed media content, a playlist where the playlist is selected for playback, user profile information, and media device context. Once selected, the sponsor-directed content is streamed to the media device that requested the previously streamed media content.

In accordance with an embodiment, a system is described for delivering media content and advertisements across a connected media environment, comprising a media server including a microprocessor, and a media server application executing thereon and adapted to receive requests from media devices for media content; a media streaming logic adapted to provide the media content in response to the requests from the media devices, including associating a request received from a media device with a plurality of media content items to be delivered as a media stream from the media server to the media device; providing, to one or more media devices, an advertisement or other sponsor-directed content inserted into the media stream by the media server, based on one or more media device identifications, user accounts, or session information; and following the user in streaming the advertisement or other sponsor-directed content, within a connected media environment, from one of a first media device to a second media device, or a first location to a second location.

In accordance with an embodiment, the system supports a method comprising providing, at a media server including a microprocessor, a media server application executing thereon and adapted to receive requests from media devices for media content; providing a media streaming logic adapted to provide the media content in response to the requests from the media devices, including associating a request received from a media device with a plurality of media content items to be delivered as a media stream from the media server to the media device; providing, to one or more media devices, an advertisement or other sponsor-directed content inserted into the media stream by the media server, based on one or more media device identifications, user accounts, or session information; and following the user in streaming the advertisement or other sponsor-directed content, within a connected media environment, from one of a first media device to a second media device, or a first location to a second location.

In accordance with an embodiment, the media server stores addresses for one or more media devices, and one or more user accounts, for using during a session, and uses the media device address and user account information in following the user within the connected media environment.

In accordance with an embodiment, the media streaming logic causes the media server application to stream the media and advertisement or other sponsor-directed content, within the connected media environment, automatically as the media device or location thereof changes, or manually as selected by the user.

In accordance with an embodiment, the media streaming logic inserts different advertisement or other sponsor-directed content into the media stream based on which of the first or second media device, or first or second location is being used.

In accordance with an embodiment, the media streaming logic causes the media stream to selectively be delivered between one or more of a smartphone, computer, audio speaker, entertainment center, automobile, wearable device or other media device, including serially delivering the media stream initially to the first media device, and then to the second media device as the media device or location thereof changes, or manually as selected by the user.

In accordance with an embodiment, the user is associated with permissions to use one or more user accounts, and the media streaming logic causes the media server to stream the advertisement or other sponsor-directed content to one of more media devices registered with one or more user accounts either automatically or manually as the media device or location thereof changes, or manually as selected by the user.

In accordance with an embodiment, the media server is adapted to receive interaction by the user, as determined by one or more sensors of the media device including one or more microphone, motion sensor, or camera adapted to determine a gesture by the user as a user interaction.

In accordance with an embodiment, the media streaming logic causes a first advertisement or other sponsor-directed content to be streamed to a first media device and a companion advertisement or other sponsor-directed content to a second media device.

In accordance with an embodiment, the companion advertisement provides more detailed information about the first advertisement, and is more appropriate for use by the second media device.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art.

For example, while several of the examples described above generally illustrate the use of a Spotify Connect environment, music or song media content, and advertisement-type sponsor-directed content, the systems and techniques described herein can be similarly used with other types of connected media environment, other types of media content, and other types of sponsor-directed content.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for providing media content including watch-now functionality, the system comprising:
   a media device including a microprocessor;
   a user interface adapted to display media options corresponding to items of media content, and determine user inputs; and
   a media application running on the media device and including a media play logic adapted to control playback of media content received from a media server, including
      during playback of a media stream that includes a plurality of media content items, either periodically, or upon receiving, at the user interface, a user input indicative of skipping to a next media option for playback, displaying, at the user interface, a prompt to elect to play at least one of an offered advertisement or other sponsor-directed content, in return for a period of extended media play;
      in response to receiving, as a user input, an election by the user to play the offered advertisement or other sponsor-directed content, in return for the period of extended media play, playing the offered advertisement or other sponsor-directed content, including
         receiving, as part of the media stream, an advertisement or other sponsor-directed content of a first type and duration; and
      following completion of the playing of the offered advertisement or other sponsor-directed content,
         skipping to the next media option for playback, including streaming the next media content item associated with the media stream,
         configuring the media play logic for the period of extended media play, and
         continuing to play the media stream according to the period of extended media play;
      otherwise, if no election is received to play the offered advertisement or other sponsor-directed content, in return for the period of extended media play, playing an advertisement or other sponsor-directed content of a second type and duration, skipping to the next media option for playback, including streaming the next media content item associated with the media stream, and configuring the media play logic to play the media stream for a period of regular media play.

2. The system of claim 1, wherein configuring the media play logic for a period of regular media play comprises configuring the media play logic to present advertisements or other sponsor-directed content having a shorter duration than those associated with a period of extended media play, between shorter intervals of media playback than for a period of extended media play.

3. The system of claim 1, wherein configuring the media play logic for a period of extended media play comprises configuring the media play logic to present advertisements or other sponsor-directed content having a longer duration than those associated with a period of regular media play, between longer intervals of media playback than for a period of regular media play.

4. The system of claim 1, wherein the media play logic is adapted to prompt the user to select one of an extended media play configuration or regular media play configuration for subsequent advertisements or other sponsor-directed content, and in response to receiving a selection of the extended media play configuration, the media play logic is configured to play subsequently offered advertisements or other sponsor-directed content, in return for subsequent periods of extended media play.

5. The system of claim 1, wherein the media server includes a targeting service that analyzes a playing media content and selects advertisements or other sponsor-directed content for delivery in conjunction with the playing media content, including
   associating a request for media content, with the media device, wherein the request includes an identifying information which identifies a destination device to which the media content is to be streamed, and
   determining a particular advertisement or other sponsor-directed content to be combined with the streamed media content.

6. The system of claim 1, wherein the media device and a second device are associated with a common account, and advertisement or other sponsor-directed content is selected for delivery to the media device based at least in part on advertisements or other sponsor-directed content previously streamed at the second device.

7. The system of claim 1, wherein the period of extended media play is obtained in return for playing the offered advertisement or other sponsor-directed content at a first media device, and the system is configured to play the media stream according to the period of extended media play, at a second media device.

8. A method for providing media content including watch-now functionality, the method comprising:
provideing, at a media device including a microprocessor, a user interface adapted to display media options corresponding to items of media content adapted to be received from a media server, and determine user inputs, and a media application running on the media device;
controlling playback of media content received from the media server, including
during playback of a media stream that includes a plurality of media content items, either periodically, or upon, receiving, at the user interface, a user input indicative of skipping to a next media option for playback, displaying, at the user interface, a prompt to elect to play at least one of an offered advertisement or other sponsor-directed content, in return for a period of extended media play;
in response to receiving, as a user input, an election by the user to play the offered advertisement or other sponsor-directed content, in return for the period of extended media play, playing the offered advertisement or other sponsor-directed content, including receiving, as part of the media stream, an advertisement or other sponsor-directed content of a first type and duration; and
following completion of the playing of the offered advertisement or other sponsor-directed content, skipping to the next media option for playback, including streaming the next media content item associated with the media stream, configuring the playback of media content for the period of extended media play, and continuing to play the media stream according to the period of extended media play;
otherwise, if no election is received to play the offered advertisement or other sponsor-directed content, in return for the period of extended media play, playing an advertisement or other sponsor-directed content of a second type and duration, skipping to the next media option for playback, including streaming the next media content item associated with the media stream, and configuring the playback of media content for a period of regular media play.

9. The method of claim 8, wherein configuring the playback of media content for a period of regular media play comprises presenting advertisements or other sponsor-directed content having a shorter duration than those associated with a period of extended media play, between shorter intervals of media playback than for a period of extended media play.

10. The method of claim 8, wherein configuring the playback of media content for a period of extended media play comprises presenting advertisements or other sponsor-directed content having a longer duration than those associated with a period of regular media play, between longer intervals of media playback than for a period of regular media play.

11. The method of claim 8, further comprising prompting the user to select one of an extended media play configuration or regular media play configuration for subsequent advertisements or other sponsor-directed content, and in response to receiving a selection of the extended media play configuration, playing subsequently offered advertisements or other sponsor-directed content, in return for subsequent periods of extended media play.

12. The method of claim 8, wherein the media server includes a targeting service that analyzes a playing media content and selects advertisements or other sponsor-directed content for delivery in conjunction with the playing media content, including
associating a request for media content, with the media device, wherein the request includes an identifying information which identifies a destination device to which the media content is to be streamed, and
determining a particular advertisement or other sponsor-directed content to be combined with the streamed media content.

13. The method of claim 8, wherein the media device and a second device are associated with a common account, and the method further comprises selecting advertisement or other sponsor-directed content for delivery to the media device based at least in part on advertisements or other sponsor-directed content previously streamed at the second device.

14. The method of claim 8, wherein the period of extended media play is obtained in return for playing the offered advertisement or other sponsor-directed content at a first media device, and the method further comprises playing the media stream according to the period of extended media play, at a second media device.

15. A non-transitory computer readable storage medium, including instructions stored thereon which when read and executed by one or more computer devices cause the one or more computer devices to perform steps comprising:
displaying, at a user interface, media options corresponding to items of media content adapted to be received from a media server, and determining user inputs;
controlling, by a media application running on a media device, playback of media content received from the media server, including
during playback of a media stream that includes a plurality of media content items, either periodically, or upon, receiving, at the user interface, a user input indicative of skipping to a next media option for playback, input, displaying, at the user interface, a prompt to elect to play at least one of an offered advertisement or other sponsor-directed content, in return for a period of extended media play;
in response to receiving, as a user input, an election by the user to play the offered advertisement or other sponsor-directed content, in return for the period of extended media play, playing the offered advertisement or other sponsor-directed content, including receiving, as part of the media stream, an advertisement or other sponsor-directed content of a first type and duration; and
following completion of the playing of the offered advertisement or other sponsor-directed content, skipping to the next media option for playback, including streaming the next media content item associated with the media stream, configuring the playback of media content for the period of extended media play, and continuing to play the media stream according to the period of extended media play;

otherwise, if no election is received to play the offered advertisement or other sponsor-directed content, in return for the period of extended media play, playing an advertisement or other sponsor-directed content of a second type and duration, skipping to the next media option for playback, including streaming the next media content item associated with the media stream, and configuring the playback of media content for a period of regular media play.

16. The non-transitory computer readable storage medium of claim 15, wherein configuring the playback of media content for a period of regular media play comprises presenting advertisements or other sponsor-directed content having a shorter duration than those associated with a period of extended media play, between shorter intervals of media playback than for a period of extended media play.

17. The non-transitory computer readable storage medium of claim 15, wherein configuring the playback of media content for a period of extended media play comprises presenting advertisements or other sponsor-directed content having a longer duration than those associated with a period of regular media play, between longer intervals of media playback than for a period of regular media play.

18. The non-transitory computer readable storage medium of claim 15, wherein the instructions further cause the one or more computer devices to prompt the user to select one of an extended media play configuration or regular media play configuration for subsequent advertisements or other sponsor-directed content, and in response to receiving a selection of the extended media play configuration, playing subsequently offered advertisements or other sponsor-directed content, in return for subsequent periods of extended media play.

19. The non-transitory computer readable storage medium of claim 15, wherein the media server includes a targeting service that analyzes a playing media content and selects advertisements or other sponsor-directed content for delivery in conjunction with the playing media content, including
associating a request for media content, with the media device, wherein the request includes an identifying information which identifies a destination device to which the media content is to be streamed, and
determining a particular advertisement or other sponsor-directed content to be combined with the streamed media content.

20. The non-transitory computer readable storage medium of claim 15, wherein the media device and a second device are associated with a common account, and the instructions further cause the one or more computer devices to select advertisement or other sponsor-directed content for delivery to the media device based at least in part on advertisements or other sponsor-directed content previously streamed at the second device.

21. The non-transitory computer readable storage medium of claim 15, wherein the period of extended media play is obtained in return for playing the offered advertisement or other sponsor-directed content at a first media device, and the instructions further cause the one or more computer devices to play the media stream according to the period of extended media play, at a second media device.

22. A system for providing media content including watch-now functionality, the system comprising:

a media server including a microprocessor, and a media server application executing thereon and adapted to receive requests from media devices for media content; and a media streaming logic adapted to provide the media content in response to the requests from the media devices, including
during playback of a media stream that includes a plurality of media content items, either periodically, or upon receiving, at a media application running on a media device, a user input indicative of skipping to a next media option for playback, causing a prompt to be displayed to a user of the media device to elect to play at least one of an offered advertisement or other sponsor-directed content, in return for a period of extended media play;
in response to receiving, as a user input, an election by the user to play the offered advertisement or other sponsor-directed content, in return for the period of extended media play, causing the offered advertisement or other sponsor-directed content to be played at the media device, including inserting into the media stream, an advertisement or other sponsor-directed content of a first type and duration; and
following completion of the playing of the offered advertisement or other sponsor-directed content,
skipping to the next media option for playback, including streaming the next media content item associated with the media stream,
causing the media device to be configured for the period of extended media play, and
continuing to stream the media stream according to the period of extended media play;
otherwise, if no election is received to play the offered advertisement or other sponsor-directed content, in return for the period of extended media play, causing an advertisement or other sponsor-directed content of a second type and duration to be played at the media device, skipping to the next media option for playback, including streaming the next media content item associated with the media stream, and streaming the media stream for a period of regular media play.

23. A method for providing media content including watch-now functionality, the method comprising:
providing, at a media server including a microprocessor, a media server application executing thereon and adapted to receive requests from media devices for media content; and
providing a media streaming logic adapted to provide the media content in response to the requests from the media devices, including
during playback of a media stream that includes a plurality of media content items, either periodically, or upon receiving, at a media application running on a media device, a user input indicative of skipping to a next media option for playback, causing a prompt to be displayed to a user of the media device to elect to play at least one of an offered advertisement or other sponsor-directed content, in return for a period of extended media play;
in response to receiving, as a user input, an election by the user to play the offered advertisement or other sponsor-directed content, in return for the period of extended media play, causing the offered advertisement or other sponsor-directed content to be played at the media device, including inserting into the media stream, an advertisement or other sponsor-directed content of a first type and duration; and following completion of the playing of the offered advertisement or other sponsor-directed content,
- skipping to the next media option for playback, including streaming the next media content item associated with the media stream,
- causing the media device to be configured for the period of extended media play, and
- continuing to stream the media stream according to the period of extended media play;

otherwise, if no election is received to play the offered advertisement or other sponsor-directed content, in return for the period of extended media play, causing an advertisement or other sponsor-directed content of a second type and duration to be played at the media device, skipping to the next media option for playback, including streaming the next media content item associated with the media stream, and streaming the media stream for a period of regular media play.

* * * * *